US012741252B2

(12) United States Patent
Aoki et al.

(10) Patent No.: US 12,741,252 B2
(45) Date of Patent: Sep. 22, 2026

(54) FINE BUBBLE GENERATOR, WATER HEATER, AND DISHWASHER

(71) Applicant: RINNAI CORPORATION, Nagoya (JP)

(72) Inventors: Shoji Aoki, Nagoya (JP); Kazuki Matsueda, Nagoya (JP); Tomoyuki Shimazu, Nagoya (JP); Kunio Kataoka, Nagoya (JP); Shinya Furukawa, Nagoya (JP); Ikko Amamiya, Nagoya (JP)

(73) Assignee: RINNAI CORPORATION, Nagoya (JP)

( * ) Notice: Subject to any disclaimer, the term of this patent is extended or adjusted under 35 U.S.C. 154(b) by 286 days.

(21) Appl. No.: 18/711,022

(22) PCT Filed: Oct. 19, 2022

(86) PCT No.: PCT/JP2022/038991

§ 371 (c)(1),
(2) Date: May 16, 2024

(87) PCT Pub. No.: WO2023/145161

PCT Pub. Date: Aug. 3, 2023

(65) Prior Publication Data

US 2026/0166497 A1 Jun. 18, 2026

(30) Foreign Application Priority Data

Jan. 25, 2022 (JP) ................................ 2022-009458
Mar. 25, 2022 (JP) ................................ 2022-049815

(51) Int. Cl.
*B01D 53/02* (2006.01)
*A47L 15/42* (2006.01)
(Continued)

(52) U.S. Cl.
CPC ........ *B01F 23/232* (2022.01); *A47L 15/4214* (2013.01); *B01F 23/2373* (2022.01);
(Continued)

(58) Field of Classification Search
CPC ................ B01F 23/232; B01F 23/2373; B01F 25/31232; B01F 25/103; B01F 35/55; B01F 2101/305; A47L 15/4214; F24H 9/0015
See application file for complete search history.

(56) References Cited

U.S. PATENT DOCUMENTS 4,370,304 A * 1/1983 Hendriks ............... C01B 25/28 423/310
5,427,181 A 6/1995 Laskaris et al.
(Continued)

FOREIGN PATENT DOCUMENTS

CN 101022882 A 8/2007
CN 107530650 A 1/2018
(Continued)

OTHER PUBLICATIONS

Translation of JP2018134588 (Year: 2018).*
(Continued)

*Primary Examiner* — Christopher P Jones
(74) *Attorney, Agent, or Firm* — K&L Gates LLP

(57) ABSTRACT

The utility model provides a little bubble device, this little bubble device includes: a body has an entry, an export, one lies in the venturi tube mechanism between this entry and this export, and this venturi tube mechanism has a neck that feeds through the external world, a bubble refines the mechanism, has the passageway that an at least cross-section is lighter than the cross-section of this entry, and an at least passageway feeds through between this venturi tube mechanism and export, the body still includes a cylinder part, this
(Continued)

venturi tube mechanism holding in this cylinder part, this cylinder part pass through be equipped with one with the air inlet hole of neck intercommunication. The utility model discloses a little bubble device can provide very careful and careful foam water stream.

18 Claims, 30 Drawing Sheets

(51) Int. Cl.

| | |
|---|---|
| ***B01F 23/232*** | (2022.01) |
| ***B01F 23/2373*** | (2022.01) |
| ***B01F 25/10*** | (2022.01) |
| ***B01F 25/312*** | (2022.01) |
| ***B01F 35/00*** | (2022.01) |
| ***F24H 9/00*** | (2022.01) |
| *B01F 101/00* | (2022.01) |

(52) U.S. Cl.

CPC ........ *B01F 25/103* (2022.01); *B01F 25/3121* (2022.01); *B01F 25/31232* (2022.01); *B01F 35/55* (2022.01); *F24H 9/0015* (2013.01); *B01F 2101/305* (2022.01)

(56) References Cited

U.S. PATENT DOCUMENTS

| | | | | |
|---|---|---|---|---|
| 6,969,052 | B2 * | 11/2005 | Korzeniowski | B01F 25/31242 261/76 |
| 10,695,726 | B2 * | 6/2020 | Tian | B01F 27/55 |
| 11,331,910 | B2 * | 5/2022 | Arimizu | H05B 3/78 |
| 2007/0152357 | A1 | 7/2007 | Matsumoto | |
| 2007/0205523 | A1 * | 9/2007 | Kojima | B01J 19/30 261/79.2 |
| 2015/0352503 | A1 | 12/2015 | Lai | |
| 2017/0304782 | A1 | 10/2017 | Wu | |
| 2018/0023600 | A1 * | 1/2018 | Komazawa | B01F 25/4314 239/463 |
| 2019/0176100 | A1 * | 6/2019 | Shibata | B01F 25/441 |
| 2022/0387945 | A1 * | 12/2022 | Shimazu | B01F 33/821 |
| 2022/0387946 | A1 * | 12/2022 | Shimazu | B01F 33/821 |
| 2023/0009590 | A1 * | 1/2023 | Shimazu | B01F 35/561 |

FOREIGN PATENT DOCUMENTS

| | | | |
|---|---|---|---|
| JP | 2001-187326 | A | 7/2001 |
| JP | 2008-018330 | A | 1/2008 |
| JP | 2008-290050 | A | 12/2008 |
| JP | 2008-307509 | A | 12/2008 |
| JP | 2009-166026 | A | 7/2009 |
| JP | 2013-190176 | A | 9/2013 |
| JP | 2016-112511 | A | 6/2016 |
| JP | 2017-136590 | A | 8/2017 |
| JP | 2017-176924 | A | 10/2017 |
| JP | 2018-008193 | A | 1/2018 |
| JP | 2018-134588 | A | 8/2018 |
| JP | 2018-144018 | A | 9/2018 |
| JP | 2018-175445 | A | 11/2018 |
| JP | 2019-013889 | A | 1/2019 |
| JP | 2020-171914 | A | 10/2020 |
| JP | 2022-187343 | A | 12/2022 |
| KR | 101137050 | B1 | 4/2012 |
| KR | 102215787 | B1 | 2/2021 |
| TW | M523728 | U | 6/2016 |
| WO | 2016178436 | A1 | 11/2016 |
| WO | 2019/116642 | A1 | 6/2019 |

OTHER PUBLICATIONS

International Search Report from International Application No. PCT/JP2022/038991 mailed on Jan. 10, 2023.

Written Opinion of the International Searching Authority from International Application No. PCT/JP2022/038991 mailed on Oct. 1, 2023.

European Search Report for corresponding European Application No. 22924017.1, mailed on Dec. 3, 2025.

Japanese Office Action for corresponding Japanese Patent Application No. 2022-009458, mailed on Jan. 20, 2026 with English translation.

Office Action from the Chinese Patent Office for the corresponding Chinese Patent Application No. 202280011880.5, mailed on Aug. 27, 2025 (English Translation).

English Translation of Written Opinion of the International Searching Authority from International Application No. PCT/JP2022/038991 mailed on Oct. 1, 2023.

Taiwanese Office Action for corresponding Taiwanese Patent Application No. 111142950, mailed on Feb. 13, 2026 with English Translation.

* cited by examiner (Second Example)

(Third Example)

(Fourth Example)

(Fourth Example)

(Fourth Example)

(Fourth Example)

(Fourth Example)

(Fourth Example)

(Second Embodiment)

(Fifth Example)

(Sixth Example)

Upstream Direction ⟷ Downstream Direction (Seventh Example)

FINE BUBBLE GENERATOR, WATER HEATER, AND DISHWASHER

CROSS-REFERENCE TO RELATED APPLICATIONS

This application is a U.S. National Stage Entry of International Patent Application No. PCT/JP2022/038991, filed Oct. 19, 2022, which application claims priority under 35 U.S.C. 119 (b) and 37 CFR 1.55 to Japanese Application No. 2022-009458, filed on Jan. 25, 2022, and Japanese Application No. 2022-049815, filed on Mar. 25, 2022, the entire disclosures of which are hereby incorporated by reference herein.

TECHNICAL FIELD

The art disclosed herein relates to a fine bubble generator, a water heater, and a dishwasher.

BACKGROUND ART

Japanese Patent Application Publication No. 2018-8193 describes a fine bubble generator which includes an inlet into which gas-dissolved water in which gas is dissolved flows; an outlet out of which the gas-dissolved water flows; and a fine bubble generation portion disposed between the inlet and the outlet. The fine bubble generation portion includes a diameter-reducing flow path and a diameter-increasing flow path disposed downstream of the diameter-reducing flow path, and the diameter-reducing flow path reduces its flow path diameter from upstream to downstream and the diameter-increasing flow path increases its flow path diameter from upstream to downstream.

SUMMARY OF INVENTION

In the fine bubble generator of JP 2018-8193 A, the water in which gas is dissolved (which may hereinbelow termed “gas-dissolved water”) flows into the diameter-reducing flow path in the fine bubble generation portion via the inlet. A flow speed of the gas-dissolved water increases as it flows through the diameter-reducing flow path, as a result of which its pressure is reduced. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. As above, in the fine bubble generator of JP 2018-8193 A, the fine bubbles are generated by the fine bubble generation portion. However, in the fine bubble generator of JP 2018-8193 A, a situation may occur in which the fine bubbles generated by the fine bubble generator is insufficient in volume.

The description herein provides an art configured to generate fine bubbles in a large volume.

Solution to Technical Problem

A fine bubble generator disclosed herein may comprise: an inlet into which gas-dissolved water in which gas is dissolved flows; an outlet out of which the gas-dissolved water flows; a first fine bubble generation portion disposed between the inlet and the outlet; and a second fine bubble generation portion disposed between the first fine bubble generation portion and the outlet, wherein the first fine bubble generation portion comprises: a venturi portion including a diameter-reducing flow path and a diameter-increasing flow path disposed downstream of the diameter-reducing flow path, wherein the diameter-reducing flow path reduces its flow path diameter from upstream to downstream, and the diameter-increasing flow path increases its flow path diameter from upstream to downstream, the second fine bubble generation portion comprises a plurality of swirling flow generation portions disposed along a downstream-side central axis direction of the second fine bubble generation portion, wherein each of the plurality of swirling flow generation portions comprises: a shaft portion extending along the downstream-side central axis direction; an outer peripheral portion surrounding the shaft portion; and a plurality of vanes disposed between the shaft portion and the outer peripheral portion and configured to generate a swirling flow flowing in a predetermined swirling direction with respect to the shaft portion.

According to the above configuration, the gas-dissolved water flowing into the fine bubble generator flows into the first fine bubble generation portion. A flow speed of the gas-dissolved water flowing into the first fine bubble generation portion increases as the gas-dissolved water passes through the diameter-reducing flow path, as a result of which the pressure of the water decreases. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. Next, the gas-dissolved water having passed through the first fine bubble generation portion flows into the swirling flow generation portions of the second fine bubble generation portion. The gas-dissolved water flowing into the swirling flow generation portions becomes a swirling flow in the predetermined swirling direction. The fine bubbles become finer bubbles and the volume of fine bubbles is increased by shearing force by the swirling flow. A path in which the gas-dissolved water flows as the swirling flow can be lengthened by the gas-dissolved water flowing through the plurality of swirling flow generation portions as compared to a configuration in which the gas-dissolved water flows through only one swirling flow generation portion. Due to this, the fine bubbles in the gas-dissolved water are refined into finer bubbles, and a volume of the fine bubbles increases. Thus, the fine bubbles can be generated in larger volume.

In one or more embodiments, when a swirling direction opposite to the predetermined swirling direction is termed a reversed swirling direction. In each of the plurality of vanes of the swirling flow generation portions, a swirling-direction-side end of a specific vane among the plurality of vanes may be located more on a reversed swirling direction side than a reversed swirling-direction-side end of an adjacent vane adjacent to the specific vane in the predetermined swirling direction. When seen along the downstream-side central axis direction, each of the swirling flow generation portions may comprise a plurality of first openings. When the swirling flow generation portions are seen along the downstream-side central axis direction, each of the plurality of first openings may be surrounded by the swirling-direction-side-end of the specific vane, the reversed swirling direction-side end of the adjacent vane, the shaft portion, and the outer peripheral portion. When the second fine bubble generation portion is seen along the downstream-side central axis direction, each of the plurality of vanes of a downstream-side swirling flow generation portion among the plurality of swirling flow generation portions may be located to overlap at least a part of a corresponding first opening among the plurality of first openings of an upstream-side swirling flow generation portion, the downstream-side swirling flow generation portion being different from a swirling flow generation portion disposed on a most upstream side, and the upstream-side swirling flow generation portion being adjacent to the downstream-side swirling flow generation portion on an upstream side of the downstream-side swirling flow generation portion.

According to the above configuration, when the second fine bubble generation portion is seen along the downstream-side central axis direction, the volume of the gas-dissolved water flowing out of the upstream-side swirling flow generation portion and through the downstream-side swirling flow generation portion without flowing past the vanes of the downstream-side swirling flow generation portion can be reduced as compared to a configuration in which each of the plurality of vanes of the downstream-side swirling flow generation portion does not overlap the corresponding one of the plurality of first openings of the upstream-side swirling flow generation portion. That is, the volume of the gas-dissolved water reaching the vanes of the downstream-side swirling flow generation portion can be increased. Due to this, the volume of the gas-dissolved water flowing as the swirling flow can be increased. Accordingly, the fine bubbles can be generated in larger volume.

In one or more embodiments, when the second fine bubble generation portion is seen along the downstream-side central axis direction, each of the plurality of vanes of the downstream side swirling flow generation portion may overlap an entirety of the corresponding first opening among the plurality of first openings of the upstream-side swirling flow generation portion.

According to the above configuration, a majority of the gas-dissolved water flowing out of the upstream-side swirling flow generation portion flows past the vanes of the downstream-side swirling flow generation portion. Due to this, the volume of the gas-dissolved water flowing as the swirling flow can be increased. Accordingly, the fine bubbles can be generated in larger volume.

In one or more embodiments, a plurality of second openings may be disposed at a downstream-side end of each of the swirling flow generation portions. Each of the plurality of second openings may be surrounded by the swirling-direction-side end of the specific vane, a swirling-direction-side end of the adjacent vane, the shaft portion, and the outer peripheral portion. When the second fine bubble generation portion is seen along the downstream-side central axis direction, a reversed swirling direction-side end of each of the plurality of vanes of the downstream-side swirling flow generation portion may be disposed in proximity to a central portion in the predetermined swirling direction of a corresponding second opening among the plurality of second openings.

According to the above configuration, a part of the gas-dissolved water flowing out of the upstream-side swirling flow generation portion collides with the reversed swirling direction-side ends of the vanes of the downstream-side swirling flow generation portion. The gas-dissolved water collides with the reversed swirling-direction-side ends of the vanes of the downstream-side swirling flow generation portion, by which the fine bubbles in the gas-dissolved water break into finer bubbles and the volume of fine bubbles increases. Further, a part of the gas-dissolved water flowing out of the upstream-side flowing generation portion is sheared when it flows past the reversed swirling-direction-side ends of the vanes of the downstream-side swirling flow generation portion. When the gas-dissolved water is sheared, the fine bubbles in the gas-dissolved water are refined into finer bubbles and the volume of the fine bubbles increases. Accordingly, the fine bubbles can be generated in larger volume.

In one or more embodiments, the first fine bubble generation portion may comprise a plurality of the venturi portions. The plurality of venturi portions may include a plurality of outer venturi portions disposed around an upstream-side central axis which is a central axis of the first fine bubble generation portion. A number of the plurality of outer venturi portions may be same as a number of the plurality of vanes of a most-upstream-side swirling flow generation portion, the most-upstream-side swirling flow generation portion being a swirling flow generation portion disposed at a most upstream side among the plurality of swirling flow generation portions. A downstream-side end of the diameter-increasing flow path of each of the plurality of outer venturi portions may face a corresponding vane among the plurality of vanes of the most-upstream-side swirling flow generation portion.

According to the above configuration, a majority of the gas-dissolved water flowing out of the first fine bubble generation portion flows past the vanes of the most upstream-side swirling flow generation portion. Due to this, the volume of the gas-dissolved water flowing as the swirling flow can be increased. Accordingly, the fine bubbles can be generated in larger volume.

In one or more embodiments, the first fine bubble generation portion may comprise a plurality of the venturi portions. The plurality of venturi portions may include a plurality of outer venturi portions disposed around an upstream-side central axis which is a central axis of the first fine bubble generation portion. A number of the plurality of outer venturi portions may be same as a number of the plurality of vanes of a most-upstream-side swirling flow generation portion, the most-upstream-side swirling flow generation portion being a swirling flow generation portion disposed at a most upstream side among the plurality of swirling flow generation portions. A downstream-side end of the diameter-increasing flow path of each of the plurality of outer venturi portions may face a reversed swirling direction-side end of a corresponding vane among the plurality of vanes of the most-upstream-side swirling flow generation portion.

According to the above configuration, a part of the gas-dissolved water flowing out of the first fine bubble generation portion collides with the reversed swirling-direction-side ends of the vanes of the most upstream-side swirling flow generation portion. By the gas-dissolved water colliding with the reversed swirling-direction-side ends of the vanes of the most upstream-side swirling flow generation portion, the fine bubbles in the gas-dissolved water break into finer bubbles and thus the volume of fine bubbles increases. Further, a part of the gas-dissolved water flowing out of the first fine bubble generation portion is sheared when it flows past the reversed swirling-direction-side ends of the vanes of the most upstream-side swirling flow generation portion. When the gas-dissolved water is sheared, the fine bubbles in the gas-dissolved water are refined into finer bubbles and the volume of the fine bubbles increases. Accordingly, the fine bubbles can be generated in larger volume.

In one or more embodiments, the fine bubble generator may further comprise a body case housing the first fine bubble generation portion and the second fine bubble generation portion. The body case may comprise: a first positioning portion for positioning the first fine bubble generation portion relative to the body case; and a second positioning portion for positioning the second fine bubble generation portion relative to the body case.

According to the above configuration, by the first fine bubble generation portion and the body case being positioned by the first positioning portion and the second fine bubble generation portion and the body case being positioned by the second position portion, the plurality of outer venturi portions of the first fine bubble generation portion and the plurality of vanes of the most upstream-side swirling flow generation portion of the second fine bubble generation portion are positioned. Due to this, a majority of the gas-dissolved water flowing out of the first fine bubble generation portion can either be allowed to flow past the vanes of the most upstream-side swirling flow generation portion, be allowed to collide with the reversed swirling-direction-side ends of the vanes of the most upstream-side swirling flow generation portion, or be allowed to be sheared when it flows past the reversed swirling-direction-side ends of the vanes of the most upstream-side swirling flow generation portion. Accordingly, the fine bubbles can be generated in larger volume.

In one or more embodiments, an upstream-side protrusion protruding upstream or an upstream-side recess recessed downstream is disposed at an upstream-side end of each of the plurality of swirling flow generation portions, in a case where the upstream-side protrusion is disposed at the upstream-side end of each of the plurality of swirling flow generation portions, a downstream-side recess recessed upstream may be disposed at a downstream-side end of each of the plurality of swirling flow generation portions, wherein the upstream-side protrusion may have a shape corresponding to the second positioning portion and the downstream-side recess. In a case where the upstream-side recess is disposed at the upstream-side end of each of the plurality of swirling flow generation portions, a downstream-side protrusion protruding downstream may be disposed at the downstream-side end of each of the plurality of swirling flow generation portions. The upstream-side recess may have a shape corresponding to the second positioning portion and the downstream-side protrusion.

According to the above configuration, with the use of the upstream-side protrusions or the upstream-side recesses at the upstream-side ends of the swirling flow generation portions, the body case and the most-upstream-side swirling flow generation portion can be positioned with each other, and also two adjacent swirling flow generation portions in the downstream-side central axis direction can be positioned with each other. In this case, any other feature for positioning the body case and the most-upstream-side swirling flow generation portion and different from the upstream-side protrusions or the upstream-side recesses do not have to be disposed at the upstream-side end of the most upstream-side swirling flow generation portion. Due to this, structures of the plurality of swirling flow generation portions can be made identical to each other.

In one or more embodiments, the plurality of venturi portions may further include an inner venturi portion extending along the upstream-side central axis. A downstream-side end of the diameter-increasing flow path of the inner venturi portion may face the shaft portion of the most-upstream-side swirling flow generation portion. An opening area of the downstream-side end of the diameter-increasing flow path of the inner venturi portion may be smaller than an area of the shaft portion of the most-upstream-side swirling flow generation portion, the area of the shaft portion being of when the shaft portion is seen along the downstream-side central axis direction.

According to the above configuration, a greater volume of the gas-dissolved water flowing out of the inner venturi portion can be allowed to collide with the shaft portion of the most-upstream-side swirling flow generation portion as compared to a configuration in which the opening area of the downstream-side end of the diameter-increasing flow path of the inner venturi portion is larger than the area of the shaft portion of the most-upstream-side swirling flow generation portion. By the gas-dissolved water colliding with the shaft portion, the fine bubbles in the gas-dissolved water are refined into finer bubbles, and the volume of the fine bubbles increases. Thus, the fine bubbles can be generated in larger volume.

In one or more embodiments, the opening area may be smaller than an outline area of an upstream-side end of the shaft portion of the most-upstream-side swirling flow generation portion, the outline area of the upstream-side end of the shaft portion being of when the shaft portion is seen along the downstream-side central axis direction.

A part of the gas-dissolved water flowing out of the inner venturi portion may flow toward the outside of the shaft portion of the most-upstream-side swirling flow generation portion. According to the above configuration, the volume of the gas-dissolved water colliding with the shaft portion (upstream-side end in particular) of the most-upstream-side swirling flow generation portion can be increased. Thus, the fine bubbles can be generated in larger volume.

In one or more embodiments, a recess recessed downstream may be disposed at the upper end of the shaft portion of the most-upstream-side swirling flow generation portion.

According to the above configuration, the gas-dissolved water flowing out of the inner venturi portion collides with the recess. Then, the gas-dissolved water having collided with the recess flows toward the inner venturi portion. In this case, the gas-dissolved water flowing out of the inner venturi portion and the gas-dissolved water having collided with the recess and flowing toward the inner venturi portion collide with each other. By the gas-dissolved water colliding with each other, the fine bubbles in the gas-dissolved water break into finer bubbles and the volume of fine bubbles increases. Accordingly, the fine bubbles can be generated in larger volume.

In one or more embodiments, a projection projecting upstream may be disposed on an upstream-side surface of each of the plurality of vanes.

According to the above configuration, the gas-dissolved water flowing by the plurality of vanes collides with the projections. By the gas-dissolved water colliding with the projections, the fine bubbles in the gas-dissolved water break into finer bubbles and the volume of fine bubbles increases. Accordingly, the fine bubbles can be generated in larger volume.

In one or more embodiments, a downstream-side end of the diameter-increasing flow path of each of the plurality of outer venturi portions may face the projection of a corresponding vane among the plurality of vanes of the most-upstream-side swirling flow generation portion.

According to the above configuration, the gas-dissolved water flowing out of the outer venturi portions can be allowed to surely collide with the projections. Accordingly, the fine bubbles can be generated in larger volume.

In one or more embodiments, the fine bubble generator may further comprise a flow conditioner disposed between the second fine bubble generation portion and the outlet, wherein the flow conditioner may be configured to straighten a flow of gas-dissolved water flowing out of the second fine bubble generation portion from a swirling flow to a straight flow.

The flow of the gas-dissolved water flowing out of the second fine bubble generation portion is a swirling flow (i.e., turbulent flow). When the flow of the gas-dissolved water is a swirling flow, the gas-dissolved water is more likely to collide with wall surfaces defining a flow path in which the gas-dissolved water flows on the downstream side of the flow conditioner (hereafter simply termed "wall surfaces") than when the flow of the gas-dissolved water is a straight flow (i.e., laminar flow). Due to this, if the flow of the gas-dissolved water flowing out of the second fine bubble generation portion is not straightened from the swirling flow to the straight flow, relatively a great volume of the gas-dissolved water collides with the wall surfaces. In this case, pressure loss in the fine bubble generator increases, as a result of which the volume of the gas-dissolved water flowing in the fine bubble generator is decreased. According to the above configuration, the gas-dissolved water flowing out of the second fine bubble generation portion flows in the flow conditioner, by which the flow of the gas-dissolved water is straightened from the swirling flow (i.e., turbulent flow) to the straight flow (i.e., laminar flow). Due to this, the volume of the gas-dissolved water colliding with the wall surfaces can be reduced, by which the pressure loss in the fine bubble generator can be reduced. Accordingly, the fine bubbles can be generated in larger volume.

In addition, the disclosure discloses a water heater comprising the above fine bubble generator.

According to the above configuration, the gas-dissolved water having flowed in the fine bubble generator is supplied to a hot water supply outlet. That is, the gas-dissolved water containing a great volume of the fine bubbles can be supplied to the hot water supply outlet. A cleaning performance when a user showers, for example, can be improved by the great volume of fine bubbles contained in the gas-dissolved water. Accordingly, user convenience when using the water heater can be improved.

In addition, the disclosure discloses a dishwasher comprising the above fine bubble generator.

According to the above configuration, the gas-dissolved water having flowed in the fine bubble generator is supplied to a washing tub of the dishwasher. That is, the gas-dissolved water containing a great volume of fine bubbles can be supplied to the washing tub. A rinsing performance when dish(es) are rinsed can be improved by the great volume of fine bubbles contained in the gas-dissolved water. Accordingly, user convenience using the dishwasher can be improved.

DESCRIPTION OF EXAMPLES

First Example

Figure 1:
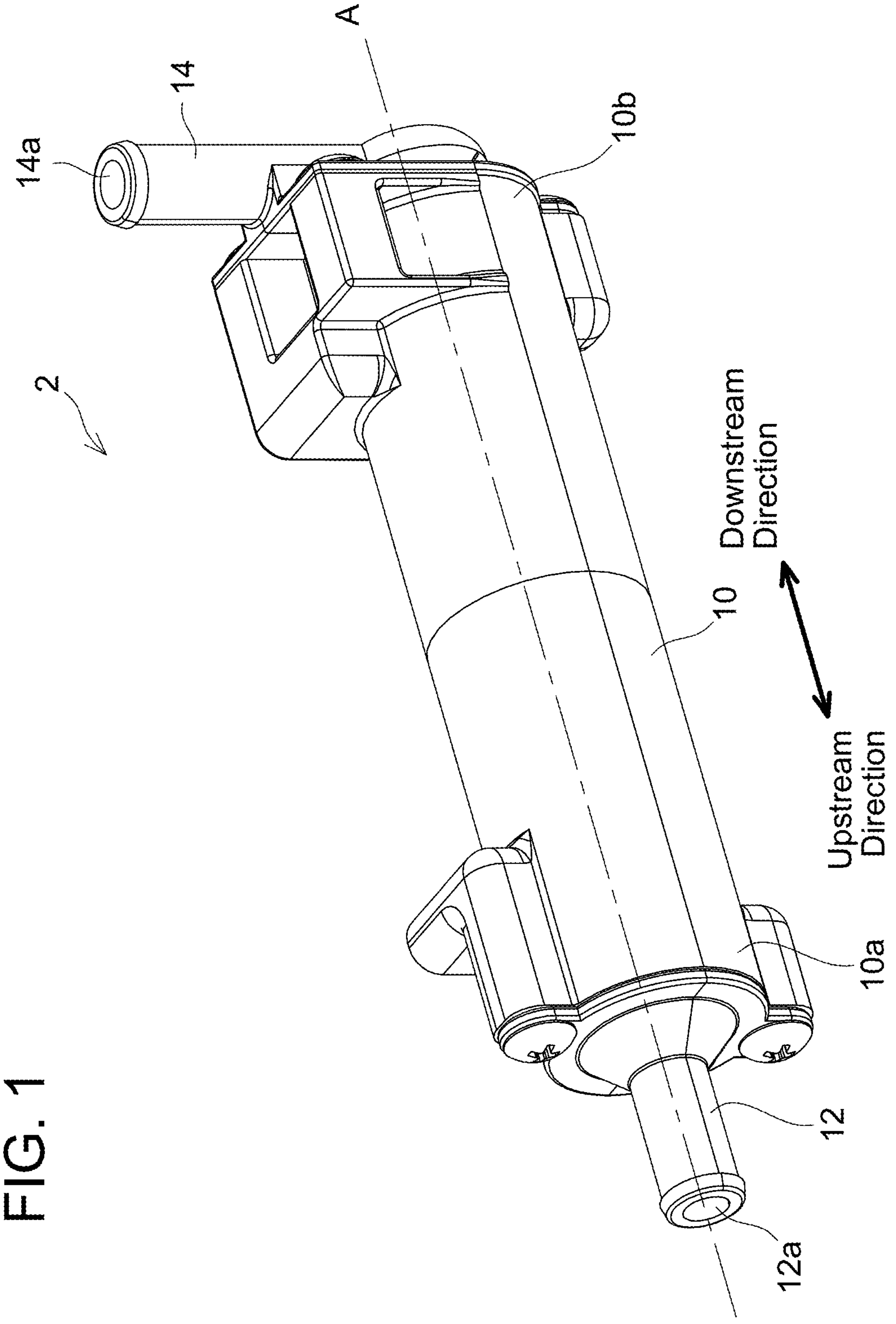
FIG. 1 illustrates a perspective view of a fine bubble generator 2 according to a first example.

As shown in FIG. 1, the fine bubble generator 2 comprises a body case 10, an inlet 12, and an outlet 14. The body case 10 has a substantially cylindrical shape. The inlet 12 is screw-fixed to an upstream-side end 10*a* of the body case 10. The inlet 12 has an inlet port 12*a* defined therein. The outlet 14 is screw-fixed to a downstream-side end 10*b* of the body case 10. The outlet 14 has an outlet port 14*a* defined therein. Hereafter, a central axis A of the fine bubble generator 2 will be simply referred to as "central axis A".

Figure 2:
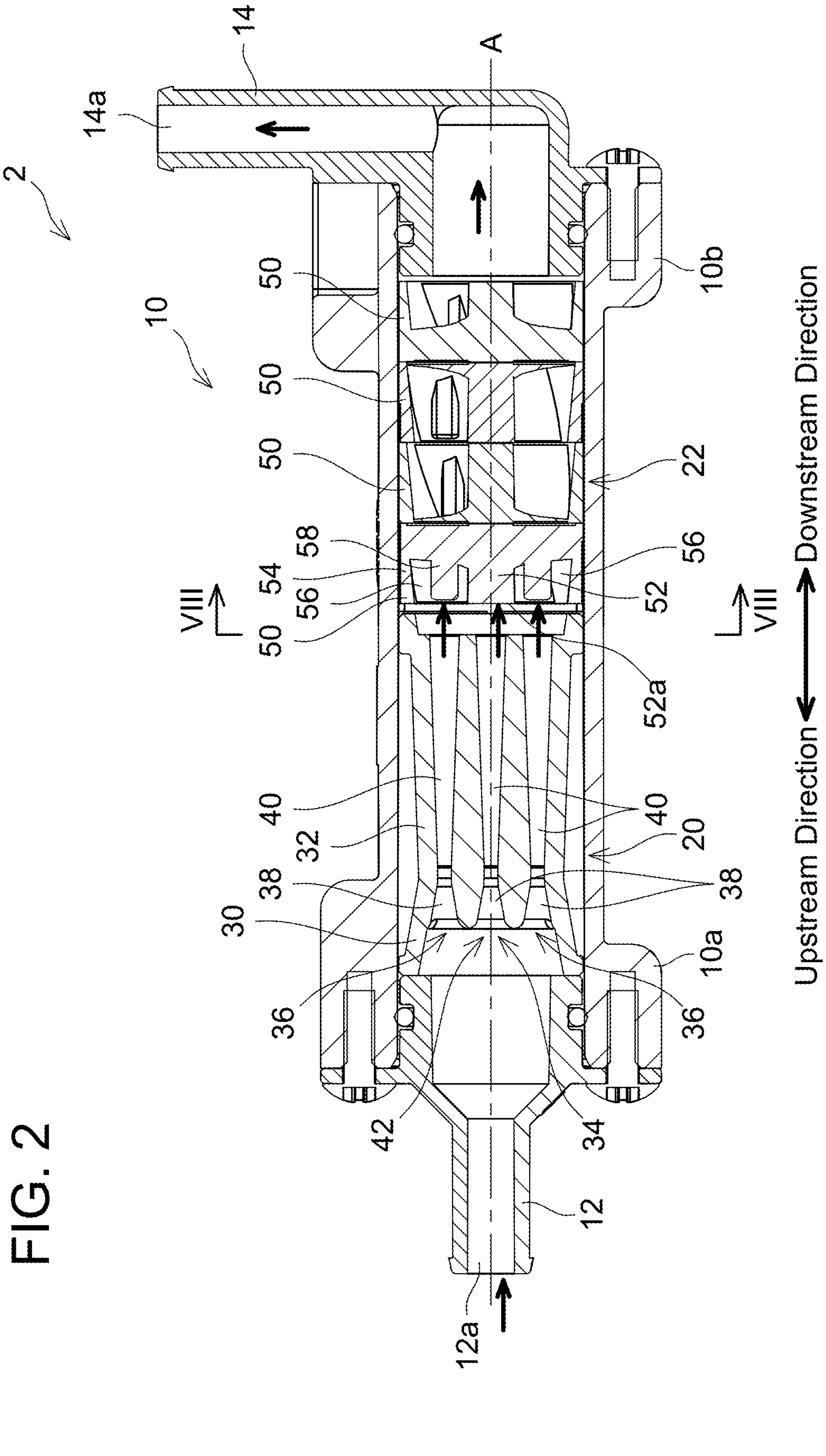
FIG. 2 illustrates a cross-sectional view of the fine bubble generator 2 according to the first example.

As shown in FIG. 2, the body case 10 houses a first fine bubble generation portion 20 and a second fine bubble generation portion 22 disposed downstream of the first fine bubble generation portion 20. The first fine bubble generation portion 20 and the second fine bubble generation portion 22 are arranged along the central axis A.

Configuration of First Fine Bubble Generation Portion 20; FIGS. 2 to 5

Figure 3:
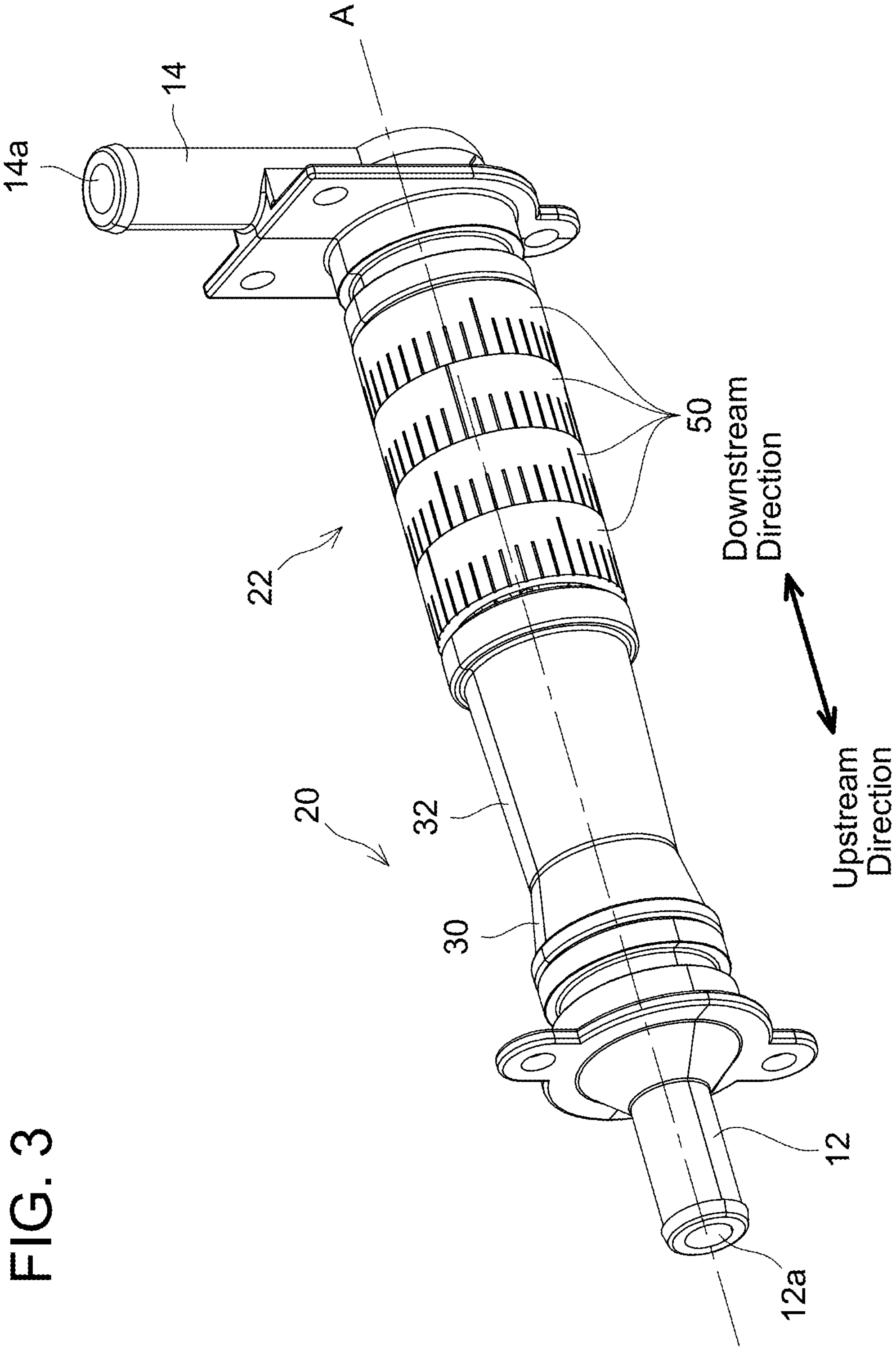
FIG. 3 illustrates a perspective view of the fine bubble generator 2 according to the first example with a body case 10 removed therefrom.

As shown in FIG. 3, the first fine bubble generation portion 20 comprises a first body portion 30 and a second body portion 32 disposed downstream the first body portion 30. An outer diameter of the first body portion 30 decreases as the first body portion 30 extends farther in a downstream direction. An outer diameter of the second body portion 32 increases as the second body portion 32 extends farther in the downstream direction. A central axis of the first fine bubble generation portion 20 coincides with the central axis A.

Figure 4:
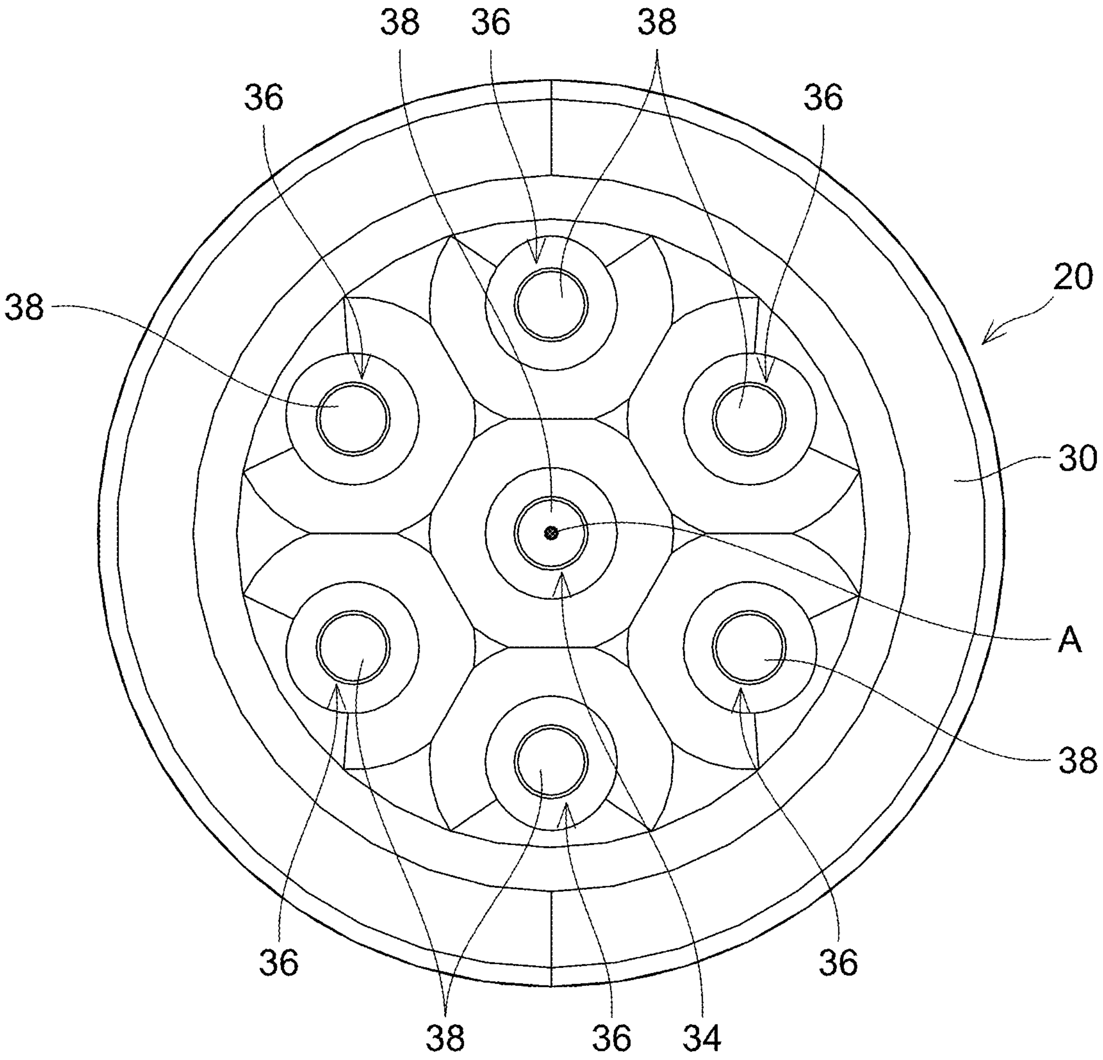
FIG. 4 illustrates a first fine bubble generation portion 20 according to the first example from an upstream side.
Figure 5:
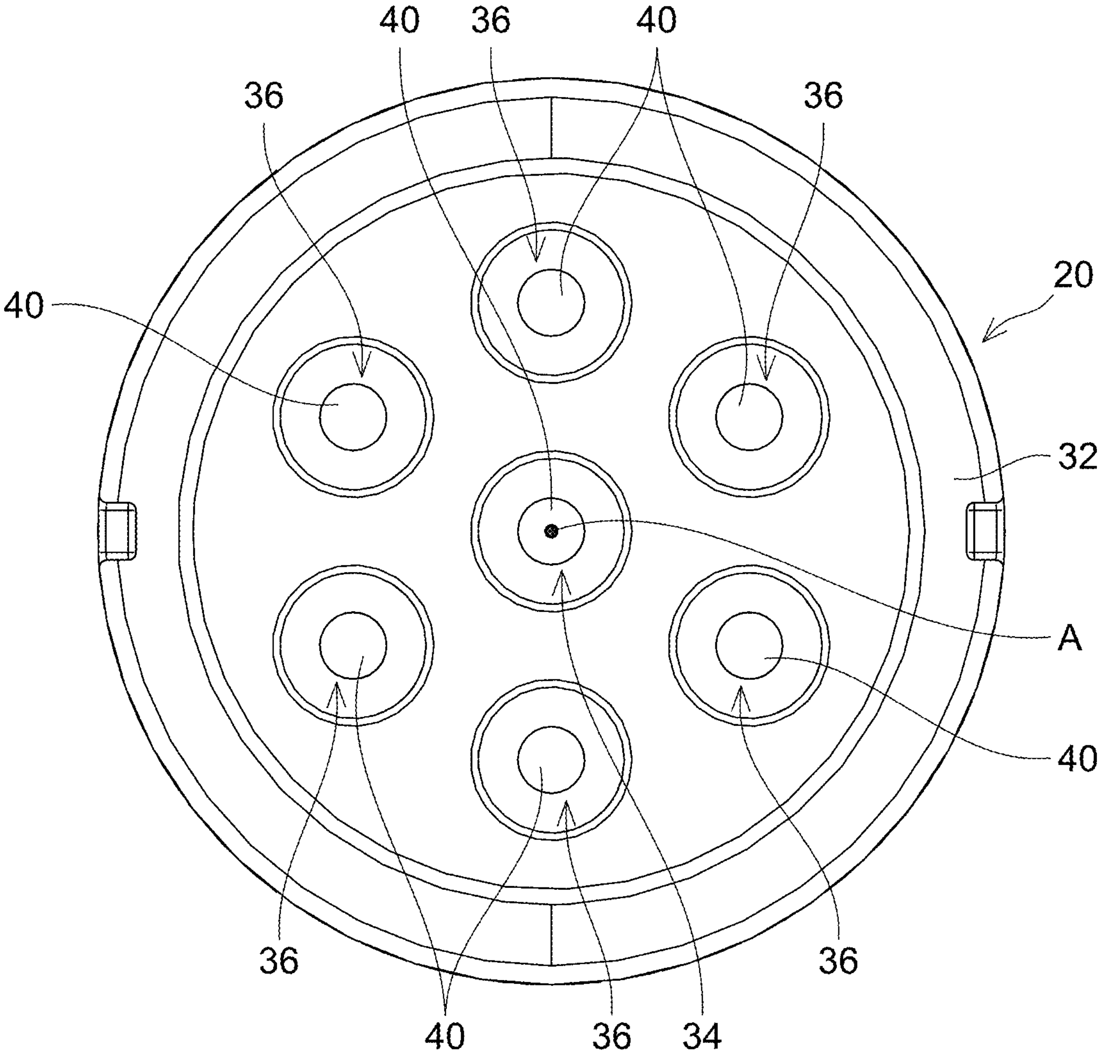
FIG. 5 illustrates the first the first fine bubble generation portion 20 according to the first example from a downstream side.

As shown in FIG. 4, the first fine bubble generation portion 20 comprises an inner venturi portion 34 and six outer venturi portions 36. The inner venturi portion 34 is arranged at a central portion of the first fine bubble generation portion 20. The inner venturi portion 34 is disposed on the central axis A. As shown in FIG. 2, the inner venturi portion 34 comprises a diameter-reducing flow path 38 whose flow path diameter is reduced from upstream to downstream and a diameter-increasing flow path 40 disposed downstream of the diameter-reducing flow path 38 and whose flow path diameter increases from upstream to downstream. The diameter-reducing flow path 38 is arranged in the first body portion 30. The flow path diameter at an upstream-side end of the diameter-reducing flow path 38 is smaller than the flow path diameter of the inlet port 12*a* in the inlet 12. The diameter-increasing flow path 40 is arranged in the second body portion 32.

As shown in FIG. 4, the six outer venturi portions 36 are arranged on an outer side in a radial direction of the central axis A relative to the inner venturi portion 34. The six outer venturi portions 36 are arranged at equal intervals along a circumferential direction of the central axis A. Each of the six outer venturi portions 36 comprises, as the inner venturi portion 34 does, the diameter-reducing flow path 38 and the diameter-increasing flow path 40 (see FIG. 5). As shown in FIG. 2, the diameter-reducing flow paths 38 and the diameter-increasing flow paths 40 define an upstream-side flow path 42 in the first fine bubble generation portion 20. Water which flows through the inlet 12 into the first fine bubble generation portion 20 flows through the upstream-side flow path 42 into the second fine bubble generation portion 22.

Configuration of Second Fine Bubble Generation Portion 22; FIG. 2, FIGS. 6 to 9

As shown in FIG. 2, the second fine bubble generation portion 22 comprises four swirling flow generation portions 50. The four swirling flow generation portions 50 are arranged along the central axis A direction. A central axis of the second fine bubble generation portion 22 coincides with the central axis A. "Clockwise direction" and "counterclockwise direction" mean directions when the fine bubble generator 2 is seen from the upstream side along the central axis A direction.

Figure 6:
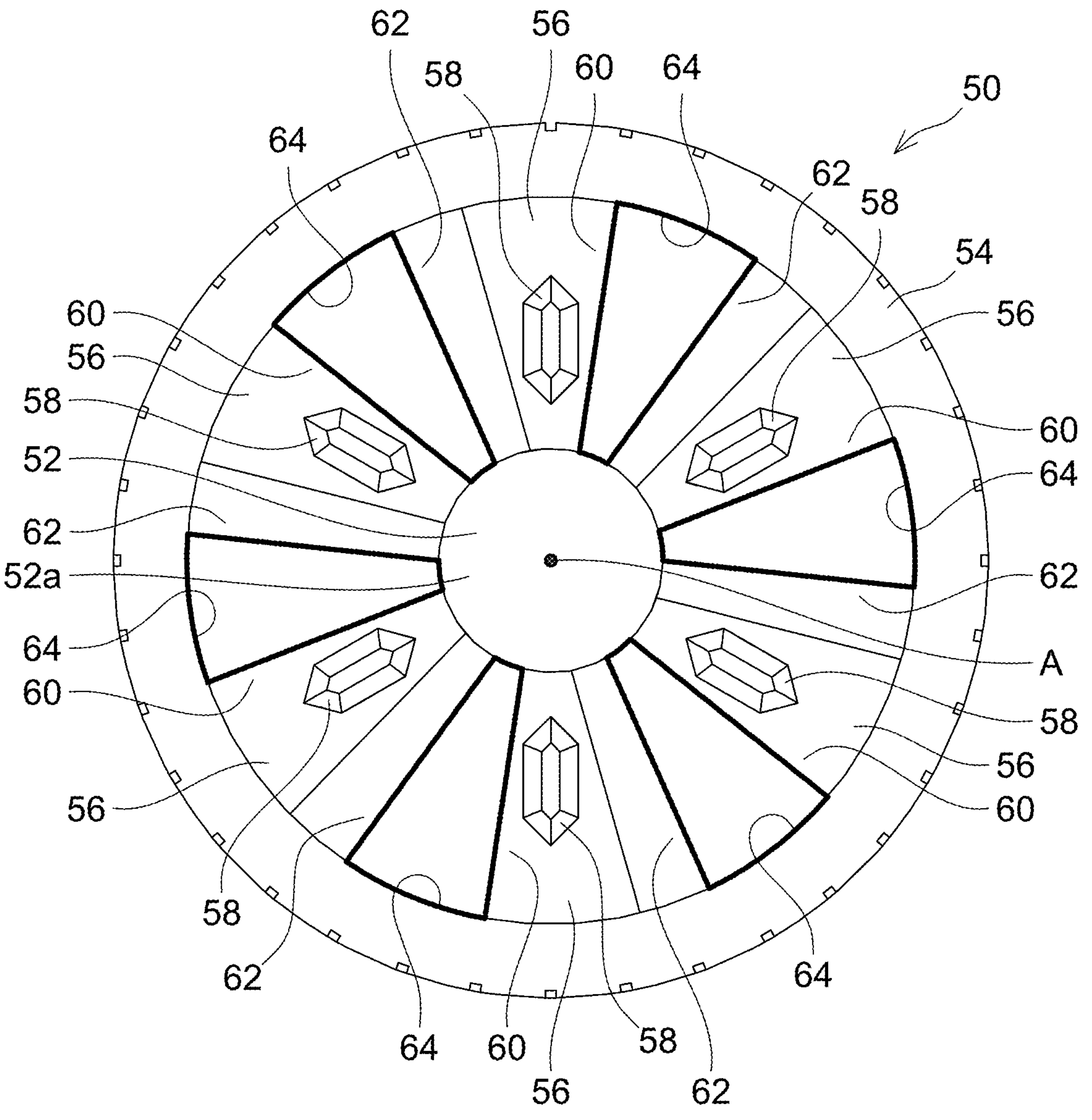
FIG. 6 illustrates a swirling flow generation portion 50 of a second fine bubble generation portion 22 according to the first example from the upstream side.
Figure 7:
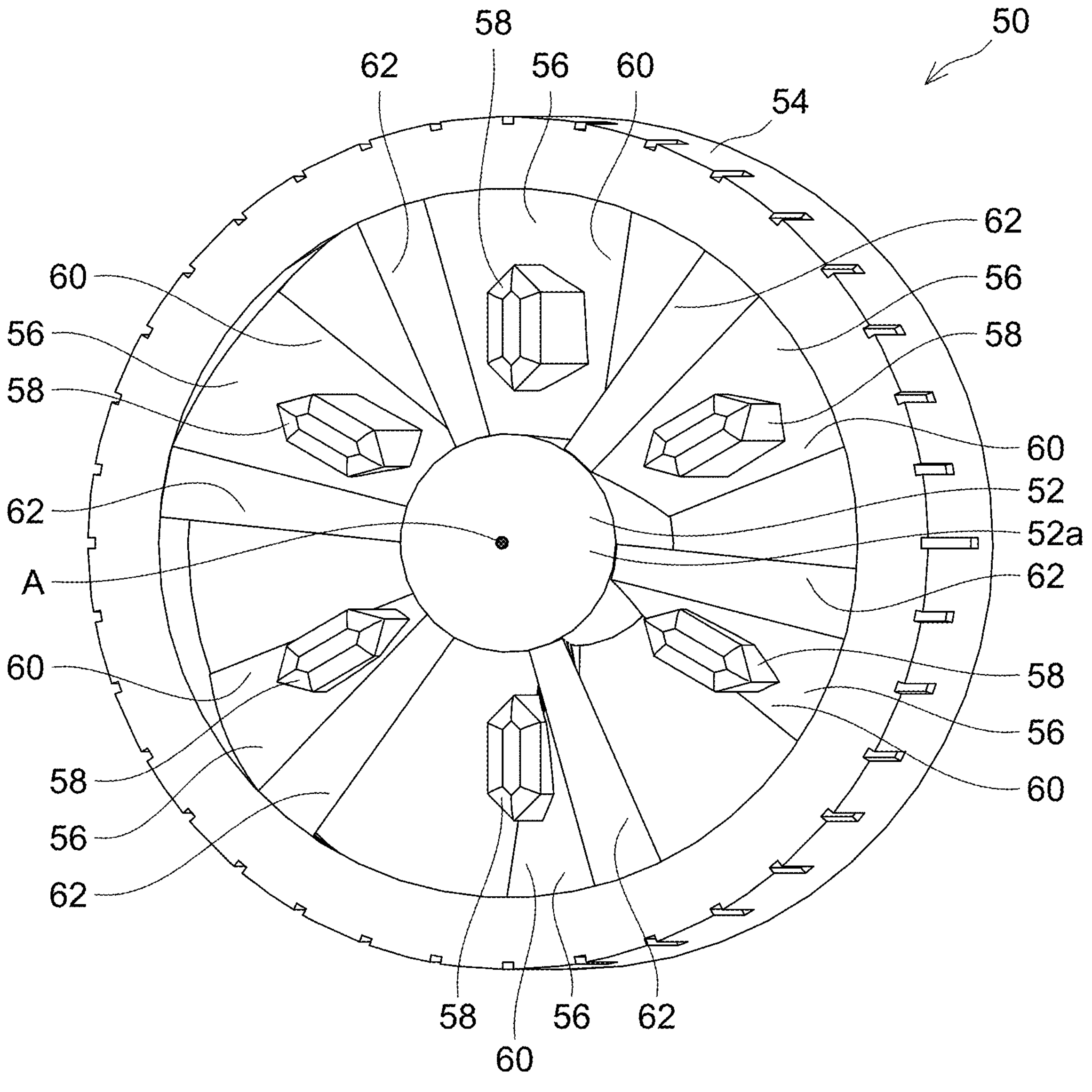
FIG. 7 illustrates a perspective view of the swirling flow generation portion 50 of the second fine bubble generation portion 22 according to the first example from the upstream side.

As shown in FIG. 6, the swirling flow generation portion 50 comprises a shaft portion 52, an outer peripheral portion 54 surrounding the shaft portion 52, and six vanes 56 disposed between the shaft portion 52 and the outer peripheral portion 54 and configured to generate a swirling flow which flows in the clockwise direction relative to the shaft portion 52. The shaft portion 52 has a columnar shape. The outer peripheral portion 54 has a cylindrical shape. As shown in FIG. 2, an outer diameter of the outer peripheral portion 54 is equal to an inner diameter of the body case 10. The shaft portion 52 and the outer peripheral portion 54 are arranged along the central axis A. Due to this, a central axis of the shaft portion 52 and a central axis of the outer peripheral portion 54 coincide with the central axis of the second fine bubble generation portion 22. As shown in FIG. 6, the vanes 56 connect an outer wall of the shaft portion 52 and an inner wall of the outer peripheral portion 54. As shown in FIG. 7, each of the vanes 56 is angled toward the downstream side as it extends farther in the clockwise direction. A projection 58 projecting upstream is disposed on a surface on the upstream side of each vane 56. When the swirling flow generation portion 50 is seen along the central axis A direction, the projection 58 has a hexagonal cross section. In a modification, the cross-sectional shape of the projection 58 may be round, fan-like, triangular, teardrop-like. Each vane 56 comprises an outlet-side end 60 on a clockwise direction side and an inlet-side end 62 on a counterclockwise direction side. As shown in FIG. 6, when the swirling flow generation portion 50 is seen along the central axis A direction, the swirling flow generation portion 50 comprises six first openings 64 (bold line of FIG. 6). Each of the six first openings 64 is surrounded by the outlet-side end 60 of one vane 56 of the six vanes 56, the inlet-side end 62 of an adjacent vane 56 in the clockwise direction to the one vane 56, the shaft portion 52, and the outer peripheral portion 54. Hereafter, the four swirling flow generation portions 50 may be referred to as "first swirling flow generation portion 50", "second swirling flow generation portion 50", "third swirling flow generation portion 50", and "fourth swirling flow generation portion 50" in an order aligned from upstream to downstream. For easier viewability in FIG. 3, numerals for the shaft portions 52, the outer peripheral portions 54, and the vanes 56 of the second to fourth swirling flow generation portions 50 are omitted.

Figure 8:
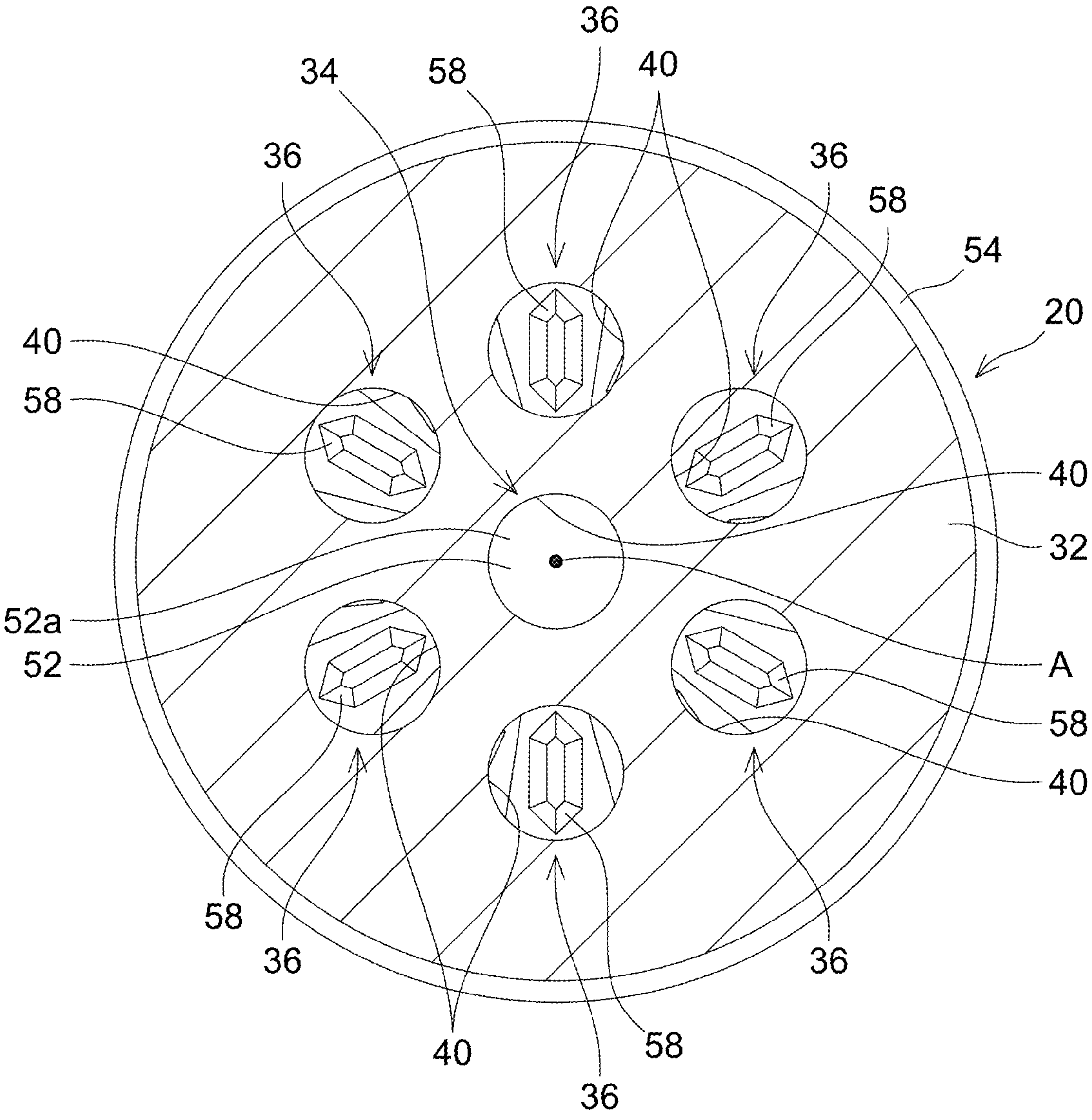
FIG. 8 illustrates a cross-sectional view taken along a VIII-VIII line of FIG. 2.

As shown in FIG. 8, in the first swirling flow generation portion 50 (i.e., the swirling flow generation portion 50 on the most upstream side), a downstream-side end of the diameter-increasing flow path 40 of each of the six outer venturi portions 36 of the first fine bubble generation portion 20 is arranged at a position facing the projection 58 disposed on a corresponding one of the six vanes 56 of the first swirling flow generation portion 50. In the first swirling flow generation portion 50, a downstream-side end of the diameter-increasing flow path 40 of the inner venturi portion 34 is arranged at a position facing the shaft portion 52 of the first swirling flow generation portion 50. An opening area of the downstream-side end of the diameter-increasing flow path 40 of the inner venturi portion 34 is smaller than an outline area of the upstream-side end 52*a* of the shaft portion 52 of the first swirling flow generation portion 50 when seen along the central axis A direction.

Figure 9:
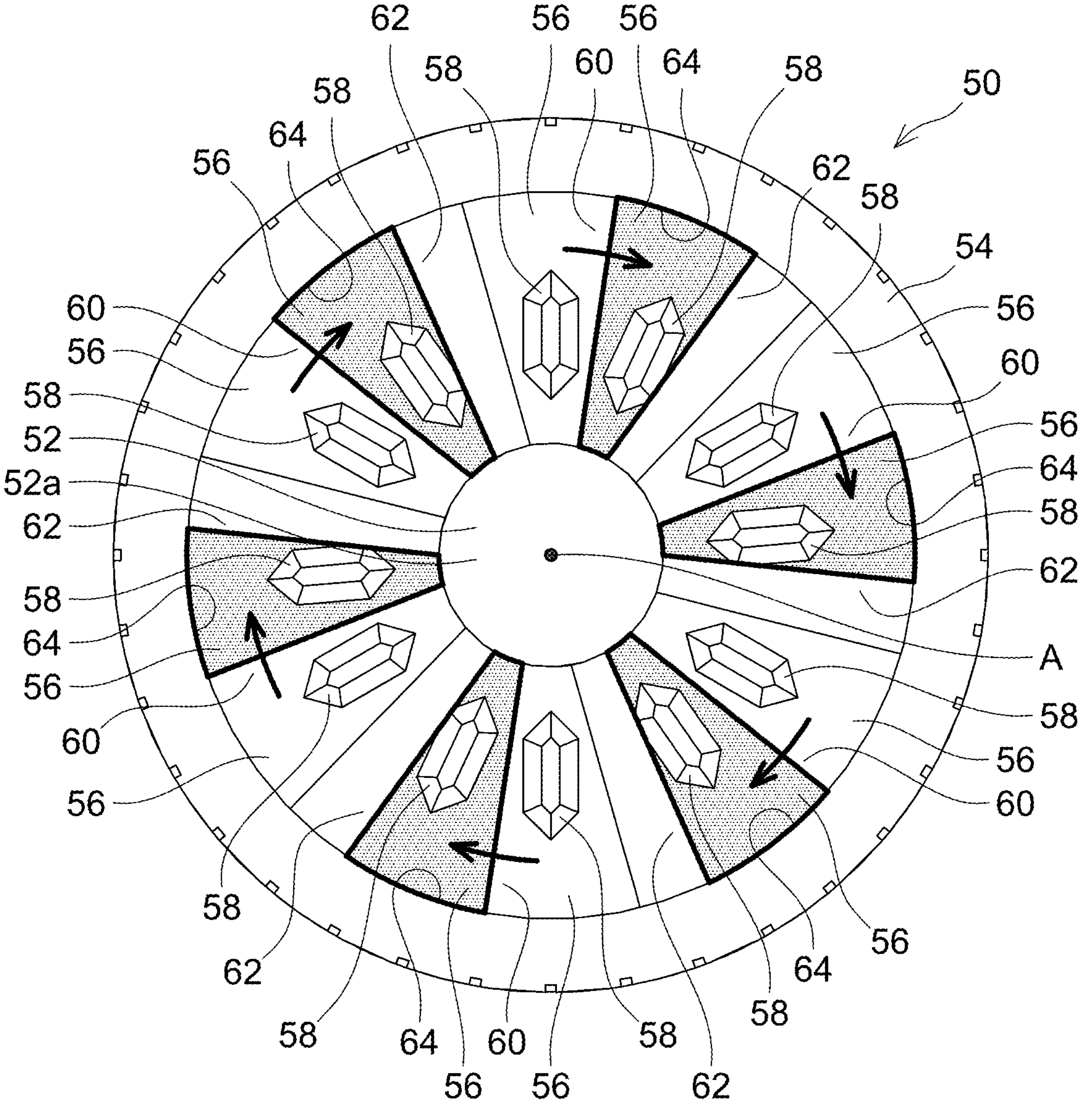
FIG. 9 illustrates the second fine bubble generation portion 22 according to the first example from the upstream side.

With reference to FIG. 9, a relationship between two swirling flow generation portions 50 adjacent to each other in the central axis A direction will be described. In FIG. 9, the first swirling flow generation portion 50 and the second swirling flow generation portion 50 adjacent to the first swirling flow generation portion 50 on the downstream side of the first swirling flow generation portion 50 are shown. In FIG. 9, for easier understanding, the six vanes 56 of the second swirling flow generation portion 50 are shown with shades. Also, each of the first openings 64 is surrounded by a bold line. The second swirling flow generation portion 50 is arranged such that when the swirling flow generation portion 50 is seen along the central axis A direction, each of the six vanes 56 of the second swirling flow generation portion 50 overlaps an entirety of a corresponding one of the six first openings 64 of the first swirling flow generation portion 50. That is, the four swirling flow generation portions 50 are arranged such that when the swirling flow generation portions 50 are seen along the central axis A direction, each of the six vanes 56 of the swirling flow generation portion 50 on the downstream side among the two adjacent swirling flow generation portions 50 in the central axis A direction overlaps an entirety of a corresponding one of the six first openings 64 of the swirling flow generation portion 50 on the upstream side among the two adjacent swirling flow generation portions 50.

Next, fine bubbles generated by the fine bubble generator 2 will be described. The fine bubble generator 2 generates fine bubbles by using water in which air is dissolved (hereafter, "air-dissolved water"). The air-dissolved water may be water supplied from a water supply source such as a public water supply system (so-called tap water), and also may be water generated by an air-dissolved water maker configured to dissolve air taken from outside into the water. Alternatively in a modification, instead of air, gas such as carbon dioxide, hydrogen, oxygen may be dissolved in water.

As shown in FIG. 2, air-dissolved water having flowed in the fine bubble generator 2 flows into the upstream-side flow path 42 in the first fine bubble generation portion 20 via the inlet port 12*a* of the inlet 12. The air-dissolved water flowing into the upstream-side flow path 42 flows into the inner venturi portion 34 and the outer venturi portions 36. The air-dissolved water flowing into the inner venturi portion 34 flows into the diameter-reducing flow path 38. A flow speed of the air-dissolved water flowing into the diameter-reducing flow path 38 increases as it flows through the diameter-reducing flow path 38, as a result of which its pressure is reduced. Bubbles are generated as a result of this pressure reduction of the gas-dissolved water. The air-dissolved water having flowed through the diameter-reducing flow path 38 flows into the diameter-increasing flow path 40. A flow speed of the air-dissolved water flowing into the diameter-increasing flow path 40 increases as it flows through the diameter-increasing flow path 40, as a result of which its pressure is increased. The pressure of the air-dissolved water in which the bubbles were generated by the pressure reduction is increased, by which the bubbles included in the air-dissolved water break into fine bubbles. The water having flowed in the diameter-increasing flow path 40 flows into the second fine bubble generation portion 22. As such, the fine bubbles are generated by the air-dissolved water flowing through the inner venturi portion 34. In regards to the air-dissolved water flowing in each of the outer venturi portions 36 also, the fine bubbles are generated by the air-dissolved water flowing in the outer venturi portions 36. The air-dissolved water having flowed through the upstream-side flow path 42 in the first fine bubble generation portion 20 flows into the second fine bubble generation portion 22.

The air-dissolved water flowing out of the first fine bubble generation portion 20 flows into the first swirling flow generation portion 50 on the most upstream side of the second fine bubble generation portion 22. As shown in FIG. 8, the air-dissolved water flowing out of the inner venturi portion 34 of the first fine bubble generation portion 20 collides with the upstream-side end 52*a* of the shaft portion 52 of the first swirling flow generation portion 50. The air-dissolved water collides with the upstream-side end 52*a*, by which the fine bubbles in the air-dissolved water break into finer bubbles, and thus the volume of the fine bubbles increases. Also, the air-dissolved water flowing out of the outer venturi portions 36 of the first fine bubble generation portion 20 collides with the projections 58 of the vanes 56 of the first swirling flow generation portion 50. The air-dissolved water collides with the projections 58, by which the fine bubbles in the air-dissolved water break into finer bubbles, and thus the volume of the fine bubbles increases. The air-dissolved water flows past the vanes 56 after colliding with the projections 58. The air-dissolved water flows past the vanes 56, by which the air-dissolved water becomes a swirling flow flowing in the clockwise direction. The fine bubbles in the air-dissolved water break into finer bubbles by a shearing force due to the swirling flow and thus the volume of the fine bubbles increases. As shown in FIG. 9, the air-dissolved water flowing out of the outlet-side ends 60 of the vanes 56 of the first swirling flow generation portion 50 flows into the vanes 56 of the second swirling flow generation portion 50. A part of the air-dissolved water flowing into the vanes 56 of the second swirling flow generation portion 50 collides with the projections 58 of the vanes 56 of the second swirling flow generation portion 50. The air-dissolved water flows continuously by both the vanes 56 of the first swirling flow generation portion 50 and the vanes 56 of the second swirling flow generation portion 50, by which the volume of the air-dissolved water sheared by the swirling flow increases. Due to this, the fine bubbles in the air-dissolved water becomes finer bubbles, and thus the volume of the fine bubbles increases. Thereafter, as shown in FIG. 2, the air-dissolved water flows through the third swirling flow generation portion 50 and the fourth swirling flow generation portion 50, the ones disposed downstream of the second swirling flow generation portion 50. By the air-dissolved water flowing through the four swirling flow generation portions 50 in total, the fine bubbles in the air-dissolved water are refined, and the fine bubbles are generated in larger volume. Then, the air-dissolved water flowing out of the second fine bubble generation portion 22 is discharged outside from the outlet port 14*a*.

As described above, as shown in FIG. 2, the fine bubble generator 2 comprises the inlet 12 into which the air-dissolved water (example of "gas-dissolved water") flows, the outlet 14 out of which the air-dissolved water flows, the first fine bubble generation portion 20 disposed between the inlet 12 and the outlet 14, and the second fine bubble generation portion 22 disposed between the first fine bubble generation portion 20 and the outlet 14. The first fine bubble generation portion 20 comprises the outer venturi portions 36 each of which includes the diameter-reducing flow path 38 and the diameter-increasing flow path 40 disposed downstream of the diameter-reducing flow path 38, wherein the diameter-reducing flow path 38 reduces its flow path diameter from upstream to downstream and the diameter-increasing flow path 40 increases its flow path diameter from upstream to downstream. The second fine bubble generation portion 22 comprises the four swirling flow generation portions 50 disposed along the central axis A direction. Each of the four swirling flow generation portions 50 comprises the shaft portion 52 extending along the central axis A direction, the outer peripheral portion 54 surrounding the shaft portion 52, and the six vanes 56 disposed between the shaft portion 52 and the outer peripheral portion 54 and configured to generate a swirling flow flowing in the clockwise direction (example of "predetermined swirling direction") with respect to the shaft portion 52. According to such configuration, the air-dissolved water flowing into the fine bubble generator 2 flows into the first fine bubble generation portion 20. A flow speed of the air-dissolved water flowing into the first fine bubble generation portion 20 increases as the air-dissolved water passes through the diameter-reducing flow path 38, as a result of which the pressure of the water decreases. Bubbles are generated as a result of this pressure reduction of the gas-dissolved water. Then, the pressure of the air-dissolved water is gradually increased as the gas-dissolved water flows through the diameter-increasing flow path 40. When the pressure of the air-dissolved water is increased after the bubbles were generated by the pressure reduction, the bubbles included in the air-dissolved water break up into fine bubbles. Next, the air-dissolved water having passed through the first fine bubble generation portion 20 flows into the swirling flow generation portions 50 of the second fine bubble generation portion 22. The air-dissolved water flowing into the swirling flow generation portions 50 becomes a swirling flow in the clockwise direction. The fine bubbles in the air-dissolved water become finer bubbles and the volume of fine bubbles is increased by shearing force by the swirling flow. A path in which the air-dissolved water flows as the swirling flow can be lengthened by the air-dissolved water flowing through the four swirling flow generation portions 50 as compared to a configuration in which the air-dissolved water flows through only one swirling flow generation portion 50. Due to this, the fine bubbles in the air-dissolved water are refined into finer bubbles, and a volume of the fine bubbles increases. Thus, the fine bubbles can be generated in large volume.

As shown in FIG. 6, in each of the six vanes 56 of the swirling flow generation portions 50, the outlet-side end 60 (example of "a swirling-direction-side end") of one vane 56 among the six vanes 56 is located more on the counterclockwise direction (example of "a reversed swirling direction") side than the inlet-side end 62 (example of "a reversed swirling direction-side end") of an adjacent vane 56 adjacent to the one vane 56 in the clockwise direction. When the swirling flow generation portions 50 are seen along the central axis A direction, each of the swirling flow generation portions 50 comprises the six first openings 64 (bold line part in FIG. 6). When the swirling flow generation portions 50 are seen along the central axis A direction, each of the six first openings 64 is surrounded by the outlet-side end 60 of the one vane 56, the inlet-side end 62 of the adjacent vane 56, the shaft portion 52, and the outer peripheral portion 54. As shown in FIG. 9, when the second fine bubble generation portion 22 is seen along the central axis A direction, each of the six vanes 56 of the second swirling flow generation portion 50 (example of "downstream-side swirling flow generation portion") among the four swirling flow generation portions 50 is located to overlap at least a part of a corresponding first opening 64 among the six first openings 64 of the first swirling flow generation portion 50 (example of "upstream-side swirling flow generation portion"). According to such configuration, the volume of the air-dissolved water flowing out of the first swirling flow generation portion 50 and through the second swirling flow generation portion 50 without flowing past the vanes 56 of the second swirling flow generation portion 50 can be reduced as compared to a configuration in which each of the six vanes 56 of the second swirling flow generation portion 50 does not overlap the corresponding one of the six first openings 64 of the first swirling flow generation portion 50. That is, the volume of the air-dissolved water reaching the vanes 56 of the second swirling flow generation portion 50 can be increased. Due to this, the volume of the air-dissolved water flowing as the swirling flow can be increased. Accordingly, the fine bubbles can be generated in larger volume.

In particular in the present example, when the second fine bubble generation portion 22 is seen along the central axis A direction, each of the six vanes 56 of the second swirling flow generation portion 50 overlaps an entirety of the corresponding first opening 64 among the six first openings 64 of the first swirling flow generation portion 50. According to the above configuration, a majority of the air-dissolved water flowing out of the first swirling flow generation portion 50 flows past the vanes 56 of the second swirling flow generation portion 50. Due to this, the volume of the gas-dissolved water flowing as the swirling flow can be increased. Accordingly, the fine bubbles can be generated in larger volume.

As shown in FIG. 8, the first fine bubble generation portion 20 comprises the six outer venturi portions 36 disposed around the central axis A. A number (i.e., six) of the outer venturi portions 36 is same as a number (i.e., six) of the vanes 56 of the first swirling flow generation portion 50 (example of "most-upstream-side swirling flow generation portion"). A downstream-side end of the diameter-increasing flow path 40 of each of the six outer venturi portions 36 faces a corresponding vane 56 among the six vanes 56 of the first swirling flow generation portion 50. According to such configuration, a majority of the air-dissolved water flowing out of the first fine bubble generation portion 20 flows past the vanes 56 of the first swirling flow generation portion 50. Due to this, the volume of the air-dissolved water flowing as the swirling flow can be increased. Accordingly, the fine bubbles can be generated in larger volume.

As shown in FIG. 8, the first fine bubble generation portion 20 further includes the inner venturi portion 34 extending along the central axis A. The downstream-side end of the diameter-increasing flow path 40 of the inner venturi portion 34 faces the shaft portion 52 of the first swirling flow generation portion 50. An opening area of the downstream-side end of the diameter-increasing flow path 40 of the inner venturi portion 34 is smaller than an area of the shaft portion 52 of the first swirling flow generation portion 50, the area of the shaft portion 52 being of when the shaft portion 52 is seen along the central axis A direction. According to such configuration, a greater volume of the air-dissolved water flowing out of the inner venturi portion 34 can be allowed to collide with the shaft portion 52 of the first swirling flow generation portion 50 as compared to a configuration in which the opening area of the downstream-side end of the diameter-increasing flow path 40 of the inner venturi portion 34 is larger than the area of the shaft portion 52 of the first swirling flow generation portion 50. By the air-dissolved water colliding with the shaft portion 52, the fine bubbles in the air-dissolved water are refined into finer bubbles, and the volume of the fine bubbles increases. Thus, the fine bubbles can be generated in larger volume. The volume of the air-dissolved water which flows through the first openings 64 without colliding with the shaft portion 52 of the first swirling flow generation portion 50 and then flows out of the first swirling flow generation portion can be reduced more as compared to the configuration in which the opening area of the downstream-side end of the diameter-increasing flow path 40 of the inner venturi portion 34 is larger than the area of the shaft portion 52 of the first swirling flow generation portion 50. That is, the volume of the air-dissolved water colliding with the shaft portion 52 of the first swirling flow generation portion 50 can be increased. Thus, the fine bubbles can be generated in larger volume.

As shown in FIG. 8, the opening area of the downstream-side end of the diameter-increasing flow path 40 of the inner venturi portion 34 is smaller than the outline area of the upstream-side end 52*a* of the shaft portion 52 of the first swirling flow generation portion 50, the outline area of the upstream-side end 52*a* of the shaft portion 52 being of when the shaft portion 52 is seen along the central axis A direction. A part of the air-dissolved water flowing out of the inner venturi portion 34 may flow toward the outside of the shaft portion 52 of the first swirling flow generation portion 50. According to the above configuration, the volume of the air-dissolved water colliding with the shaft portion 52 (upstream-side end 52*a* in particular) of the first swirling flow generation portion 50 can be increased. Thus, the fine bubbles can be generated in larger volume.

As shown in FIG. 6, the projection 58 projecting upstream is disposed on the upstream-side surface of each of the six vanes 56. According to such configuration, the air-dissolved water flowing by the six vanes 56 collides with the projections 58. By the air-dissolved water colliding with the projections 58, the fine bubbles in the air-dissolved water break into finer bubbles and the volume of fine bubbles increases. Accordingly, the fine bubbles can be generated in larger volume.

As shown in FIG. 8, the downstream-side end of the diameter-increasing flow path 40 of each of the six outer venturi portions 36 faces the projection 58 of a corresponding vane 56 of the six vanes 56 of the first swirling flow generation portion 50. According to such configuration, the air-dissolved water flowing out of the outer venturi portions 36 can be allowed to surely collide with the projections 58. Accordingly, the fine bubbles can be generated in larger volume.

Second Embodiment

Figure 10:
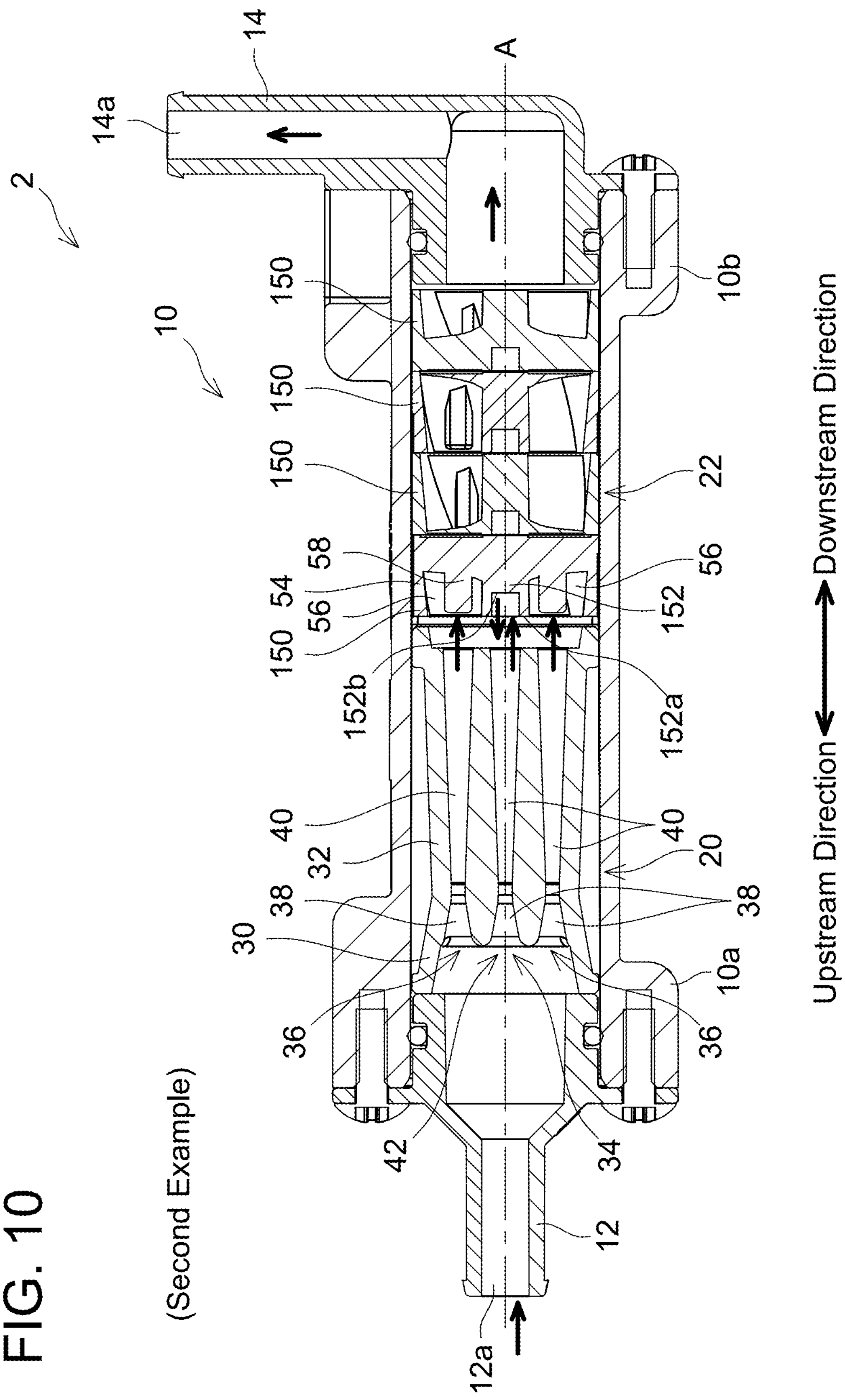
FIG. 10 illustrates a cross-sectional view of a fine bubble generator 2 according to a second example.

With reference to FIG. 10, a fine bubble generator 2 according to a second example will be described. Hereafter, features common between examples will be given the same numerals, and thus description thereof will be omitted.

In the fine bubble generator 2 of the present example, a structure of four swirling flow generation portions 150 differs from the structure of the four swirling flow generation portions 50 (see FIG. 2) of the first example. In particular, a structure of a shaft portion 152 differs from the structure of the shaft portion 52 (see FIG. 2) of the first example. A recess 152*b* recessed downstream is disposed at an upstream-side end 152*a* of the shaft portion 152. The recess 152*b* has a shape corresponding to a columnar shape. A diameter of the recess 152*b* is substantially equal to a flow path diameter of a downstream-side end of the inner venturi portion 34. Alternatively in a modification, the diameter of the recess 152*b* may be larger or may be smaller than the flow path diameter of the downstream-side end of the inner venturi portion 34.

As described above, as shown in FIG. 10, the recess 152*b* recessed downstream is disposed at the upstream-side end 152*a* of the shaft portion 152 of the first swirling flow generation portion 150. According to such configuration, the air-dissolved water flowing out of the inner venturi portion 34 collides with the recess 152*b*. Then, the air-dissolved water having collided with the recess 152*b* flows toward the inner venturi portion 34. In this case, the air-dissolved water flowing out of the inner venturi portion 34 and the air-dissolved water having collided with the recess 152*b* and flowing toward the inner venturi portion 34 collide with each other. By the air-dissolved water colliding with each other, the fine bubbles in the air-dissolved water break into finer bubbles and the volume of fine bubbles increases. Accordingly, the fine bubbles can be generated in larger volume.

Third Example

Figure 11:
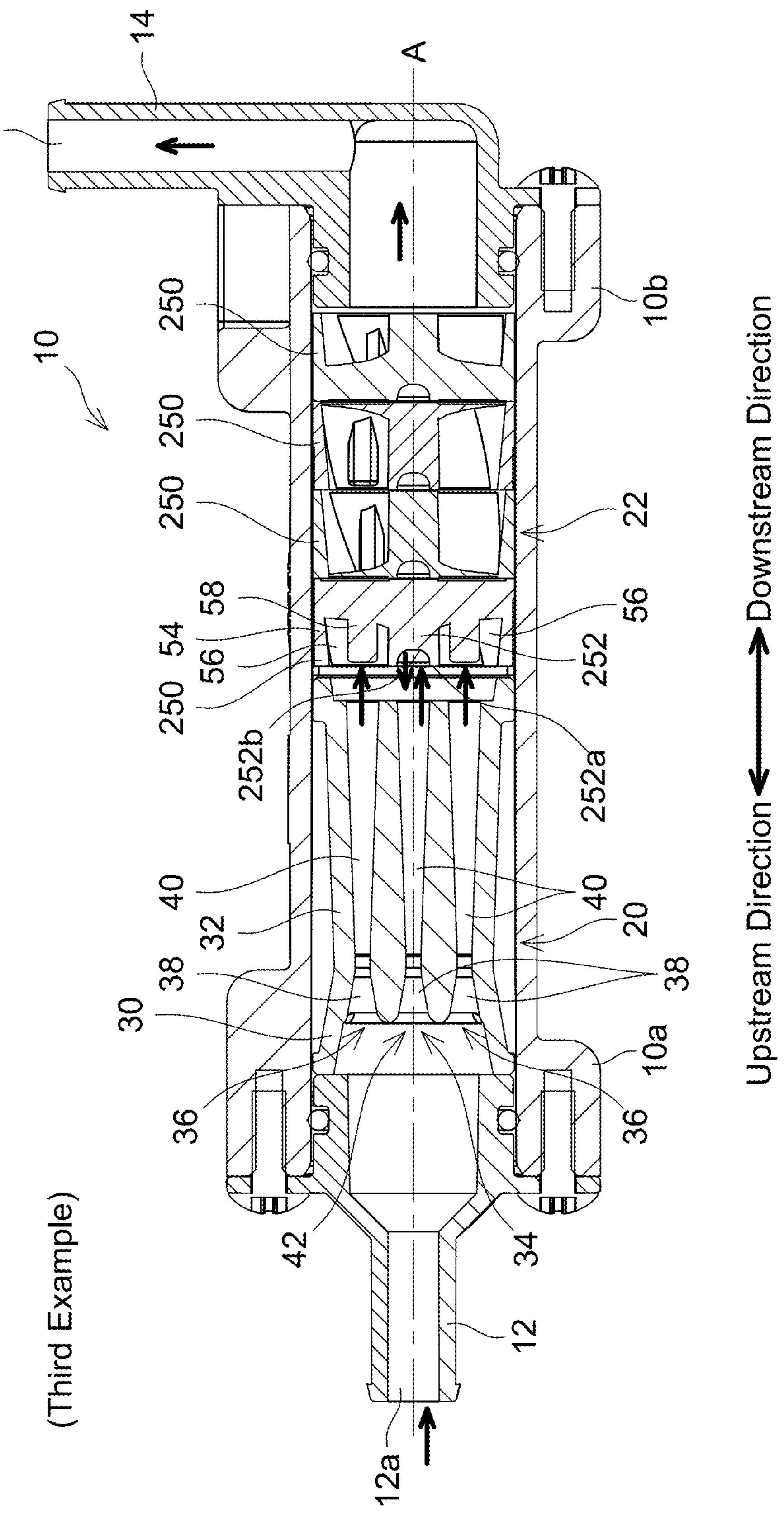
FIG. 11 illustrates a cross-sectional view of a fine bubble generator 2 according to a third example.

With reference to FIG. 11, a fine bubble generator 2 according to a third example will be described. In the fine bubble generator 2 of the present example, a structure of four swirling flow generation portions 250 differs from the structure of the four swirling flow generation portions 150 (see FIG. 10) of the second example. In particular, a structure of a shaft portion 252 differs from the structure of the shaft portion 152 (see FIG. 10) of the second example. A recess 252*b* recessed downstream is disposed at an upstream-side end 252*a* of the shaft portion 252. The recess 252*b* has a shape corresponding to a hemisphere shape. According to such configuration, similar to the configuration of the second example, fine bubbles can be generated in larger volume by air-dissolved water colliding with each other. Also, as compared to the configuration of the second example, the air-dissolved water flowing through the recess 252*b* can be suppressed from remaining there.

Fourth Example

With reference to FIGS. 12 to 17, a fine bubble generator 2 according to a fourth example will be described. In the fine bubble generator 2 of the present example, a structure of four swirling flow generation portions 350 differs from the structure of the four swirling flow generation portions 50 (see FIG. 2) of the first example.

Figure 12:
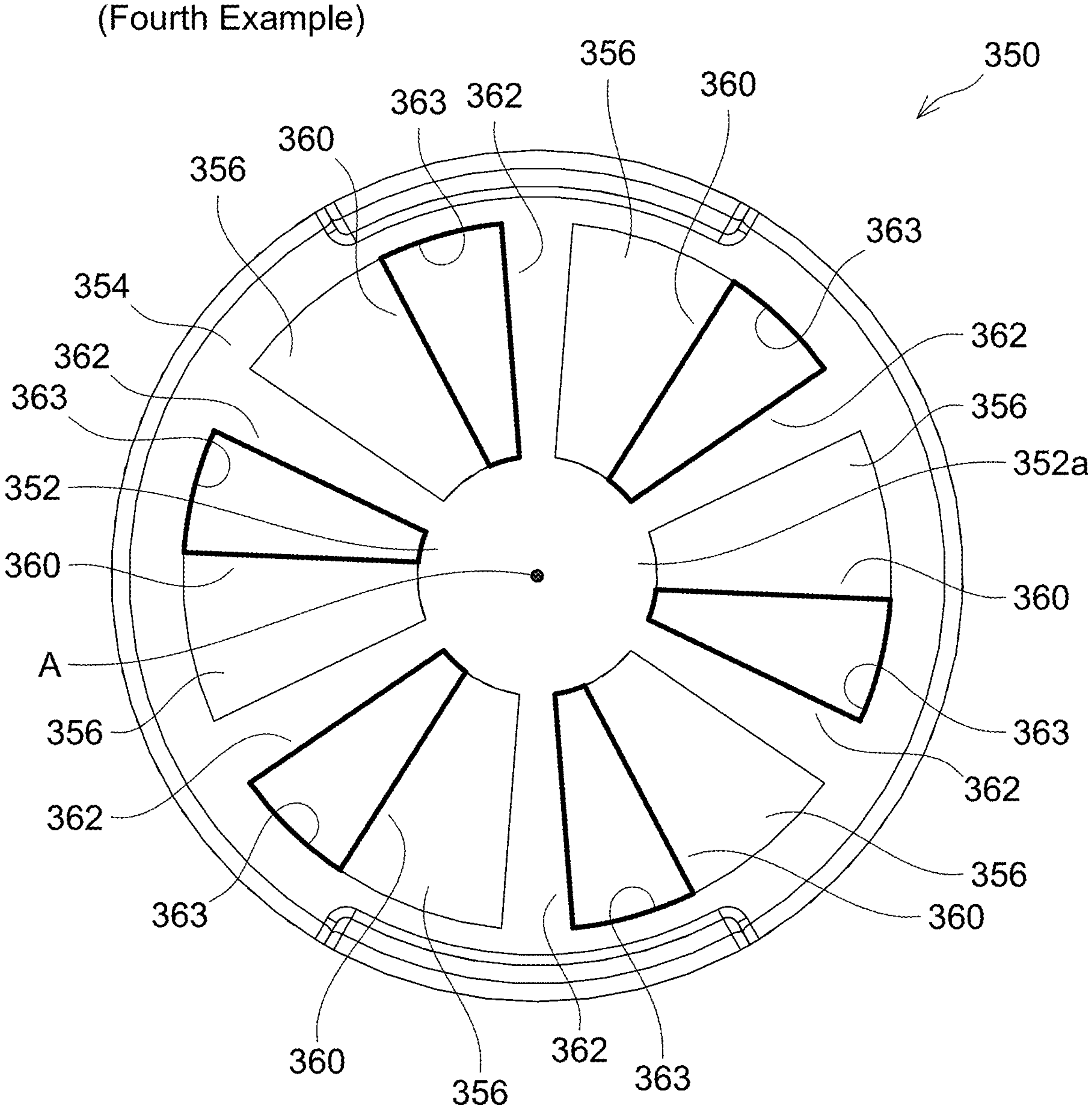
FIG. 12 illustrates a swirling flow generation portion 350 of a second fine bubble generation portion 22 according to a fourth example from the upstream side.
Figure 13:
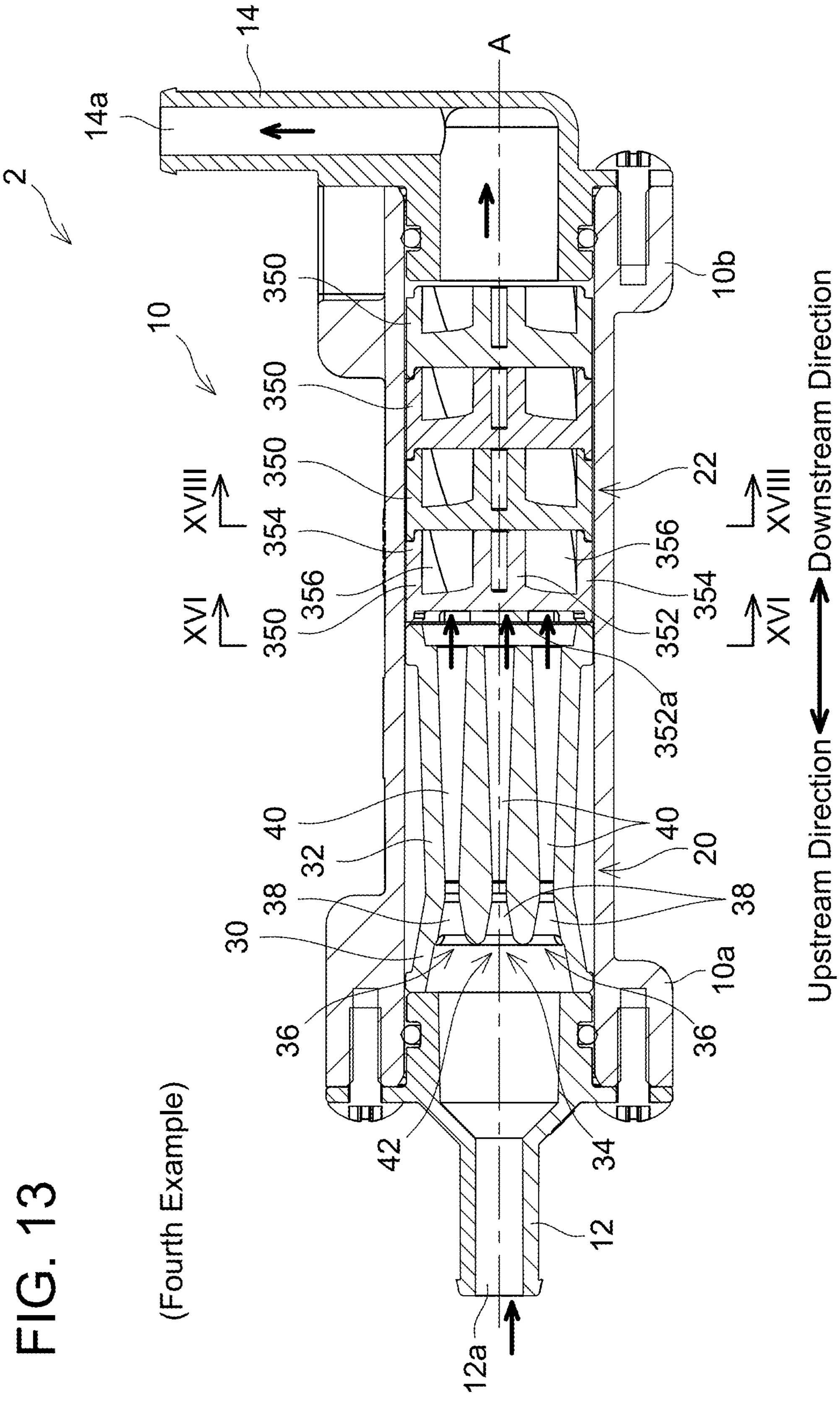
FIG. 13 illustrates a cross-sectional view of a fine bubble generator 2 according to the fourth example.
Figure 14:
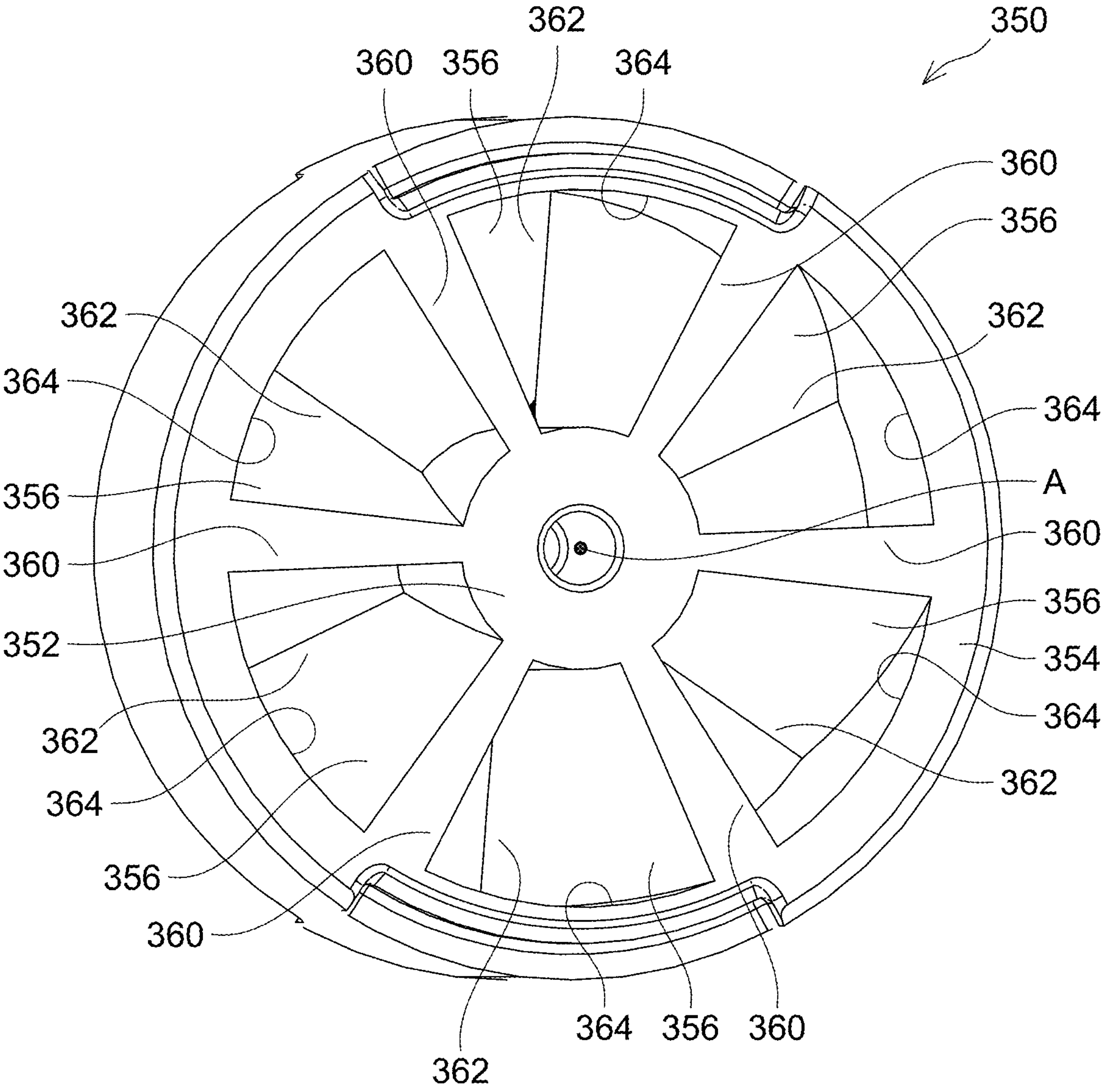
FIG. 14 illustrates a perspective view of the swirling flow generation portion 350 of the second fine bubble generation portion 22 according to the fourth example from the downstream side.
Figure 15:
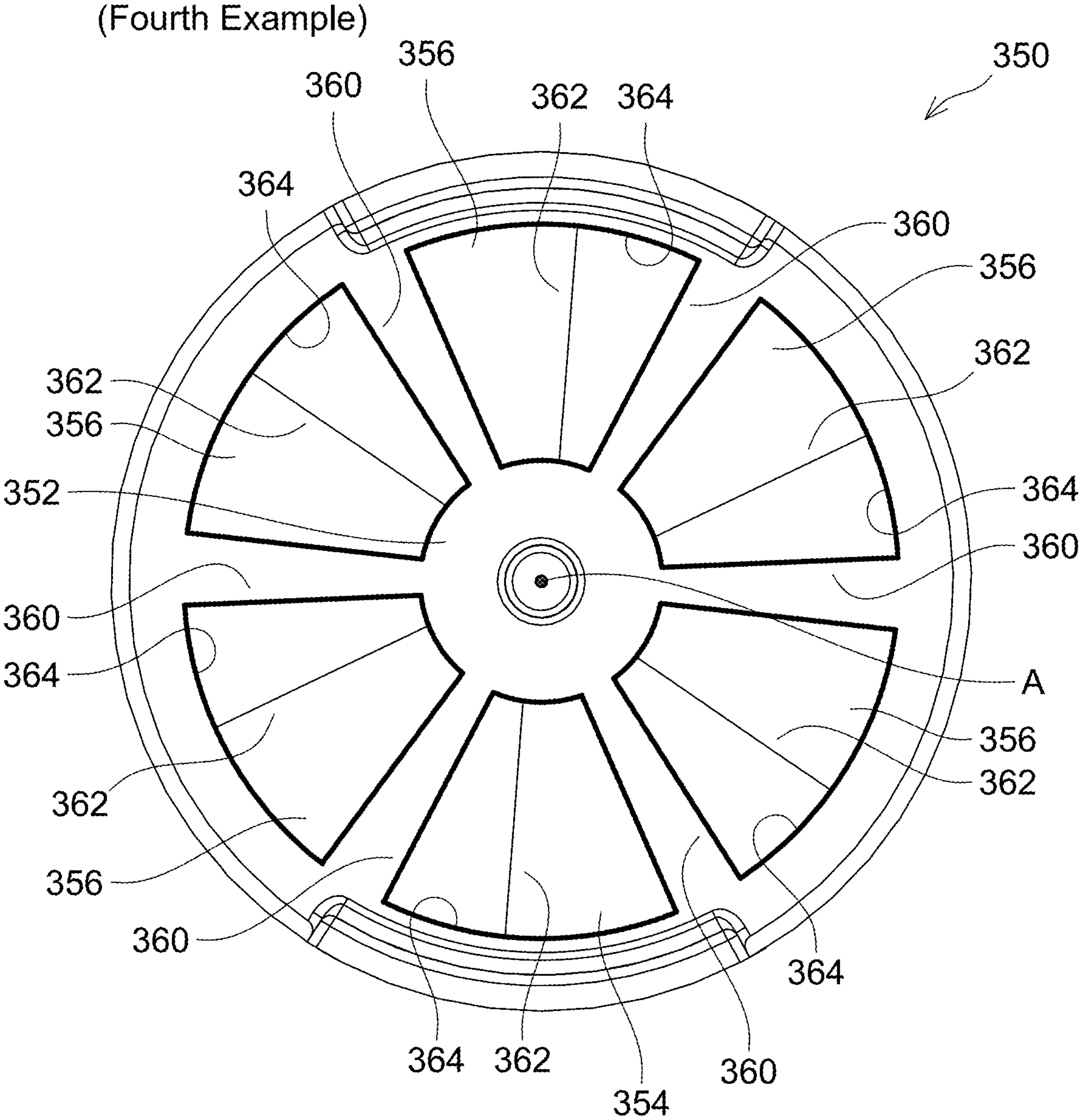
FIG. 15 illustrates the swirling flow generation portion 350 of the second fine bubble generation portion 22 according to the fourth example from the downstream side.

As shown in FIG. 12, each of the swirling flow generation portions 350 comprises a shaft portion 352, an outer peripheral portion 354 surrounding the shaft portion 352, and six vanes 356. The shaft portion 352 has a columnar shape. The outer peripheral portion 354 has a cylindrical portion. As shown in FIG. 13, an outer diameter of the outer peripheral portion 354 is equal to an inner diameter of the body case 10. The shaft portion 352 and the outer peripheral portion 354 are disposed along the central axis A. The vanes 356 connect an outer wall of the shaft portion 352 and an inner wall of the outer peripheral portion 354. Each of the vanes 356 is angled toward the downstream side as it extends farther in the clockwise direction. As shown in FIG. 12, each of the vanes 356 comprises an outlet-side end 360 on the clockwise direction side and an inlet-side end 362 on the counterclockwise direction side. When each swirling flow generation portion 350 is seen along the central axis A direction, the swirling flow generation portion 350 comprises six first openings 363 (bold line parts in FIG. 12). Each of the six first openings 363 is surrounded by the outlet-side end 360 of one vane 356 of the six vanes 356, the inlet-side end 362 of one vane 356 adjacent to the one vane 356 in the clockwise direction, the shaft portion 352, and the outer peripheral portion 354. As shown in FIG. 14, six second openings 364 are disposed at a downstream-side end of the swirling flow generation portion 350. As shown by bold line parts of FIG. 15, each of the six second openings 364 is surrounded by the outlet-side end 360 of one vane 356 of the six vanes 356, the outlet-side end 360 of one vane 356 adjacent to the one vane 356 in the clockwise direction, the shaft portion 352, and the outer peripheral portion 354.

Figure 16:
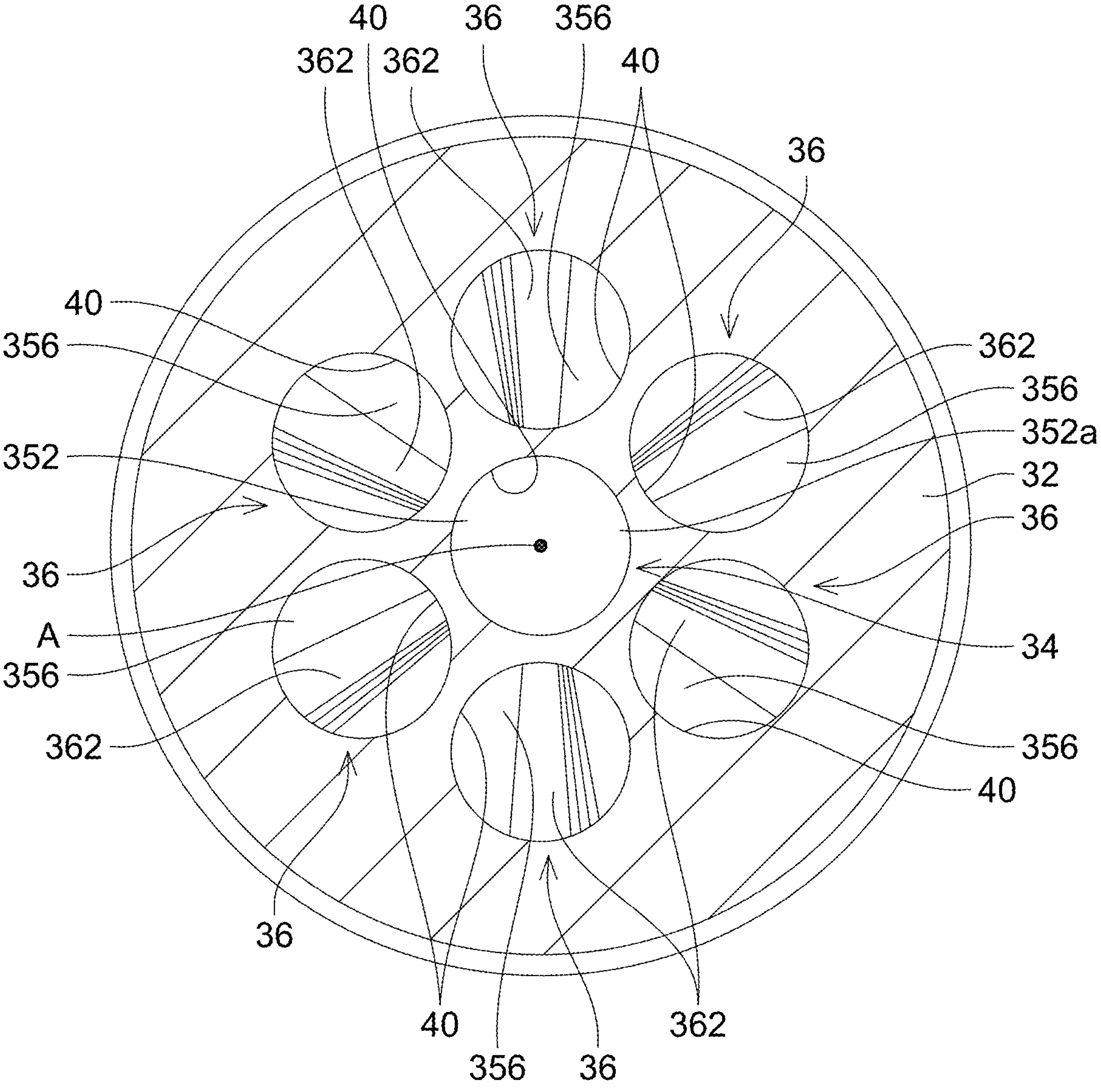
FIG. 16 illustrates a cross-sectional view taken along a XIV-XIV line of FIG. 13.

As shown in FIG. 16, in a first swirling flow generation portion 350 (i.e., most upstream-side swirling flow generation portion 350), a downstream-side end of the diameter-increasing flow path 40 of each of the six outer venturi portions 36 is arranged at a position facing the inlet-side end 362 of the corresponding vane 356 of the plurality of vanes 356 of the first swirling flow generation portion 350. Also, in the first swirling flow generation portion 350, a downstream-side end of the diameter-increasing flow path 40 of the inner venturi portion 34 is arranged at a position facing the shaft portion 352 of the first swirling flow generation portion 350. An opening area of the downstream-side end of the diameter-increasing flow path 40 of the inner venturi portion 34 is smaller than an outline area of an upstream-side end 352*a* of the shaft portion 352 of the first swirling flow generation portion 350 when seen along the central axis A direction.

Figure 17:
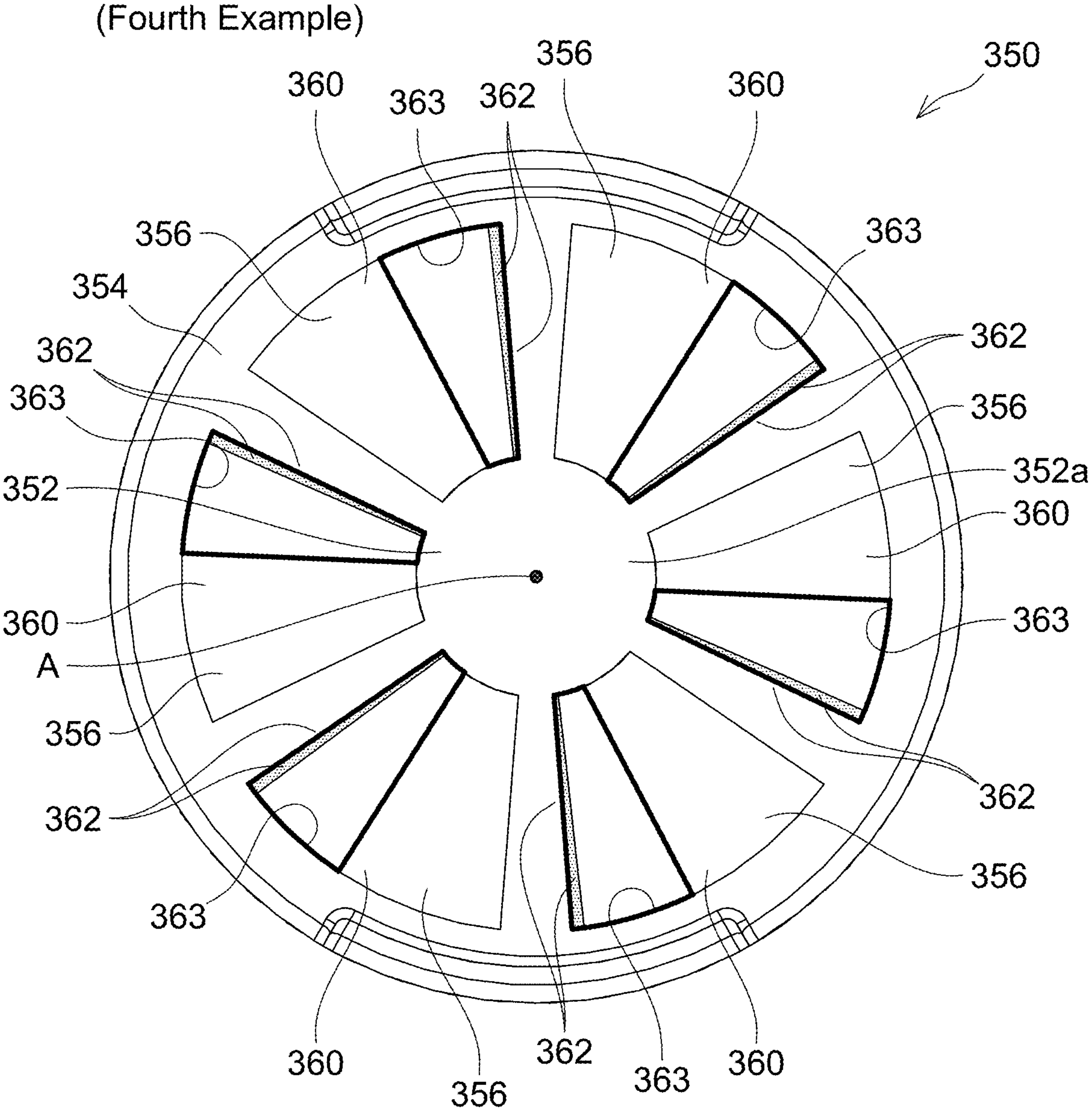
FIG. 17 illustrates the second fine bubble generation portion 22 according to the fourth example from the upstream side.
Figure 18:
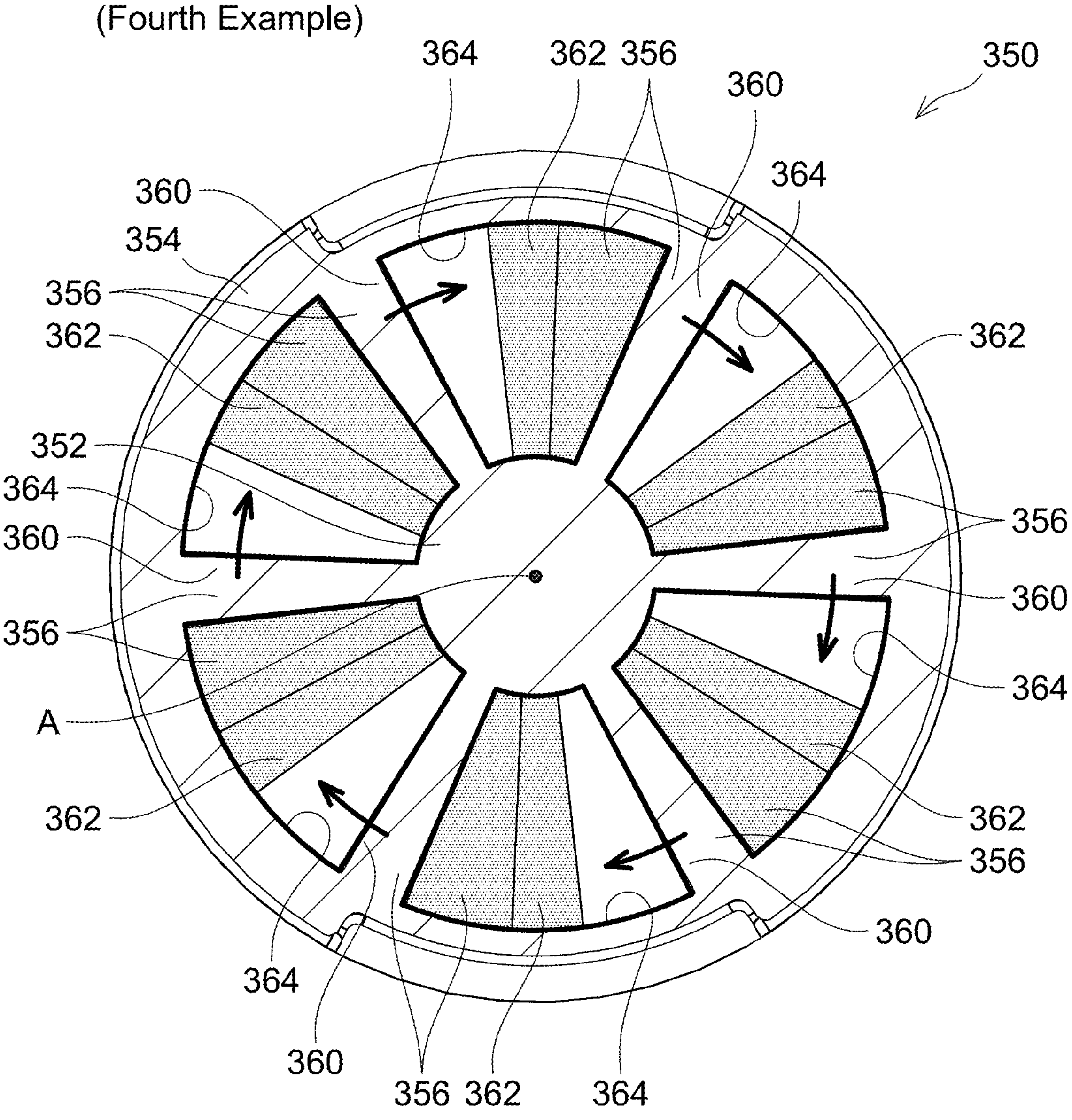
FIG. 18 illustrates a cross-sectional view taken along a XVIII-XVIII line of FIG. 13.

With reference to FIGS. 17 and 18, a relation between two adjacent swirling flow generation portions 350 in the central axis A direction will be described. In FIGS. 17 and 18, the first swirling flow generation portion 350 and a second swirling flow generation portion 350 are shown. In FIGS. 17 and 18, for easier understanding, the six vanes 356 of the second swirling flow generation portion 350 are shown with shades. As shown in FIG. 17, the second swirling flow generation portion 350 is arranged such that, when the swirling flow generation portions 350 are seen along the central axis A direction, a part of each of the six vanes 356 of the second swirling flow generation portion 350 (more specifically, a part of the inlet-side end 362) overlaps a corresponding first opening 363 of the six first openings 363 of the first swirling flow generation portion 350. That is, when the swirling flow generation portions 350 are seen along the central axis A direction, the vanes 356 of the second swirling flow generation portion 350 and the vanes 356 of the first swirling flow generation portion 350 do not entirely overlap with each other. As shown in FIG. 18, the second swirling flow generation portion 350 is arranged such that, when the swirling flow generation portions 350 are seen along the central axis A direction, the inlet-side end 362 of each of the plurality of vanes 356 of the second swirling flow generation portion 350 is located at or in proximity to a central portion in the clockwise direction of the corresponding second opening 364 of the plurality of second openings 364 (bold line parts of FIG. 18) of the first swirling flow generation portion 350. In other words, the second swirling flow generation portion 350 is arranged such that, when the swirling flow generation portions 350 are seen along the central axis A direction, the inlet-side end 362 of each of the plurality of vanes 356 of the second swirling flow generation portion 350 is located at or in proximity to a central portion in the clockwise direction between the outlet-side end 360 of one vane 356 of the plurality of vanes 356 of the first swirling flow generation portion 350 and the outlet-side end 360 of the adjacent vane 356 to the one vane 356.

Next, fine bubbles generated by the fine bubble generator 2 of the present example will be described. A flow of the air-dissolved water flowing through the first fine bubble generation portion 20 is the same as that of the first example. Due to this, hereafter, a flow of the air-dissolved water flowing through the second fine bubble generation portion 22 of the present example will be described.

As shown in FIG. 13, the air-dissolved water flowing out of the first fine bubble generation portion 20 flows into the first swirling flow generation portion 350 on the most upstream side in the second fine bubble generation portion 22. As shown in FIG. 16, the air-dissolved water flowing out of the inner venturi portion 34 of the first fine bubble generation portion 20 collides with the upstream-side end 352*a* of the shaft portion 352 of the first swirling flow generation portion 350. Due to this, the fine bubbles in the air-dissolved water break into finer bubbles, and thus the volume of the fine bubbles increases. Further, the air-dissolved water flowing out of the outer venturi portions 36 of the first fine bubble generation portion 20 flows toward the inlet-side ends 362 of the vanes 356 of the first swirling flow generation portion 350. A part of the air-dissolved water flowing out of the outer venturi portions 36 collides with the inlet-side ends 362 of the vanes 356 of the first swirling flow generation portion 350. Due to this, the fine bubbles in the air-dissolved water break into finer bubbles, and thus the volume of the fine bubbles increases. In a part of the air-dissolved water flowing out of the outer venturi portions 36, the fine bubbles in the air-dissolved water are sheared when the part of the air-dissolved water flows near the inlet-side ends 362 of the vanes 356 of the first swirling flow generation portion 350. Due to this, the fine bubbles in the air-dissolved water break into finer bubbles, and thus the volume of the fine bubbles increases. The part of the air-dissolved water then flows past the vanes 356 of the first swirling flow generation portion 350. The air-dissolved water flows past the vanes 356, by which the air-dissolved water becomes a swirling flow flowing in the clockwise direction. The fine bubbles in the air-dissolved water break into finer bubbles by a shearing force due to the swirling flow and thus the volume of the fine bubbles increases. Then, the air-dissolved water flowing out of the first swirling flow generation portion 350 flows into the second swirling flow generation portion 350. As shown in FIG. 18, a part of the air-dissolved water flowing out of the outlet-side ends 360 of the vanes 356 of the first swirling flow generation portion 350 collides with the inlet-side ends 362 of the vanes 356 of the second swirling flow generation portion 350. Due to this, the fine bubbles in the air-dissolved water break into finer bubbles, and thus the volume of the fine bubbles increases. Further, in a part of the air-dissolved water flowing out of the outlet-side ends 360 of the vanes 356 of the first swirling flow generation portion 350, the fine bubbles in the air-dissolved water are sheared when the water flows near the inlet-side ends 362 of the vanes 356 of the second swirling flow generation portion 350. Due to this, the fine bubbles in the air-dissolved water break into finer bubbles, and thus the volume of the fine bubbles increases. Then, a part of the air-dissolved water flows past the vanes 356 of the second swirling flow generation portion 350. Thereafter, the air-dissolved water flows through the third swirling flow generation portion 350 and the fourth swirling flow generation portion 350 that are disposed downstream of the second swirling flow generation portion 350. By the air-dissolved water flowing through the four swirling flow generation portions 350 in total, the fine bubbles in the air-dissolved water are refined, and a large volume of fine bubbles is generated. Then, as shown in FIG. 13, the air-dissolved water flowing out of the second fine bubble generation portion 22 is discharged outside from the outlet port 14*a*.

As described above, as shown in FIG. 15, the six second openings 364 are disposed at the downstream-side end of each of the swirling flow generation portions 350. Each of the six second openings 364 is surrounded by the outlet-side end 360 of one vane 356 of the six vanes 356, the outlet-side end 360 of a vane 356 adjacent to the one vane 356, the shaft portion 352, and the outer peripheral portion 354. As shown in FIG. 18, when the second fine bubble generation portion 22 is seen along the central axis A direction, the inlet-side end 362 of each of the plurality of vanes 356 of the second swirling flow generation portion 350 is disposed in proximity to a central portion in the clockwise direction of a corresponding second opening 364 of the six second openings 364. According to the above configuration, a part of the air-dissolved water flowing out of the first swirling flow generation portion 350 collides with the inlet-side ends 362 of the vanes 356 of the second swirling flow generation portion 350. The air-dissolved water collides with the inlet-side ends 362 of the vanes 356 of the second swirling flow generation portion 350, by which the fine bubbles in the air-dissolved water break into finer bubbles and the volume of fine bubbles increases. Further, a part of the air-dissolved water flowing out of the first swirling flow generation portion 350 is sheared when it flows past the inlet-side ends 362 of the vanes 356 of the second swirling flow generation portion 350. When the air-dissolved water is sheared, the fine bubbles in the air-dissolved water are refined into finer bubbles and the volume of the fine bubbles increases. Accordingly, the fine bubbles can be generated in larger volume.

As shown in FIG. 16, the first fine bubble generation portion 20 comprises the six outer venturi portions 36 disposed around the central axis A. The number (that is six) of the outer venturi portions 36 is same as the number (that is six) of the vanes 356 of the first swirling flow generation portion 350 (example of "most-upstream-side swirling flow generation portion"). The downstream-side end of the diameter-increasing flow path 40 of each of the six outer venturi portions 36 faces the inlet-side end 362 of a corresponding vane 356 of the six vanes 356 of the first swirling flow generation portion 350. According to the above configuration, a part of the air-dissolved water flowing out of the first fine bubble generation portion 20 collides with the inlet-side ends 362 of the vanes 356 of the first swirling flow generation portion 350. By the air-dissolved water colliding with the inlet-side ends 362 of the vanes 356 of the first swirling flow generation portion 350, the fine bubbles in the air-dissolved water break into finer bubbles and thus the volume of fine bubbles increases. Further, a part of the air-dissolved water flowing out of the first fine bubble generation portion 20 is sheared when the air-dissolved water flows past the inlet-side ends 362 of the vanes 356 of the first swirling flow generation portion 350. When the air-dissolved water is sheared, the fine bubbles in the air-dissolved water are refined into finer bubbles and the volume of the fine bubbles increases. Accordingly, the fine bubbles can be generated in larger volume.

Hereafter, advantageous embodiments using the fine bubble generator 2 in the first to fourth embodiments will be described.

First Embodiment; Configuration of Hot Water Supply System 402 Using Fine Bubble Generator 2

Figure 19:
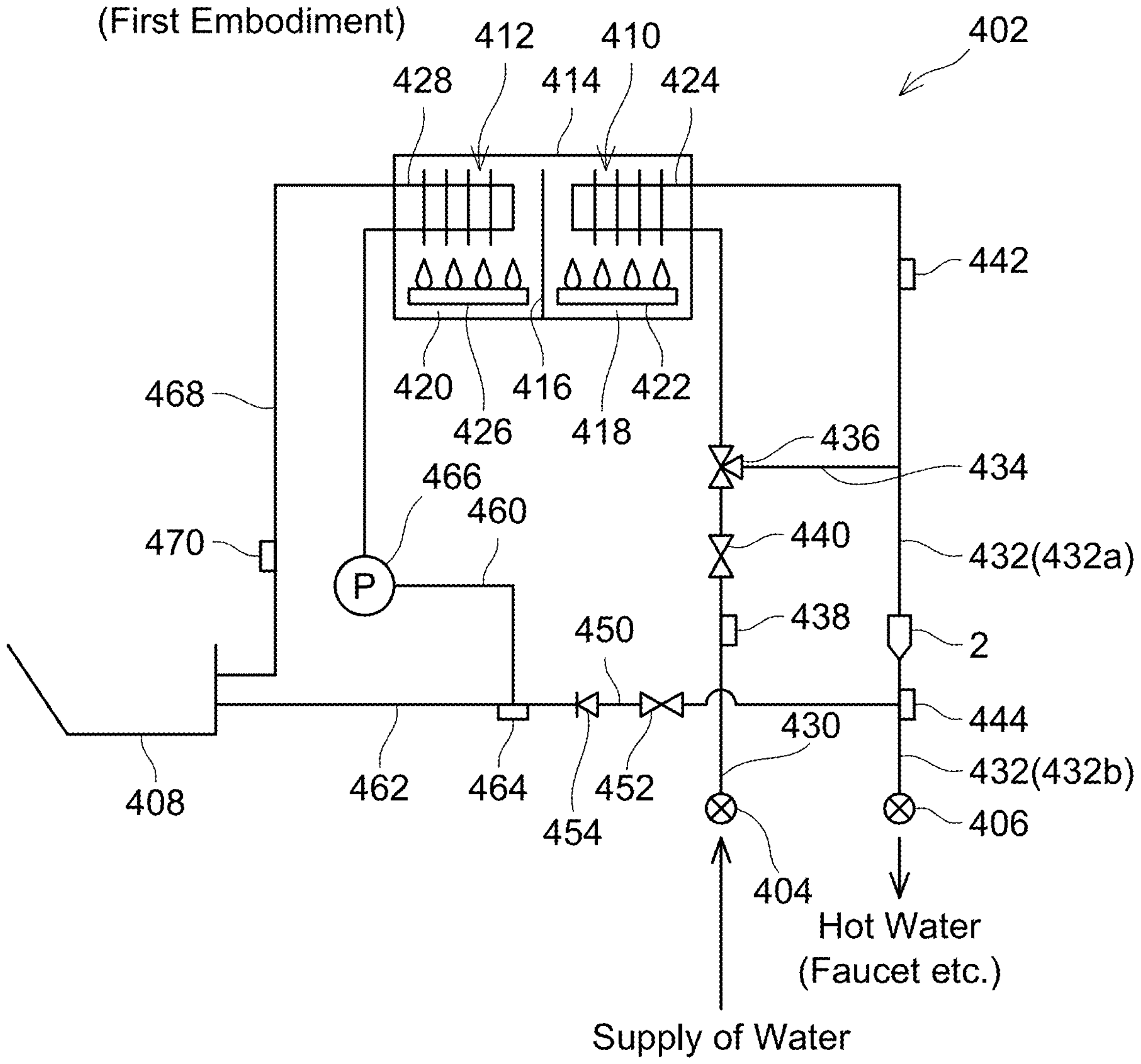
FIG. 19 schematically illustrates a configuration of a hot water supply system 402 according to a first embodiment.

A hot water supply system 402 shown in FIG. 19 is configured to heat water supplied from a water source 404 such as a public tap water system and deliver the water heated to a desired temperature to a faucet 406 installed in a kitchen and/or a bathtub 408 installed in a bathroom. Further, the hot water supply system 402 is configured capable of reheating the water in the bathtub 408.

The hot water supply system 402 includes a first heating device 410, a second heating device 412, and a burner chamber 414. The first heating device 410 is a heating device used to supply hot water to the faucet 406 and the bathtub 408. The second heating device 412 is a heating device used to reheat the water in the bathtub 408. Inside of the burner chamber 414 is partitioned into a first burner chamber 418 and a second burner chamber 420 by a partitioning wall 416. The first heating device 410 is housed in the first burner chamber 418 and the second heating device 412 is housed in the second burner chamber 420.

The first heating device 410 includes a first burner 422 and a first heat exchanger 424. The second heating device 412 includes a second burner 426 and a second heat exchanger 428.

An upstream-side end of the first heat exchanger 424 of the first heating device 410 is connected to a downstream-side end of a water supply passage 430. Water from the water source 404 is supplied to an upstream-side end of the water supply passage 430. A downstream-side end of the first heat exchanger 424 is connected to an upstream-side end of a hot water supply passage 432. The water supply passage 430 and the hot water supply passage 432 are connected by a bypass passage 434. A bypass servo valve 436 is disposed at a connection between the water supply passage 430 and the bypass passage 434. The bypass servo valve 436 is configured to adjust ratios of a flow rate of the water sent from the water supply passage 430 to the first heating device 410 and a flow rate of the water sent from the water supply passage 430 to the bypass passage 434. Low-temperature water delivered through the water supply passage 430 and the bypass passage 434 is mixed with high-temperature water delivered through the water supply passage 430, the first heating device 410, and the hot water supply passage 432 at a connection between the bypass passage 434 and the hot water supply passage 432. A water flow metering sensor 438 and a water flow servo valve 440 are disposed on the water supply passage 430 upstream of the bypass servo valve 436. The water flow metering sensor 438 is configured to detect a flow rate of the water that flows in the water supply passage 430. The water flow servo valve 440 is configured to adjust the flow rate of the water that flows in the water supply passage 430. A heat exchanger outlet thermistor 442 is disposed on the hot water supply passage 432 upstream of the connection thereof with the bypass passage 434.

An upstream-side end of a bathtub-filling passage 450 is connected to the hot water supply passage 432 downstream of the connection thereof with the bypass passage 434. A hot water-supplying thermistor 444 is disposed at a connection between the hot water supply passage 432 and the bathtub-filling passage 450. The fine bubble generator 2 is disposed between the connection of the hot water supply passage 432 and the bypass passage 434 and a connection of the hot water supply passage 432 and the bathtub-filling passage 450. Hereinbelow, a part of the hot water supply passage 432 upstream of the fine bubble generator 2 may be termed a first hot water supply passage 432*a*, and a part of the hot water supply passage 432 downstream of the fine bubble generator 2 may be termed a second hot water supply passage 432*b*.

A downstream-side end of the bathtub-filling passage 450 is connected to an upstream-side end of a reheating passage 460 and a downstream-side end of a first bathtub circulation passage 462. A downstream-side end of the reheating passage 460 is connected to an upstream-side end of the second heat exchanger 428. An upstream-side end of the first bathtub circulation passage 462 is connected to the bathtub 408. A reheating control valve 452 and a check valve 454 are disposed on the bathtub-filling passage 450. The reheating control valve 452 is configured to open and close the bathtub-filling passage 450. The check valve 454 is configured to allow a waterflow from upstream to downstream of the bathtub-filling passage 450 and prohibit a waterflow from downstream to upstream of the bathtub-filling passage 450. A bathtub returning thermistor 464 is disposed at a connection between the bathtub-filling passage 450, the reheating passage 460, and the first bathtub circulation passage 462. A circulation pump 466 is disposed on the reheating passage 460.

A downstream-side end of the second heat exchanger 428 of the second heating device 412 is connected to an upstream-side end of a second bathtub circulation passage 468. A downstream-side end of the second bathtub circulation passage 468 is connected to the bathtub 408. A bathtub outflow thermistor 470 is disposed on the second bathtub circulation passage 468.

When the hot water supply system 402 is to supply hot water to the faucet 406, the first burner 422 of the first heating device 410 operates with the reheating control valve 452 closed. In this case, the water supplied from the water source 404 to the water supply passage 430 is heated by heat exchange in the first heat exchanger 424 and is then delivered to the faucet 406 through the hot water supply passage 432. A temperature of the water flowing in the hot water supply passage 432 can be adjusted to a desired temperature by adjusting a combustion amount of the first burner 422 of the first heating device 410 and an opening degree of the bypass servo valve 436. As described above, the fine bubble generator 2 is disposed in the hot water supply passage 432. The water supplied from the water source 404 has air (oxygen, carbon dioxide, nitrogen, etc.) dissolved therein. Due to this, the water that flowed through the fine bubble generator 2 and is delivered to the faucet 406 contains a great volume of fine bubbles.

When the hot water supply system 402 is to fill the bathtub 408 with hot water, the first burner 422 of the first heating device 410 operates with the reheating control valve 452 open. In this case, the water supplied from the water source 404 to the water supply passage 430 is heated by the heat exchange in the first heat exchanger 424 and then flows into the bathtub-filling passage 450 from the hot water supply passage 432. At this occasion, the water temperature is adjusted to a desired temperature by the adjustment of the combustion amount of the first burner 422 of the first heating device 410 and the adjustment of the opening degree of the bypass servo valve 436. The water that flowed into the bathtub-filling passage 450 flows into the bathtub 408 through the first bathtub circulation passage 462 and also flows into the bathtub 408 through the reheating passage 460 and the second bathtub circulation passage 468. Since the fine bubble generator 2 is disposed in the water supply passage 432 (specifically, the first water supply passage 432*a*), the water supplied into the bathtub 408 contains a great volume of fine bubbles.

When the hot water supply system 402 is to reheat the water in the bathtub 408, the circulation pump 466 operates with the reheating control valve 452 closed, and the second burner 426 of the second heating device 412 is operated. In this case, the water in the bathtub 408 flows into the first bathtub circulation passage 462 and is sent to the second heating device 412 through the reheating passage 460. The water sent to the second heating device 412 is heated by heat exchange in the second heat exchanger 428, and then flows into the second bathtub circulation passage 468. At this occasion, the water temperature is adjusted to a desired temperature by an adjustment of a combustion amount of the second burner 426 of the second heating device 412. The water that flowed into the second bathtub circulation passage 468 is returned to the bathtub 408.

As described above, as shown in FIG. 19, the hot water supply system 402 (example of "water heater") comprises the fine bubble generator 2. According to the above configuration, the water (example of "gas-dissolved water") having flowed in the fine bubble generator 2 is supplied to the faucet 406, the bathtub 408. That is, the water containing a large volume of the fine bubbles can be supplied to the faucet 406, the bathtub 408. A cleaning performance when a user showers, for example, can be improved by the great volume of fine bubbles contained in the water. Accordingly, user convenience when using the hot water supply system 402 can be improved.

Second Embodiment; Configuration of Dishwasher 510 Using Fine Bubble Generator 2

Figure 20:
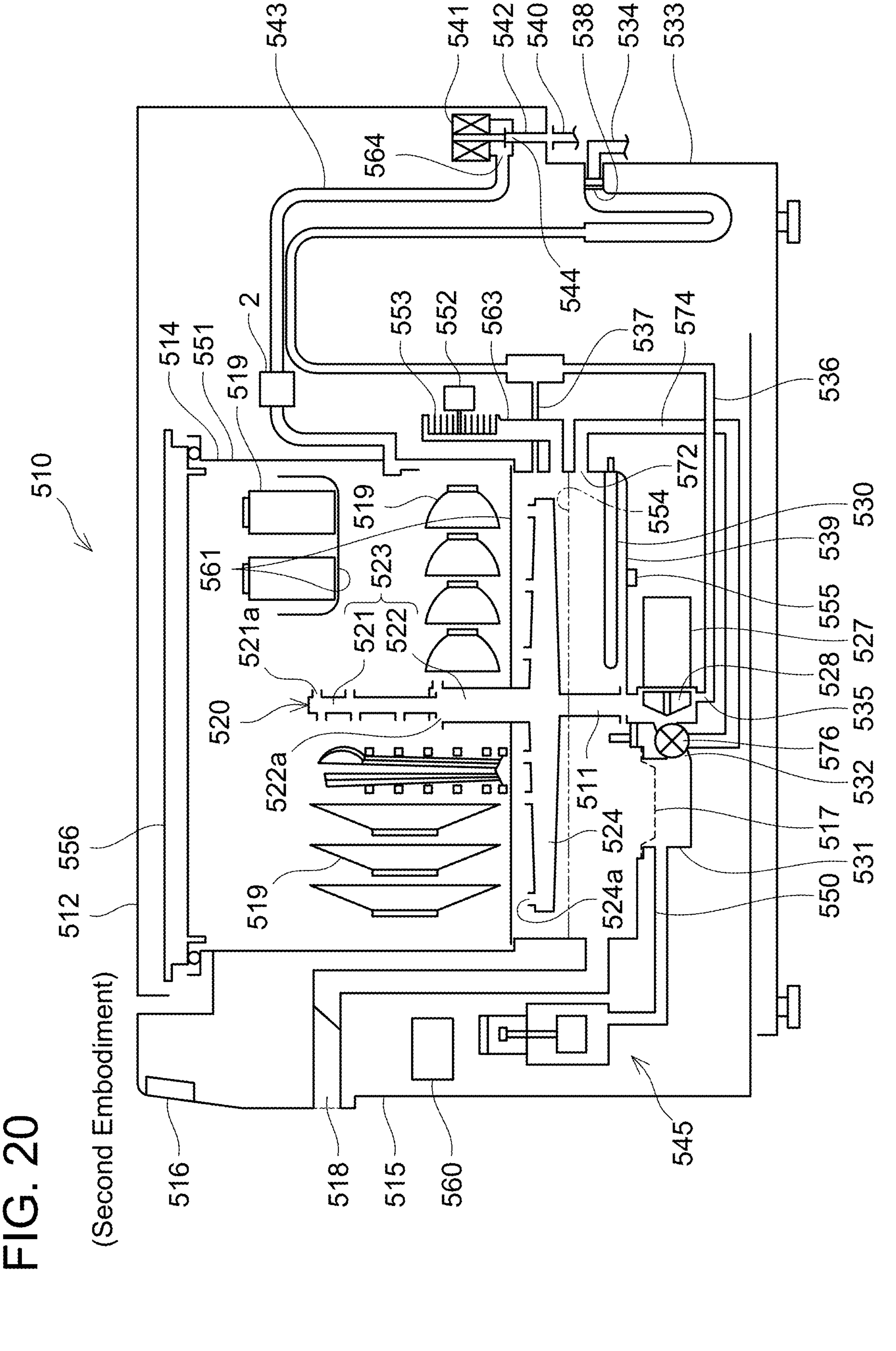
FIG. 20 schematically illustrates a configuration of a dishwasher 510 according to a second embodiment.

FIG. 20 is a vertical cross-sectional view of a dishwasher 510. The dishwasher 510 is a drawer dishwasher. The dishwasher 510 comprises a body 512, a washing tub 514, a door 515, and a controller 560.

An operation panel 516 and a vent passage 518 are arranged in the door 515. Several button(s) and light(s) such as a start button are disposed on the operation panel 516. The vent passage 518 extends from inside to outside the washing tub 514.

The washing tub 514 is accommodated in a space formed by the body 512 and the door 515. The washing tub 514 is slidably supported by the body 512. The washing tub 514 is coupled to the door 515. The washing tub 514 is formed in a box shape having an open top. A lid 556 is disposed above the washing tub 514. The lid 556 is coupled to the washing tub 514 by a not-shown lift.

Inside the washing tub 514, a washer nozzle 520, dish racks 561 for holding various dishes 519, a debris filter 517, a heater 530, a thermistor 555 for example are housed. The washer nozzle 520 is composed by a tower nozzle portion 523 composed of an upper nozzle 521 and a lower nozzle 522 and a horizontal nozzle portion 524. The washer nozzle 520 has a plurality of spray ports 521*a*, 522*a*, 524*a* defined thereon. The electric heater 530 configured to heat water for washing and air within the washing tub 514 is mounted in proximity to a bottom surface 539 of the washing tub 514. The thermistor 555 is mounted on the bottom surface 539 of the washing tub 514.

A water level detection unit 545 configured to detect a water level within the washing tub 514 is arranged below a front part of the washing tub 514 on an outer side thereof. A water level when the washing tub 514 is normally filled with the washing water (hereafter, "washing water level") is indicated in a two-dot dashed line denoted number 554. A pump 527 is arranged below the bottom surface 539 of the washing tub 514. The pump 527 rotates an impeller 528 with its built-in electric motor. The washer nozzle 520 is attached rotatably to the bottom surface 539 of the washing tub 514. The washer nozzle 520 and a first ejection port 511 of the pump 527 are in communication.

A suction recess 531 is defined at a bottom part of the washing tub 514. An upper opening of the suction recess 531 is capped by the debris filter 517. The water level detection unit 545 and the suction recess 531 are connected by a water level passage 550. The pump 527 and the suction recess 531 are connected by a first suction passage 532. The first suction passage 532 is connected with one end of a second suction passage 574. Another end of the second suction passage 574 is connected with an opening 572 of a rear wall 551 of the washing tub 514. A passage switch valve 576 is attached to a connection between the first suction passage 532 and the second suction passage 574.

A dryer fan 552 is mounted outside of the rear wall 551 of the washing tub 514. The dryer fan 552 rotates a fan 553 with its built-in motor. The dryer fan 552 and the inside of the washing tub 514 are in communication with a dryer passage 563. The dryer fan 552 is positioned higher than the washing water level 554.

A drain hose 534 is connected to a rear wall 533 of the body 512. The drain hose 534 and the second ejection port 535 of the pump 527 are in communication by a drain passage 536. A midway of the drain passage 536 and the inside of the washing tub 514 are in communication by an air vent passage 537. A drain check valve 538 is mounted in proximity to a spot to which the drain hose 534 of the drain passage 536 is connected.

A water supply hose 540 is connected to a step horizontally formed at a middle of the rear wall 533 of the body 512. The water supply hose 540 may be supplied directly with water supplied from a water source (not shown) such as a public tap water system, or may be supplied with heated water. A water inlet valve 541 is attached on an inner side of the rear wall 533. An inlet 544 of the water inlet valve 541 and the water supply hose 540 are in communication by a first water supply passage 542. An outlet 564 of the water inlet valve 541 and the inside of the washing tub 514 are in communication by a second water supply passage 543. The fine bubble generator 2 is attached to a midway of the second water supply passage 543.

The controller 560 comprises a CPU, ROM, RAM, for example and is configured to control operation of the dishwasher 510. The controller 560 executes a washing operation for washing the dishes 519 in the washing tub 514 by controlling the operation of the dishwasher 510.

Washing Operation

When the controller 560 receives an operation by a user on the operation panel 516 for starting a washing operation for dishes, the controller 560 executes a washing process, a rinsing process, and a drying process sequentially.

In the washing process, the controller 560 opens the water inlet valve 541 to supply the washing water from the water supply hose 540 to the washing tub 514. When the controller 560 determines that the washing water in a volume required for the washing process has been supplied to the washing tub 514, the controller 560 closes the water inlet valve 541. Next, the controller 560 drives the pump 527 to rotate the impeller 528 in forward direction and also turns on the heater 530. The washing water is suctioned from the suction recess 531 into the pump 527. The water suctioned in the pump 527 is fed to the washer nozzle 520 and is sprayed forcefully from the spray ports 521*a*, 522*a*, 524*a*. When a first predetermined duration (e.g., 5 minutes) has passed since the start of the washing process, the controller 560 ends the washing process. Further, the controller 560 drives the pump 527 to rotate the impeller 528 in backward direction, thereby draining the washing water in the washing tub 514. As described above, the fine bubble generator 2 is attached to the midway of the second water supply passage 543. The water supplied from the water supply hose 540 has air (oxygen, carbon dioxide, nitrogen, etc.) dissolved therein. Due to this, the water that flowed through the fine bubble generator 2 and is delivered to the washing tub 514 contains a great volume of fine bubbles. Food matters adhered to the dishes 519 are adsorbed by surfaces of the fine bubbles contained in the washing water. As the washing water contains a great volume of fine bubbles, more food matters can be adsorbed.

In the rinsing process, the controller 560 opens the water inlet valve 541 to supply the washing water from the water supply hose 540 to the washing tub 514. When the washing water in a volume required for the rinsing process has been supplied to the washing tub 514, the controller 560 closes the water inlet valve 541. The controller 560 drives the pump 527 to rotate the impeller 528 in the forward direction. Due to this, the washing water in the washing tub 514 is sprayed from the washer nozzle 520 toward the dishes 519 set in the dish racks 561, by which the dishes 519 are rinsed. When a second predetermined duration (e.g., 5 minutes) has passed since the start of the rinsing process, the controller 560 ends the rinsing process. Further, the controller 560 drives the pump 527 to rotate the impeller 528 in backward direction, thereby draining the washing water in the washing tub 514.

In the drying process, the controller 560 uses the heater 530 to heat the air within the washing tub 514 to dry the dishes 519. When a time passed since the start of drying the dishes 519 has reached a third predetermined duration, the controller 560 ends the heating using the heater 530, thereby ending the drying process.

As described above, as shown in FIG. 20, the dishwasher 510 comprises the fine bubble generator 2. According to the above configuration, the washing water (example of "gas-dissolved water") having flowed in the fine bubble generator 2 is supplied to the washing tub 514. That is, the washing water containing a lot of fine bubbles can be supplied to the washing tub 514. A washing performance when the dishes 519 are washed can be improved by the great volume of fine bubbles contained in the water. Accordingly, user convenience using the dishwasher 510 can be improved.

Hereafter, a fine bubble generator 2 according to each of fifth to seventh examples will be described.

Fifth Example

With reference to FIGS. 21 to 27, a fine bubble generator 2 according to a fifth example will be described. The fine bubble generator 2 of the present example differs from the fine bubble generator 2 of the fourth example (see FIG. 13) in structures of a body case 610, an inlet 612, a first fine bubble generation portion 620, and a second fine bubble generation portion 622.

Figure 21:
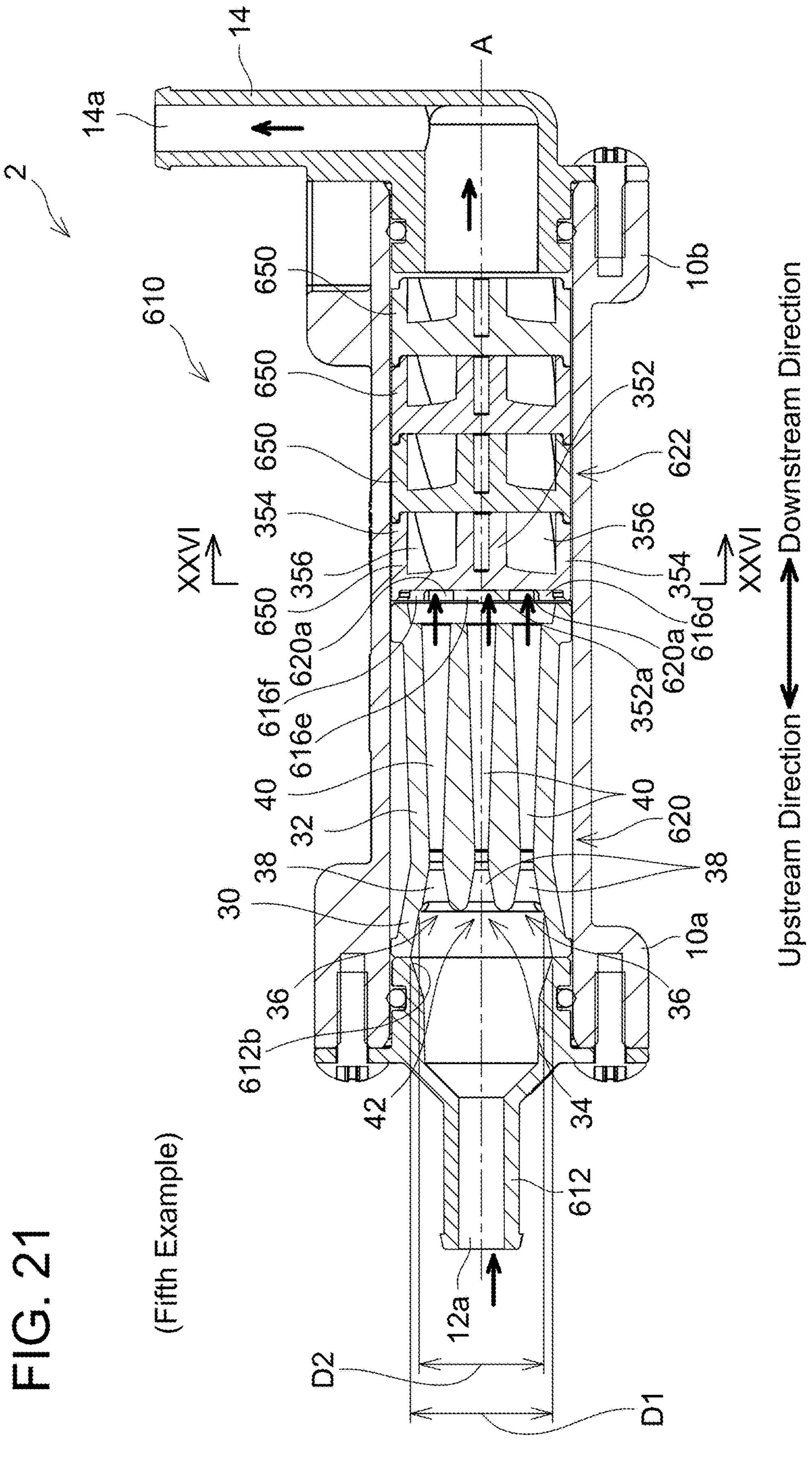
FIG. 21 illustrates a cross-sectional view of a fine bubble generator 2 according to a fifth example.

As shown in FIG. 21, an inner wall 612*b* at a downstream-side end of the inlet 612 has its diameter increased from upstream to downstream. A diameter D1 of the downstream-side end of the inlet 612 is larger than a diameter D2 of a circle connecting sides on the outer side in a radial direction of the six outer venturi portions 36. According to such configuration, the air-dissolved water flowing out of the inlet 612 can be allowed to flow into each of the six outer venturi portions 36 in relatively equal proportion. Alternatively, in a modification the diameter D1 of the downstream-side end of the inlet 612 may be equal to the diameter D2 of the circle connecting sides on the outer side in the radial direction of the six outer venturi portions 36.

Figure 22:
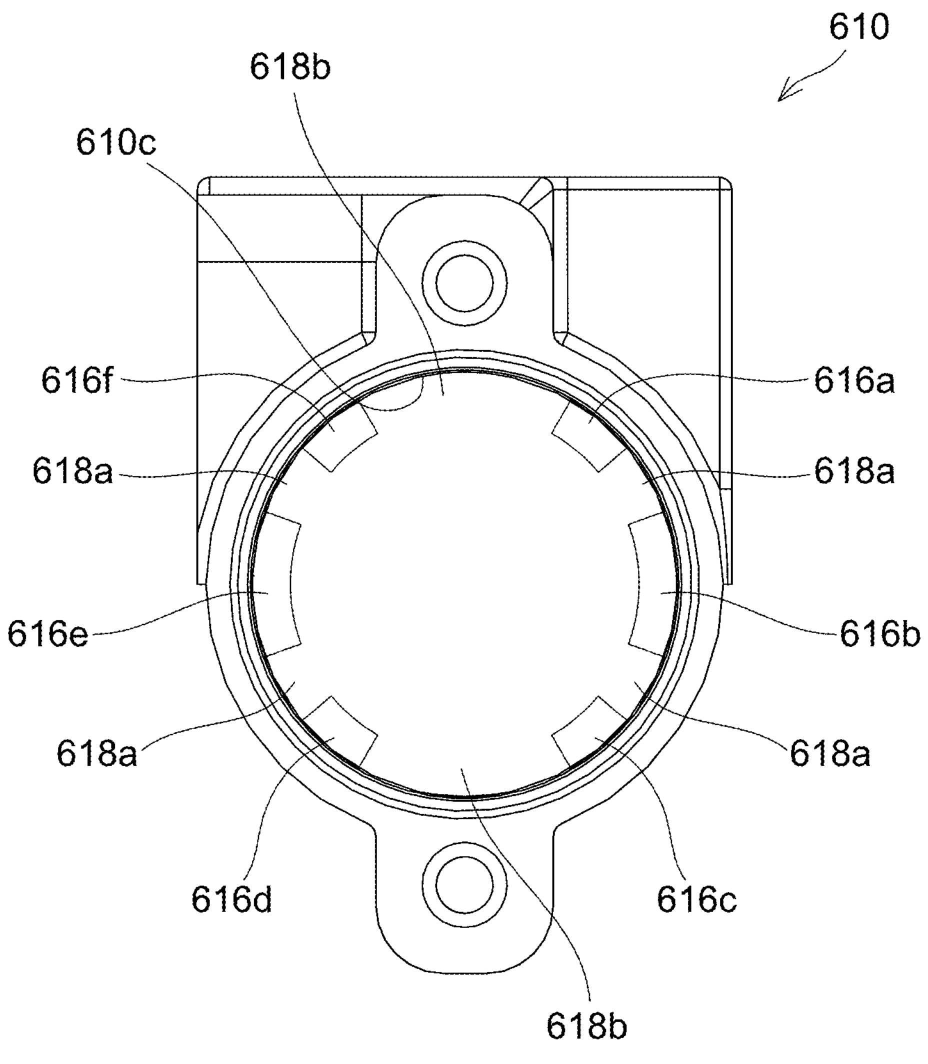
FIG. 22 illustrates a body case 610 according to the fifth example from the upstream side.

As shown in FIG. 22, the body case 610 comprises a first projection 616*a* to a sixth projection 616*f* projecting inward in the radial direction from the inner wall 610*c* of the body case 610. As shown in FIG. 21, the first projection 616*a* to the sixth projection 616*f* are arranged at a boundary part between the first fine bubble generation portion 620 and the second fine bubble generation portion 622 in the central axis A direction. As shown in FIG. 22, the first projection 616*a* to the sixth projection 616*f* are disposed along a circumferential direction. A width in the circumferential direction of each of the first projection 616*a*, a third projection 616*c*, a fourth projection 616*d*, and the sixth projection 616*f* is smaller than a width in the circumferential direction of each of a second projection 616*b* and a fifth projection 616*e*. First positioning recesses 618*a* are defined: between the first projection 616*a* and the second projection 616*b*, between the second projection 616*b* and the third projection 616*c*, between the fourth projection 616*d* and the fifth projection 616*e*, and between the fifth projection 616*e* and the sixth projection 616*f*. Second positioning recesses 618*b* are defined between the first projection 616*a* and the sixth projection 616*f* and between the third projection 616*c* and the fourth projection 616*d*. A width in the circumferential direction of each of the first positioning recesses 618*a* is smaller than a width in the circumferential direction of each of the second positioning recesses 618*b*.

Figure 23:
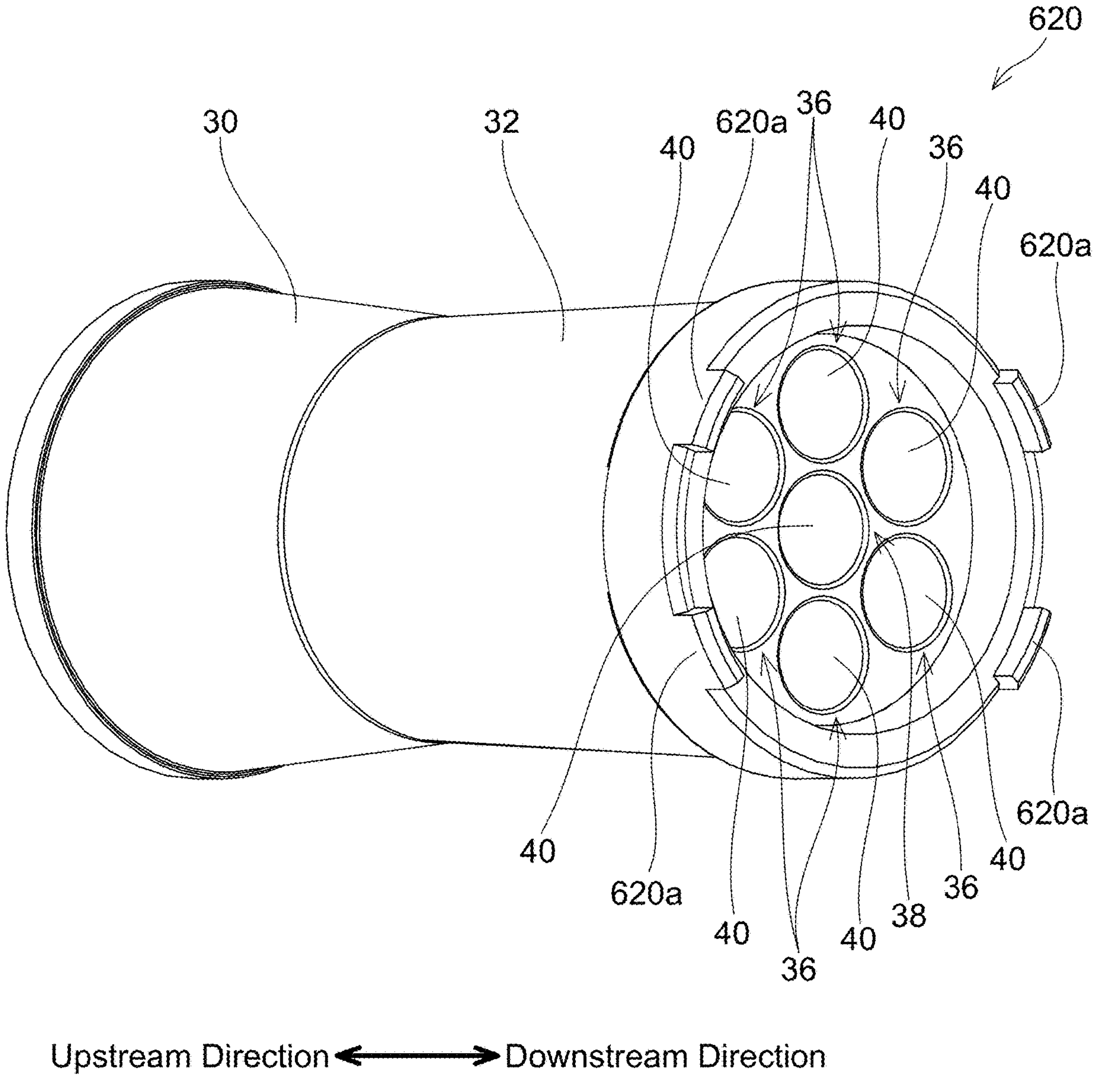
FIG. 23 illustrates a first fine bubble generation portion 620 according to the fifth example from the downstream side.

As shown in FIG. 23, four positioning protrusions 620*a* protruding downstream are arranged at a downstream-side end of the first fine bubble generation portion 620. The four positioning protrusions 620*a* are arranged at positions corresponding to the four first positioning recesses 618*a* (see FIG. 22) of the body case 610, and have shapes corresponding to the four first positioning recesses 618*a*.

Figure 24:
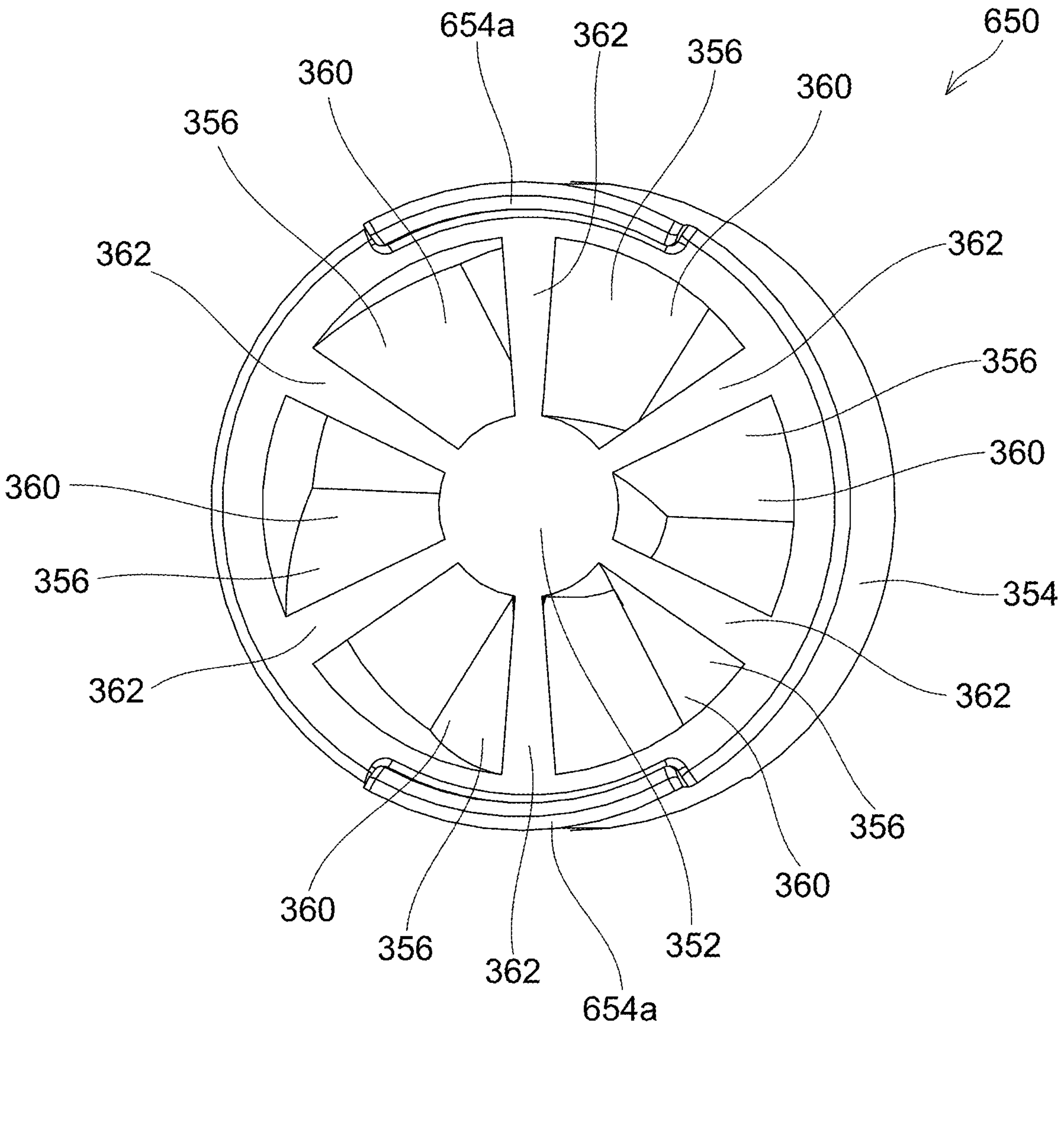
FIG. 24 illustrates a perspective view of a swirling flow generation portion 650 of a second fine bubble generation portion 622 according to the fifth example from the upstream side.
Figure 25:
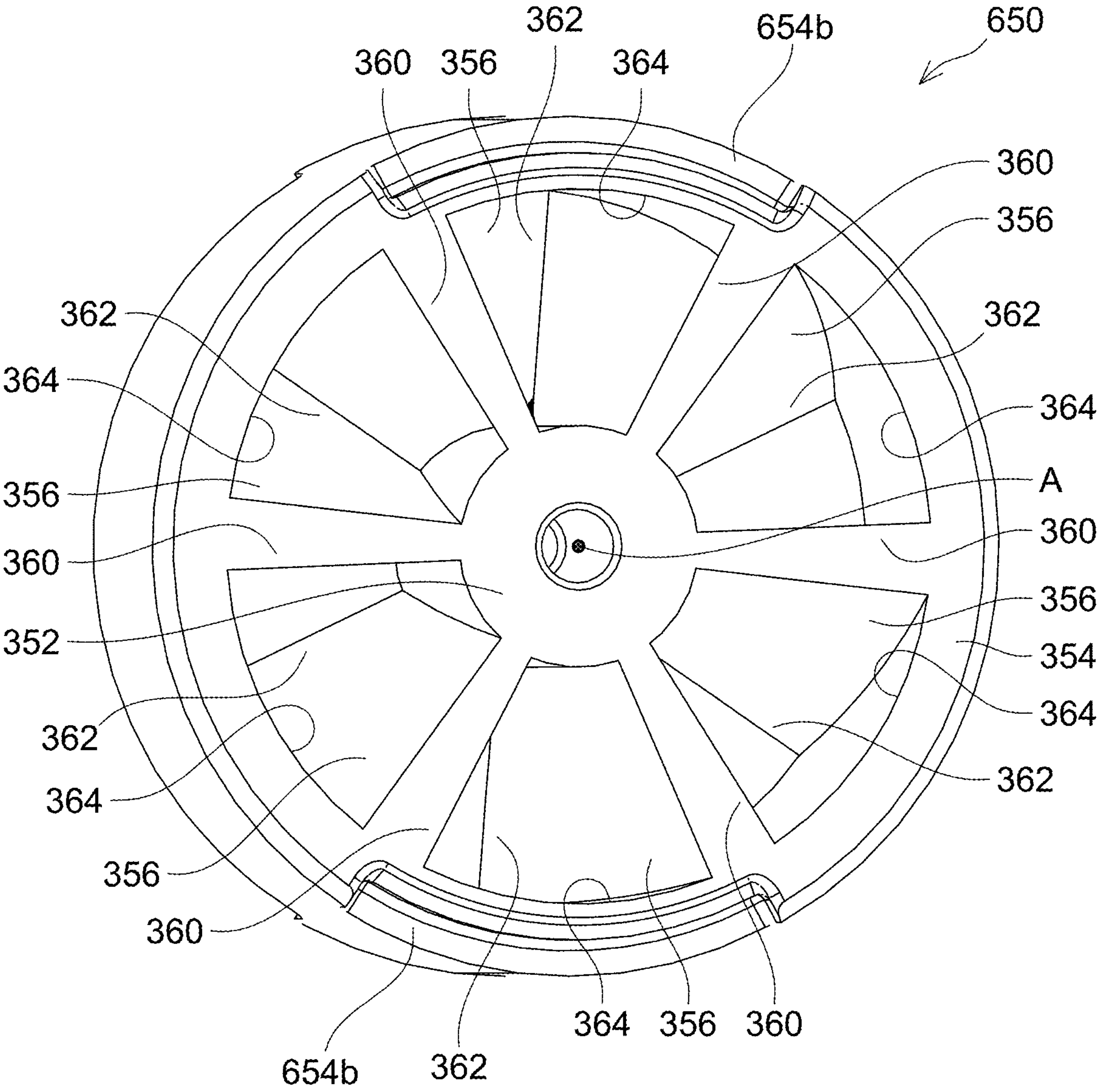
FIG. 25 illustrates a perspective view of the swirling flow generation portion 650 of the second fine bubble generation portion 622 according to the fifth example from the downstream side.

As shown in FIG. 24, a swirling flow generation portion 650 comprises a shaft portion 352, an outer peripheral portion 354 surrounding the shaft portion 352, and six vanes 356. Two upstream-side protrusions 654*a* protruding upstream are disposed at an upstream-side end of the outer peripheral portion 354. The two upstream-side protrusions 654*a* are arranged at positions corresponding to the two second positioning recesses 618*b* (see FIG. 22) of the body case 610, and have a shape corresponding to the two second positioning recesses 618*b*. As shown in FIG. 25, two downstream-side recesses 654*b* recessed upstream are arranged at a downstream-side end of the outer peripheral portion 354. The two downstream-side recesses 654*b* are arranged at positions corresponding to the two upstream-side protrusions 654*a*, and have shapes corresponding to the two upstream-side protrusions 654*a*. That is, the upstream-side protrusions 654*a* (see FIG. 24) have a shape corresponding to both the downstream-side recesses 654*b* and the second positioning recesses 618*b* (see FIG. 22) of the body case 610.

Figure 26:
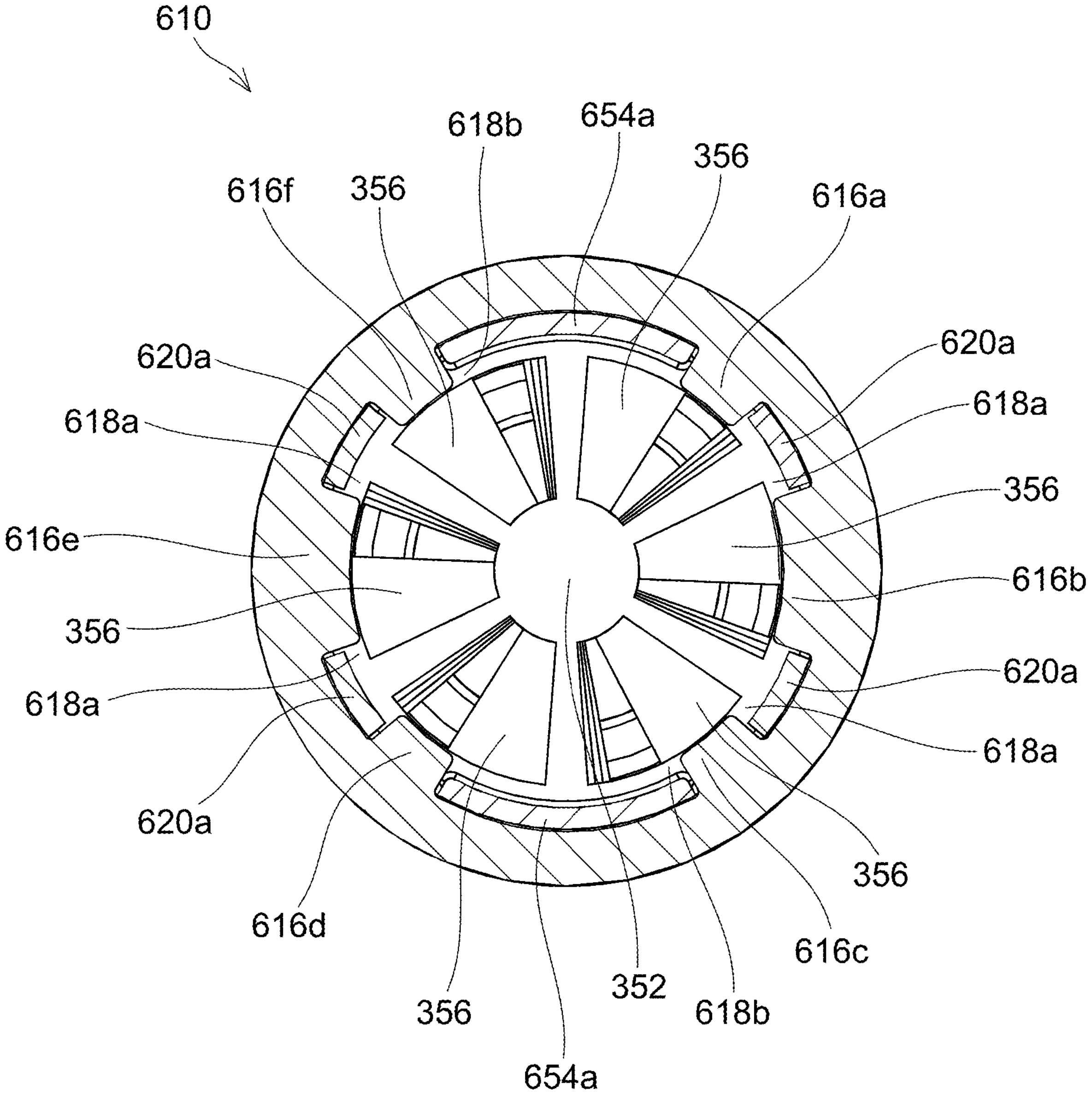
FIG. 26 illustrates a cross-sectional view taken along a XXVI-XXVI line of FIG. 21.
Figure 27:
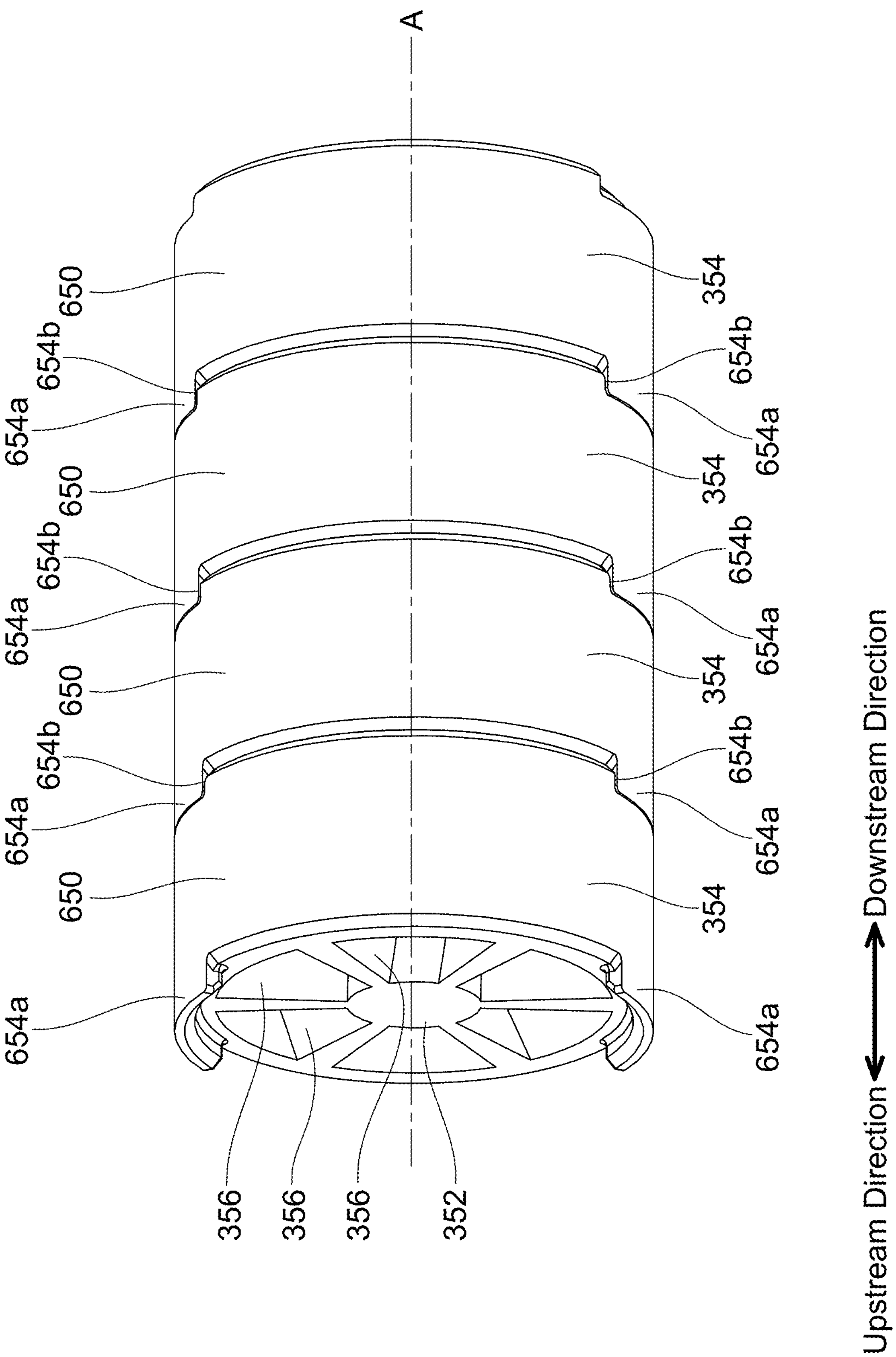
FIG. 27 illustrates a perspective view of the second fine bubble generation portion 622 according to the fifth example from the upstream side.

As shown in FIG. 26, the four positioning protrusions 620*a* of the first fine bubble generation portion 620 fit into the four first positioning recesses 618*a* of the body case 10. That is, the first positioning recesses 618*a* and the positioning protrusions 620*a* are a mechanism for positioning the first fine bubble generation portion 620 relative to the body case 610 in the central axis A direction and the circumferential direction. The two upstream-side protrusions 654*a* of the second fine bubble generation portion 622 (specifically, the most upstream-side swirling flow generation portion 650) fit into the two second positioning recesses 618*b* of the body case 10. That is, the second positioning recesses 618*b* and the upstream-side protrusions 654*a* are a mechanism for positioning the second fine bubble generation portion 622 (specifically, the most upstream-side swirling flow generation portion 650) relative to the body case 610 in the central axis A direction and in the circumferential direction. Further, as shown in FIG. 27, among two of the swirling flow generation portions 650 adjacent in the central axis A direction, the upstream-side protrusions 654*a* of the swirling flow generation portion 650 on the downstream side fit into the downstream-side recesses 654*b* of the swirling flow generation portion 650 on the upstream side. That is, the upstream-side protrusions 654*a* and the downstream-side recesses 654*b* are a mechanism for positioning the two swirling flow generation portions 650 adjacent in the central axis A direction with respect to the central axis A direction and the circumferential direction.

As described above, as shown in FIG. 21, the fine bubble generator 2 comprises the body case 610 accommodating the first fine bubble generation portion 620 and the second fine bubble generation portion 622. As shown in FIG. 26, the body case 610 comprises the first positioning recesses 618*a* (example of "first positioning portion") for positioning the first fine bubble generation portion 620 relative to the body case 610 and the second positioning recess 618*b* (example of "second positioning portion") for positioning the second fine bubble generation portion 622 relative to the body case 610. According to the above configuration, by the first fine bubble generation portion 620 and the body case 610 being positioned by the first positioning recesses 618*a* and by the second fine bubble generation portion 622 and the body case 610 being positioned by the second positioning recesses 618*b*, the six outer venturi portions 36 of the first fine bubble generation portion 620 and the vanes 356 of the most upstream-side swirling flow generation portion 650 of the second fine bubble generation portion 622 are positioned. Due to this, a majority of the gas-dissolved water flowing out of the first fine bubble generation portion 620 can be allowed to collide with the inlet-side ends 362 of the vanes 356 of the most upstream-side swirling flow generation portion 650, or can be allowed to be sheared when it flows past the inlet-side ends 362 of the vanes 356 of the most upstream-side swirling flow generation portion 650. Accordingly, the fine bubbles can be generated in larger volume.

In one or more embodiments, as shown in FIG. 27, in each of the plurality of swirling flow generation portions 650, the upstream-side protrusions 654*a* protruding upstream are disposed at the upstream-side end of the swirling flow generation portion 650, and the downstream-side recesses 654*b* recessed upstream are disposed at the downstream-side end of the swirling flow generation portion 650. The upstream-side protrusions 654*a* have a shape corresponding to the second positioning recesses 618*b* and the downstream-side recesses 654*b*. According to the above configuration, with the use of the upstream-side protrusions 654*a* of the swirling flow generation portions 650, the body case 610 and the most upstream-side swirling flow generation portion S50 can be positioned with each other, and also the two swirling flow generation portions 650 adjacent in in the central axis A direction can be positioned with each other. In this case, any other feature for positioning the body case 610 and the most-upstream-side swirling flow generation portion 650 and different from the upstream-side protrusions 654*a* do not have to be disposed at the upstream-side end of the most upstream-side swirling flow generation portion 650. Due to this, structures of the plurality of swirling flow generation portions 650 can be made identical to each other.

Sixth Example

A fine bubble generator 2 according to a sixth example will be described with reference to FIGS. 28 and 29. The fine bubble generator 2 of the present example differs from the fine bubble generator 2 (see FIG. 2) of the first example in a structure of a body case 10.

Figure 28:
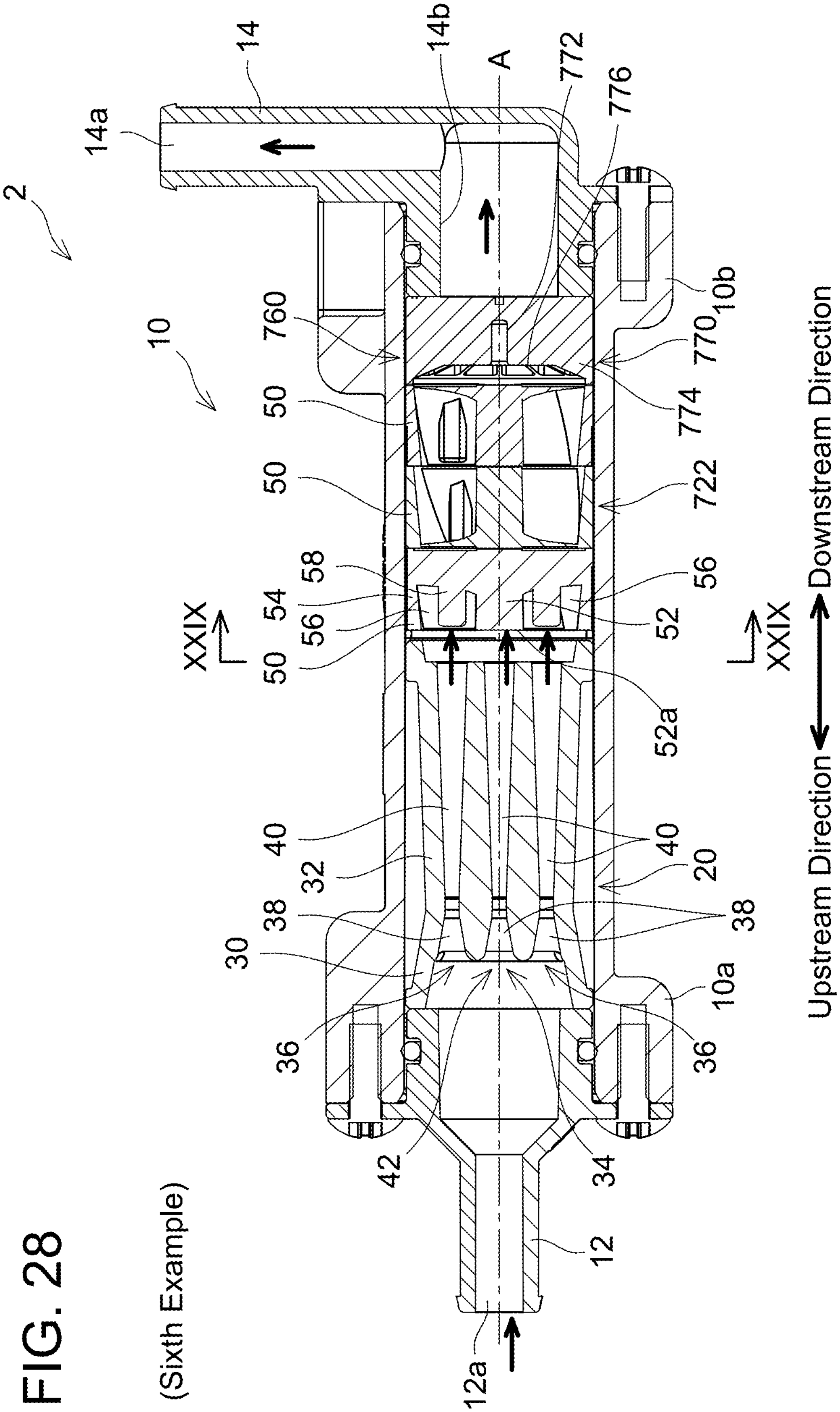
FIG. 28 illustrates a cross-sectional view of a fine bubble generator 2 according to a sixth example.
Figure 29:
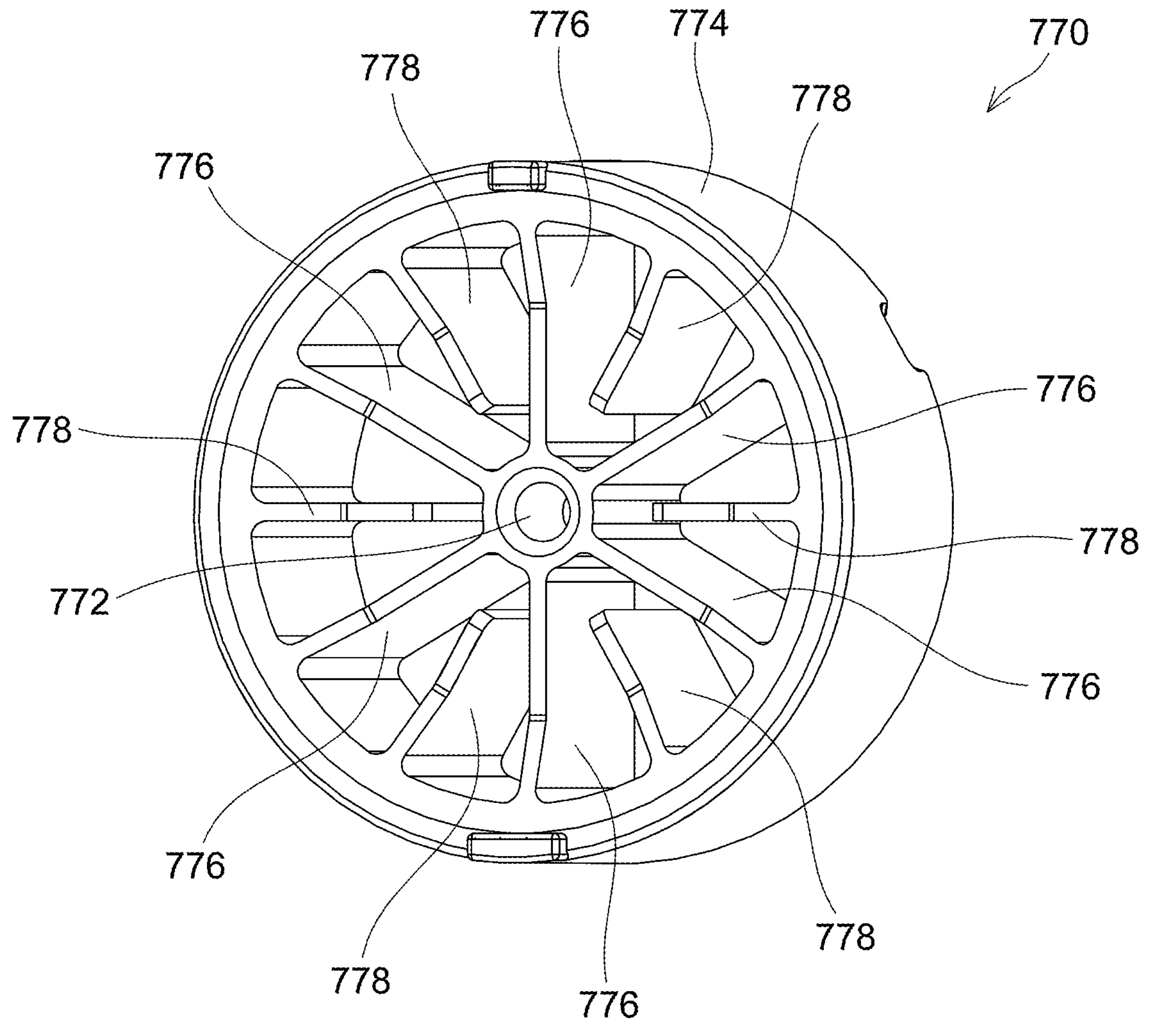
FIG. 29 illustrates a perspective view of a flow conditioner 770 according to the sixth example from the upstream side.

As shown in FIG. 28, the second fine bubble generation portion 722 comprises three swirling flow generation portions 50. A flow conditioner 770 is disposed in a flow path 760 between the second fine bubble generation portion 722 and the outlet 14. The flow path 760 is defined by the body case 10. A flow path axis of the flow path 760 coincides with the central axis A. As shown in FIG. 29, the flow conditioner 770 comprises a shaft portion 772, an outer peripheral portion 774 surrounding the shaft portion 772, six first flow-conditioning walls 776, and six second flow-conditioning walls 778. As shown in FIG. 28, an outer diameter of the outer peripheral portion 774 is same as an inner diameter of the body case 10. The shaft portion 772 and the outer peripheral portion 774 are disposed along the central axis A. As shown in FIG. 29, the first flow-conditioning walls 776 and the second flow-conditioning walls 778 extend inward in the radial direction from an inner wall of the outer peripheral portion 774. The first flow-conditioning walls 776 and the second flow-conditioning walls 778 have a flat plate shape extending along the radial direction and the central axis A direction. Ends on an inner side in the radial direction of the first flow-conditioning walls 776 are connected to the shaft portion 772. The six first flow-conditioning walls 776 are arranged at equal intervals along the circumferential direction of the central axis A. Ends on an inner side in the radial direction of the second flow-conditioning walls 778 are positioned on an outer side of an outer wall of the shaft portion 772. Each of the second flow-conditioning walls 778 is arranged between two first flow-conditioning walls 776 adjacent to each other in the circumferential direction. Alternatively, in a modification, two or more of the flow conditioners 770 may be disposed in the body case 10.

As described above, as shown in FIG. 28, the fine bubble generator 2 comprises the flow conditioner 770 disposed between the second fine bubble generation portion 722 and the outlet 14, and configured to straighten the flow of air-dissolved water flowing out of the second fine bubble generation portion 722 from a swirling flow flowing in the clockwise direction to a straight flow. The flow of the gas-dissolved water flowing out of the second fine bubble generation portion 722 into the flow conditioner 770 is a swirling flow flowing in the clockwise direction (i.e., turbulent flow). When the flow of the air-dissolved water is a swirling flow, the air-dissolved water is more likely to collide with an inner wall 14*b* (example of "wall surfaces") defining the flow path in which the air-dissolved water flows on the downstream side of the flow conditioner 770 than when the flow of the air-dissolved water is a straight flow (i.e., laminar flow). Due to this, if the flow of the air-dissolved water flowing out of the second fine bubble generation portion 722 is not straightened from the swirling flow to the straight flow, relatively a lot of the air-dissolved water collides with the inner wall 14*b* of the outlet 14. In this case, pressure loss in the fine bubble generator 2 increases, as a result of which the volume of the air-dissolved water flowing in the fine bubble generator 2 is decreased. According to the above configuration, the air-dissolved water flowing out of the second fine bubble generation portion 722 flows in the flow conditioner 770, by which the flow of the air-dissolved water is straightened from the swirling flow to the straight flow. Due to this, the volume of the air-dissolved water colliding with the inner wall 14*b* can be reduced, by which the pressure loss in the fine bubble generator 2 can be reduced. Accordingly, the volume of the air-dissolved water flowing in the fine bubble generator 2 can be increased.

Seventh Example

Figure 30:
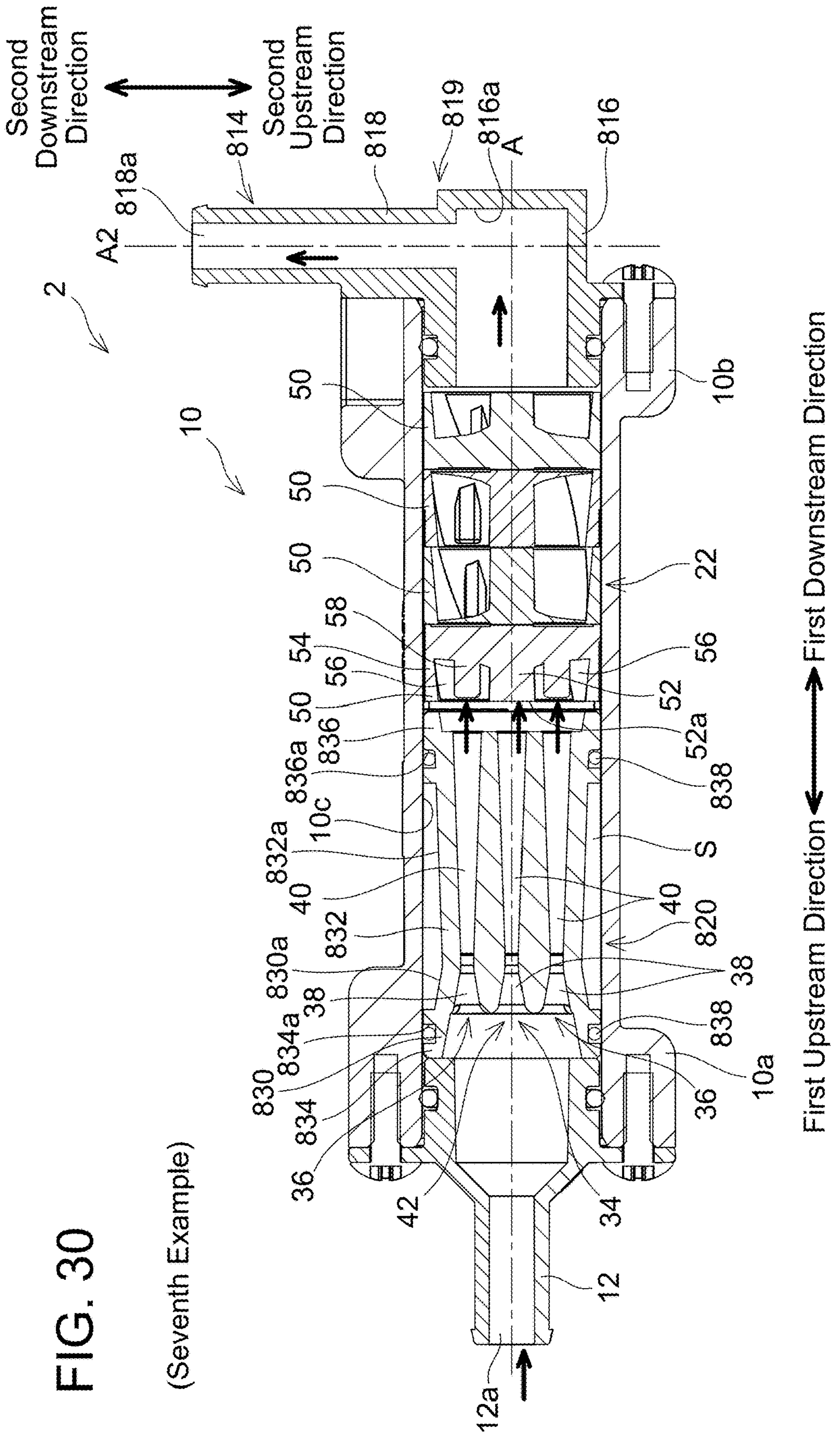
FIG. 30 illustrates a cross-sectional view of a fine bubble generator 2 according to a seventh example.

With reference to FIG. 30, a fine bubble generator 2 according to a seventh example will be described. The fine bubble generator 2 of the present example differs from the fine bubble generator 2 (see FIG. 2) of the first example in structures of an outlet 814 and a first fine bubble generation portion 820.

As shown in FIG. 30, the outlet 814 comprises a first outlet flow path 816 and a second outlet flow path 818. The first outlet flow path 816 is a flow path extending along the central axis A. The second outlet flow path 818 is a flow path extending along a second central axis A2 direction perpendicular to the central axis A. Hereafter, a left direction/leftward and a right direction/rightward in FIG. 30 may be referred to as "first upstream direction" and "first downstream direction" and down direction/downward and up direction/upward may be referred to as "second upstream direction" and "second downstream direction".

An upstream-side end of the first outlet flow path 816 is connected to a downstream-side end of the second fine bubble generation portion 22, and a downstream-side end of the first outlet flow path 816 is connected to an upstream-side end of the second outlet flow path 818. An outlet port 818*a* is defined at a downstream-side end of the second outlet flow path 818. A step portion 819 projecting in the first downstream direction is defined at a connection between the downstream-side end of the first outlet flow path 816 and the upstream-side end of the second outlet flow path 818. According to the above configuration, the flow of air-dissolved water flowing from the first outlet flow path 816 to the second outlet flow path 818 is hindered by the step portion 819. Due to this, the flow of air-dissolved water becomes turbulent in proximity to the inner wall 816*a* of the first outlet flow path 816. As a result of this, the volume of air-dissolved water which collides with the inner wall 816*a* can be increased, and thus the volume of fine bubbles can be increased.

The first fine bubble generation portion 820 comprises a first body portion 830 and a second body portion 832. An outer wall 830*a* of the first body portion 830 has its diameter decreased from the first upstream direction to the first downstream direction. An upstream-side flange portion 834 is disposed at a first-upstream-direction-side end of the outer wall 830*a* of the first body portion 830. The upstream-side flange portion 834 spreads outward in the radial direction from the first-upstream-side end of the outer wall 830*a* of the first body portion 830 and disposed along an entirety of the circumferential direction. An outer circumferential surface of the upstream-side flange portion 834 is in contact with an inner wall 10*c* of the body case 10. A first recess 834*a* recessed inward in the radial direction is defined in the upstream-side flange portion 834. The first recess 834*a* is arranged at a central portion of the upstream-side flange portion 834 in the central axis A direction and defined along the entirety of the circumferential direction. An outer wall 832*a* of the second body portion 832 has its diameter increased from the first upstream to the first downstream. A downstream-side flange portion 836 is disposed at a first-downstream-side end of the outer wall 832*a* of the second body portion 832. The downstream-side flange portion 836 spreads outward in the radial direction from the first-downstream-side end of the outer wall 832*a* of the second body portion 832 and disposed along the entirety of the circumferential direction. An outer circumferential surface of the downstream-side flange portion 836 is in contact with the inner wall 10*c* of the body case 10. A second recess 836*a* recessed inward in the radial direction is defined in the downstream-side flange portion 836. The second recess 836*a* is arranged at a central portion of the downstream-side flange portion 836 in the central axis A direction and defined along the entirety of the circumferential direction. A seal member 838 is disposed each within the first recess 834*a* and the second recess 836*a*. A space S is defined between the inner wall 10*c* of the body case 10 and the outer wall 830*a* of the first body portion 830 as well as the outer wall 832*a* of the second body portion 832.

If the first fine bubble generation portion 820 does not have the seal members 838, the air-dissolved water flowing from the inlet 12 into the first fine bubble generation portion 820 may enter the space S, thereby leaving the water remaining in the space S. If the air-dissolved water remaining in the space S freezes, the body case 10 may be broken because of its increased volume. According to the above configuration, the water can be suppressed from entering the space S. Accordingly, the body case 10 can be suppressed from being broken.

Specific examples of the present disclosure have been described in detail, however, these are mere exemplary indications and thus do not limit the scope of the claims. The art described in the claims includes modifications and variations of the specific examples presented above.

First Modification

A number of the swirling flow generation portions 50, 150, 250, 350 comprised by the second fine bubble generation portion 22 may not be limited to four, but may be two, three, or five or more.

Second Modification

A number of the vanes 56, 356 of each of the swirling flow generation portions 50, 150, 250, 350 may not be limited to six, but may be two to five, or seven or more.

Third Modification

Each of the vanes 56, 356 of each of the swirling flow generation portions 50, 150, 250, 350 may be angled at a greater degree more on a counterclockwise direction. In the present modification, the counterclockwise direction and the clockwise direction are an example of "predetermined swirling direction" and "reversed swirling direction".

Fourth Modification

A number of the outer venturi portions 36 of the first fine bubble generation portion 20 may be more than or less than a number of the vanes 56 of the swirling flow generation portions 50 of the second fine bubble generation portion 22.

Fifth Modification

In the first example, when the swirling flow generation portions 50 are seen along the central axis A direction, the six vanes 56 of the second swirling flow generation portion 50 may entirely overlap the six vanes 56 of the first swirling flow generation portion 50. The same applies to the second to fourth examples.

Sixth Modification

The first fine bubble generation portion 20 may not comprise the six outer venturi portions 36 but may comprise only the inner venturi portion 34. Further, in another modification, the first fine bubble generation portion 20 may not comprise the inner venturi portion 34 but may comprise only one or more of the outer venturi portions 36.

Seventh Modification

In the central axis A direction, the downstream-side ends of the six outer venturi portions 36 of the first fine bubble generation portion 20 may face the first openings 64 of the first swirling flow generation portion 50 of the second fine bubble generation portion 22. In this case, the six outer venturi portions 36 are preferably angled relative to the central axis A direction.

Eighth Modification

An area of the upstream-side end 52*a* of the shaft portion 52 of the first swirling flow generation portion 50 of the second fine bubble generation portion 22 may be smaller than the opening area of the downstream-side end of the inner venturi portion 34 of the first fine bubble generation portion 20. In the present modification, in the shaft portion 52 of the swirling flow generation portion 50, the area of the shaft portion 52 when seen along the central axis A direction is preferably larger than an opening area of the downstream-side end of the inner venturi portion 34 of the first fine bubble generation portion 20. For example, an upstream-side end of the shaft portion 52 may have a hemisphere shape. Further, the shaft portion 52 may have its diameter increased from upstream to downstream.

Ninth Modification

In the hot water supply system 402 according to the first example, the fine bubble generator 2 may be arranged in the water supply passage 430, the bathtub-filling passage 450, the reheating passage 460, the first bathtub circulation passage 462, or the second bathtub circulation passage 468.

Tenth Modification

In the dishwasher 510 according to the first embodiment, the fine bubble generator 2 may be arranged in the first suction passage 532 or the second suction passage 574.

Eleventh Modification

In the fifth example, an upstream-side recess recessed downstream may be disposed at an upstream-side end of each of the swirling flow generation portions 650 and a downstream-side protrusion protruding downstream may be disposed at a downstream-side end of each of the swirling flow generation portions 650. The upstream-side recess has a shape corresponding to the downstream-side protrusion. In the present modification, the body case 10 preferably comprises a ring portion protruding inward in the radial direction from the inner wall 610*c* of the body case 610 instead of the first projection 616*a* to the sixth projection 616*f*. A projection (example of "second positioning portion") having a shape corresponding to the upstream-side recess is preferably disposed on a surface on the downstream side of the ring portion. According to such a configuration also, any other feature for positioning the body case 610 and the most-upstream-side swirling flow generation portion 650 and different from the upstream-side recesses do not have to be disposed at the upstream-side end of the most upstream-side swirling flow generation portion 650. Due to this, structures of the plurality of swirling flow generation portions 650 can be made identical to each other.

Twelfth Modification

The upstream-side protrusions 654*a* of the most-upstream-side swirling flow generation portion 650 among the plurality of swirling flow generation portions 650 in the fifth example may have a shape corresponding to the second positioning recesses 618*b* of the body case 610 but may not have a shape corresponding to the downstream-side recesses 654*b* of the swirling flow generation portion(s) 650.

Thirteenth Modification

The body case 10 (see FIG. 2) of the first example may comprise a first positioning portion for positioning the first fine bubble generation portion 20 relative to the body case 10 and a second positioning portion for positioning the second fine bubble generation portion 22 relative to the body case 10. According to the above configuration, by the first fine bubble generation portion 20 and the body case 10 being positioned by the first positioning portion and the second fine bubble generation portion 22 and the body case 10 being positioned by the second position portion, the six outer venturi portions 36 of the first fine bubble generation portion 20 and the six vanes 56 of the most upstream-side swirling flow generation portion 50 of the second fine bubble generation portion 22 are positioned. Due to this, a majority of the gas-dissolved water flowing out of the first fine bubble generation portion 20 can be allowed to flow past the vanes 56 of the most upstream-side swirling flow generation portion 50. Accordingly, the fine bubbles can be generated in larger volume.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A fine bubble generator comprising:

an inlet into which gas-dissolved water in which gas is dissolved flows;

an outlet out of which the gas-dissolved water flows;

a first fine bubble generation portion disposed between the inlet and the outlet; and a second fine bubble generation portion disposed between the first fine bubble generation portion and the outlet, wherein the first fine bubble generation portion comprises:

a venturi portion including a diameter-reducing flow path and a diameter-increasing flow path disposed downstream of the diameter-reducing flow path, wherein the diameter-reducing flow path reduces its flow path diameter from upstream to downstream, and the diameter-increasing flow path increases its flow path diameter from upstream to downstream, the second fine bubble generation portion comprises a plurality of swirling flow generation portions disposed along a downstream-side central axis direction of the second fine bubble generation portion, wherein each of the plurality of swirling flow generation portions comprises:

a shaft portion extending along the downstream-side central axis direction;

an outer peripheral portion surrounding the shaft portion; and a plurality of vanes disposed between the shaft portion and the outer peripheral portion and configured to generate a swirling flow flowing in a predetermined swirling direction with respect to the shaft portion, wherein when a swirling direction opposite to the predetermined swirling direction is termed a reversed swirling direction, in each of the plurality of vanes of the swirling flow generation portions, a swirling-direction-side end of a specific vane among the plurality of vanes is located more on a reversed swirling direction side than a reversed swirling-direction-side end of an adjacent vane adjacent to the specific vane in the predetermined swirling direction, when each of the swirling flow generation portions is seen along the downstream-side central axis direction, each of the swirling flow generation portions comprises a plurality of first openings, when each of the swirling flow generation portions is seen along the downstream-side central axis direction, each of the plurality of first openings is surrounded by the swirling direction-side-end of the specific vane, the reversed swirling-direction-side end of the adjacent vane, the shaft portion, and the outer peripheral portion, and when the second fine bubble generation portion is seen along the downstream-side central axis direction, each of the plurality of vanes of a downstream-side swirling flow generation portion among the plurality of swirling flow generation portions is located to overlap at least a part of a corresponding first opening among the plurality of first openings of an upstream-side swirling flow generation portion, the downstream-side swirling flow generation portion being different from a swirling flow generation portion disposed on a most upstream side, and the upstream-side swirling flow generation portion being adjacent to the downstream side swirling flow generation portion on an upstream side of the downstream-side swirling flow generation portion.

2. The fine bubble generator according to claim 1, wherein when the second fine bubble generation portion is seen along the downstream-side central axis direction, each of the plurality of vanes of the downstream-side swirling flow generation portion overlaps an entirety of the corresponding first opening among the plurality of first openings of the upstream-side swirling flow generation portion.

3. The fine bubble generator according to claim 1, wherein
a plurality of second openings is disposed at a downstream-side end of each of the swirling flow generation portions,
each of the plurality of second openings is surrounded by the swirling-direction-side end of the specific vane, a swirling-direction-side end of the adjacent vane, the shaft portion, and the outer peripheral portion, and
when the second fine bubble generation portion is seen along the downstream-side central axis direction, the reversed swirling-direction-side end of each of the plurality of vanes of the downstream-side swirling flow generation portion is disposed in proximity to a central portion in the predetermined swirling direction of a corresponding second opening among the plurality of second openings.

4. A fine bubble generator comprising:
an inlet into which gas-dissolved water in which gas is dissolved flows;
an outlet out of which the gas-dissolved water flows;
a first fine bubble generation portion disposed between the inlet and the outlet; and
a second fine bubble generation portion disposed between the first fine bubble generation portion and the outlet
wherein the first fine bubble generation portion comprises:
a venturi portion including a diameter-reducing flow path and a diameter-increasing flow path disposed downstream of the diameter-reducing flow path, wherein the diameter-reducing flow path reduces its flow path diameter from upstream to downstream, and the diameter-increasing flow path increases its flow path diameter from upstream to downstream,
the second fine bubble generation portion comprises
a plurality of swirling flow generation portions disposed along a downstream-side central axis direction of the second fine bubble generation portion,
wherein each of the plurality of swirling flow generation portions comprises:
a shaft portion extending along the downstream-side central axis direction;
an outer peripheral portion surrounding the shaft portion; and
a plurality of vanes disposed between the shaft portion and the outer peripheral portion and configured to generate a swirling flow flowing in a predetermined swirling direction with respect to the shaft portion,
wherein
the first fine bubble generation portion comprises a plurality of the venturi portions,
the plurality of venturi portions includes a plurality of outer venturi portions disposed around an upstream-side central axis which is a central axis of the first fine bubble generation portion, a number of the plurality of outer venturi portions is same as a number of the plurality of vanes of a most-upstream-side swirling flow generation portion, the most-upstream-side swirling flow generation portion being a swirling flow generation portion disposed at a most upstream side among the plurality of swirling flow generation portions, and
a downstream-side end of the diameter-increasing flow path of each of the plurality of outer venturi portions faces a corresponding vane among the plurality of vanes of the most-upstream-side swirling flow generation portion.

5. A fine bubble generator comprising:
an inlet into which gas-dissolved water in which gas is dissolved flows;
an outlet out of which the gas-dissolved water flows;
a first fine bubble generation portion disposed between the inlet and the outlet; and
a second fine bubble generation portion disposed between the first fine bubble generation portion and the outlet,
wherein the first fine bubble generation portion comprises:
a venturi portion including a diameter-reducing flow path and a diameter-increasing flow path disposed downstream of the diameter-reducing flow path, wherein the diameter-reducing flow path reduces its flow path diameter from upstream to downstream, and the diameter-increasing flow path increases its flow path diameter from upstream to downstream,
the second fine bubble generation portion comprises
a plurality of swirling flow generation portions disposed along a downstream-side central axis direction of the second fine bubble generation portion,
wherein each of the plurality of swirling flow generation portions comprises:
a shaft portion extending along the downstream-side central axis direction;
an outer peripheral portion surrounding the shaft portion; and
a plurality of vanes disposed between the shaft portion and the outer peripheral portion and configured to generate a swirling flow flowing in a predetermined swirling direction with respect to the shaft portion,
wherein
the first fine bubble generation portion comprises a plurality of the venturi portions,
the plurality of venturi portions includes a plurality of outer venturi portions disposed around an upstream-side central axis which is a central axis of the first fine bubble generation portion,
a number of the plurality of outer venturi portions is same as a number of the plurality of vanes of a most-upstream-side swirling flow generation portion, the most-upstream-side swirling flow generation portion being a swirling flow generation portion disposed at a most upstream side among the plurality of swirling flow generation portions, and
a downstream-side end of the diameter-increasing flow path of each of the plurality of outer venturi portions faces a reversed swirling-direction-side end of a corresponding vane among the plurality of vanes of the most-upstream-side swirling flow generation portion.

6. The fine bubble generator according to claim 4, further comprising
a body case housing the first fine bubble generation portion and the second fine bubble generation portion,
the body case comprising:
a first positioning portion for positioning the first fine bubble generation portion relative to the body case; and
a second positioning portion for positioning the second fine bubble generation portion relative to the body case.

7. The fine bubble generator according to claim 6, wherein
an upstream-side protrusion protruding upstream or an upstream-side recess recessed downstream is disposed at an upstream-side end of each of the plurality of swirling flow generation portions, in a case where the upstream-side protrusion is disposed at the upstream-side end of each of the plurality of swirling flow generation portions, a downstream-side recess recessed upstream is disposed at a downstream-side end of each of the plurality of swirling flow generation portions, wherein the upstream-side protrusion has a shape corresponding to the second positioning portion and the downstream-side recess, and in a case where the upstream-side recess is disposed at the upstream-side end of each of the plurality of swirling flow generation portions, a downstream-side protrusion protruding downstream is disposed at the downstream-side end of each of the plurality of swirling flow generation portions, wherein the upstream-side recess has a shape corresponding to the second positioning portion and the downstream-side protrusion.

8. The fine bubble generator according to claim 4, wherein the plurality of venturi portions further includes an inner venturi portion extending along the upstream-side central axis, a downstream-side end of the diameter-increasing flow path of the inner venturi portion faces the shaft portion of the most-upstream-side swirling flow generation portion, and an opening area of the downstream-side end of the diameter-increasing flow path of the inner venturi portion is smaller than an area of the shaft portion of the most-upstream-side swirling flow generation portion, the area of the shaft portion being of when the shaft portion is seen along the downstream-side central axis direction.

9. The fine bubble generator according to claim 8, wherein the opening area is smaller than an outline area of an upstream-side end of the shaft portion of the most-upstream-side swirling flow generation portion, the outline area of the upstream-side end of the shaft portion being of when the shaft portion is seen along the downstream-side central axis direction.

10. The fine bubble generator according to claim 9, wherein a recess recessed downstream is disposed at the upstream-side end of the shaft portion of the most-upstream-side swirling flow generation portion.

11. The fine bubble generator according to claim 1, wherein a protrusion protruding upstream is disposed on upstream-side surface of each of the plurality of vanes.

12. A fine bubble generator comprising:

an inlet into which gas-dissolved water in which gas is dissolved flows;

an outlet out of which the gas-dissolved water flows;

a first fine bubble generation portion disposed between the inlet and the outlet; and a second fine bubble generation portion disposed between the first fine bubble generation portion and the outlet, wherein the first fine bubble generation portion comprises:

a venturi portion including a diameter-reducing flow path and a diameter-increasing flow path disposed downstream of the diameter-reducing flow path, wherein the diameter-reducing flow path reduces its flow path diameter from upstream to downstream, and the diameter-increasing flow path increases its flow path diameter from upstream to downstream, the second fine bubble generation portion comprises a plurality of swirling flow generation portions disposed along a downstream-side central axis direction of the second fine bubble generation portion, wherein each of the plurality of swirling flow generation portions comprises:

a shaft portion extending along the downstream-side central axis direction;

an outer peripheral portion surrounding the shaft portion; and a plurality of vanes disposed between the shaft portion and the outer peripheral portion and configured to generate a swirling flow flowing in a predetermined swirling direction with respect to the shaft portion, wherein a protrusion protruding upstream is disposed on upstream-side surface of each of the plurality of vanes, wherein the first fine bubble generation portion comprises a plurality of the venturi portions, the plurality of venturi portions includes a plurality of outer venturi portions disposed around an upstream-side central axis which is a central axis of the first fine bubble generation portion, a number of the plurality of outer venturi portions is same as a number of the plurality of vanes of a most-upstream-side swirling flow generation portion, the most-upstream-side swirling flow generation portion being a swirling flow generation portion disposed at a most upstream side among the plurality of swirling flow generation portions, and a downstream-side end of the diameter-increasing flow path of each of the plurality of outer venturi portions faces the protrusion of a corresponding vane among the plurality of vanes of the most-upstream-side swirling flow generation portion.

13. The fine bubble generator according to claim 1, further comprising a flow conditioner disposed between the second fine bubble generation portion and the outlet, the flow conditioner being configured to straighten a flow of gas-dissolved water flowing out of the second fine bubble generation portion from a swirling flow to a straight flow.

14. The fine bubble generator according to claim 4, wherein a protrusion protruding upstream is disposed on upstream-side surface of each of the plurality of vanes.

15. The fine bubble generator according to claim 5, wherein a protrusion protruding upstream is disposed on upstream-side surface of each of the plurality of vanes.

16. The fine bubble generator according to claim 4, further comprising a flow conditioner disposed between the second fine bubble generation portion and the outlet, the flow conditioner being configured to straighten a flow of gas-dissolved water flowing out of the second fine bubble generation portion from a swirling flow to a straight flow.

17. The fine bubble generator according to claim 5, further comprising a flow conditioner disposed between the second fine bubble generation portion and the outlet, the flow conditioner being configured to straighten a flow of gas-dissolved water flowing out of the second fine bubble generation portion from a swirling flow to a straight flow.

18. The fine bubble generator according to claim 12, further comprising a flow conditioner disposed between the second fine bubble generation portion and the outlet, the flow conditioner being configured to straighten a flow of gas-dissolved water flowing out of the second fine bubble generation portion from a swirling flow to a straight flow.

* * * * *